US007840508B2

(12) United States Patent
Yoshiike et al.

(10) Patent No.: US 7,840,508 B2
(45) Date of Patent: Nov. 23, 2010

(54) INFORMATION PROCESSING APPARATUS, INFORMATION PROCESSING METHOD, AND PROGRAM

(75) Inventors: Yukiko Yoshiike, Tokyo (JP); Masato Ito, Tokyo (JP); Katsuki Minamino, Tokyo (JP); Hirotaka Suzuki, Kanagawa (JP); Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 595 days.

(21) Appl. No.: 11/732,807

(22) Filed: Apr. 4, 2007

(65) Prior Publication Data

US 2007/0239635 A1     Oct. 11, 2007

(30) Foreign Application Priority Data

Apr. 6, 2006     (JP) .............................. 2006-105547

(51) Int. Cl.
*G06F 15/18*     (2006.01)
*G06N 3/08*     (2006.01)

(52) U.S. Cl. ........................................................ 706/25
(58) Field of Classification Search .................. 706/16, 706/25, 30
See application file for complete search history.

(56) References Cited

U.S. PATENT DOCUMENTS 5,390,284 A * 2/1995 Ogata et al. .................... 706/25
5,673,367 A * 9/1997 Buckley ....................... 706/23

FOREIGN PATENT DOCUMENTS

JP     10 283334     10/1998
JP     10 326265     12/1998

OTHER PUBLICATIONS

Werbos, Paul J. "Backpropagation Through Time: What It Does and How to Do It", Proceedings of the IEEE, vol. 78, No. 10, Oct. 1990.*
Katsuki Minamino et al., "Voice Imitation based on self-organizing maps with HMMs".

* cited by examiner

*Primary Examiner*—Donald Sparks
*Assistant Examiner*—Vincent M Gonzales
(74) *Attorney, Agent, or Firm*—Frommer Lawrence & Haug LLP; William S. Frommer; Thomas F. Presson

(57) ABSTRACT

An information processing apparatus includes a storage unit configured to store a node holding dynamics; an input-weight-coefficient adjuster configured to adjust input-weight coefficients on a dimension-by-dimension basis, the input-weight coefficients being weight coefficients for individual dimensions of input data input to input units of the node, the input data being observed time-series data having a plurality of dimensions; and an output-weight-coefficient adjuster configured to adjust output-weight coefficients on a dimension-by-dimension basis, the output-weight coefficients being weight coefficients for individual dimensions of output data having a plurality of dimensions and output from output units of the node.

13 Claims, 30 Drawing Sheets

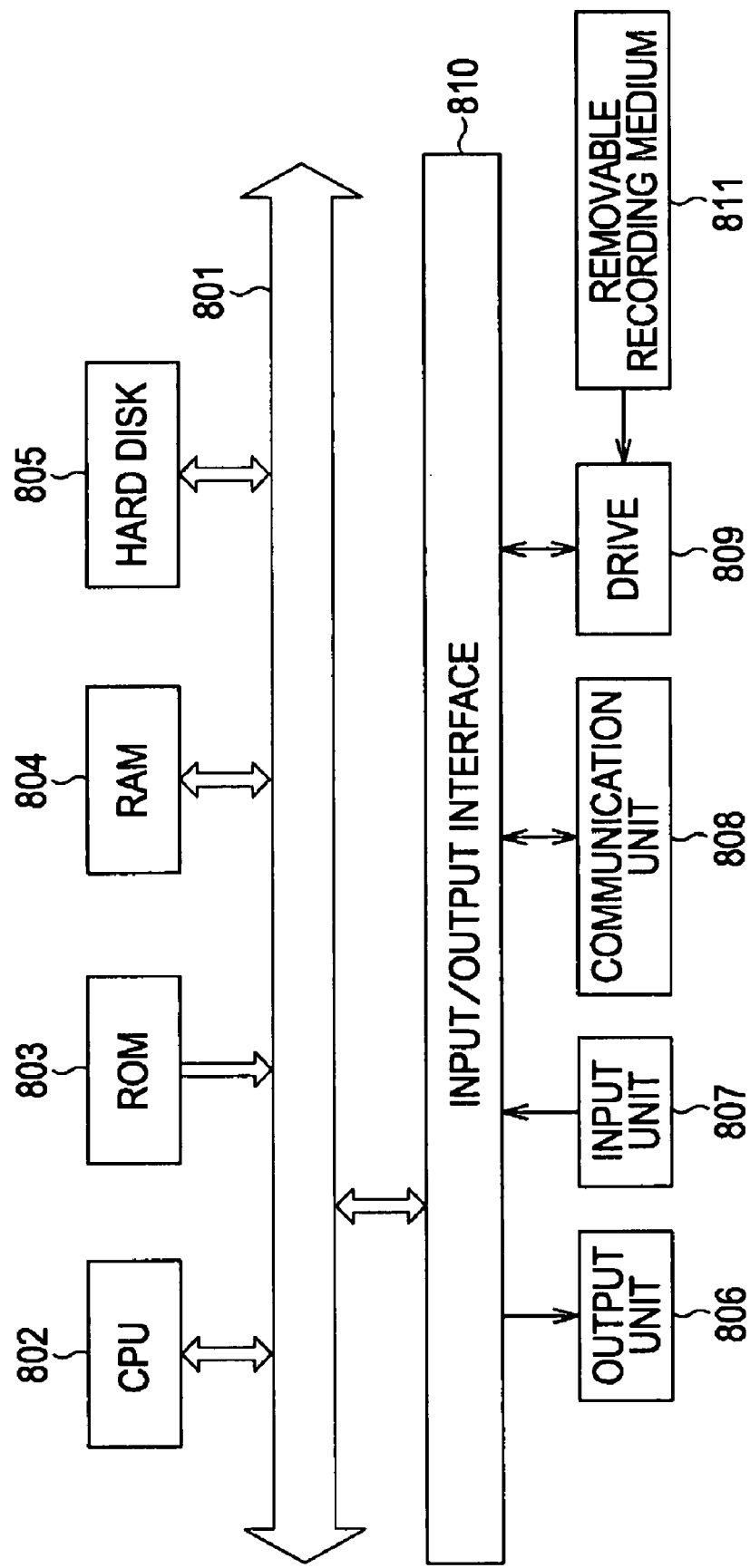

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2006-105547 filed in the Japanese Patent Office on Apr. 6, 2006, the entire contents of which are incorporated herein by reference.

BACKGROUND OF THE INVENTION

1. Field of the Invention

The present invention relates to information processing apparatuses, information processing methods, and programs. More specifically, the present invention relates to an information processing apparatus, an information processing method, and a program with which multidimensional time-series data can be handled efficiently.

2. Description of the Related Art

It is known that actions (movements) of robots can be described as dynamical systems defined by time-evolution rules, and that dynamical systems of various actions can be implemented by specific attractor dynamics.

For example, walking movements of a bipedal robot, such as a humanoid robot, can be described as limit cycle dynamics, which are characterized in that the states of movement of a system converge to a specific periodic orbit from various initial states. This is described, for example, in G. Taga, 1998, "Self-organized control of bipedal locomotion by neural oscillators in unpredictable environment", Biological Cybernetics, 65, 147-159, and Gentaro Taga, "Nou to shintai no douteki dezain—Undou chikaku no hisenkei rikigakukei to hattatsu" (Dynamical design of the brain and the body—Nonlinear dynamical system and development of movement and perception), Kaneko Shobo. Furthermore, a reaching operation in which an arm robot extends its arms toward a certain object can be described as fixed-point dynamics, which are characterized in that various initial states converge to a specific fixed point. Furthermore, it is also said that any movement can be implemented by a combination of discrete movements that can be implemented by fixed-point dynamics and cyclic movements that can be implemented by limit cycle dynamics.

Issues that are to be addressed in order to control actions (movements) of a robot according to attractor dynamics include designing attractor dynamics in accordance with tasks, and generating appropriate motor outputs according to the attractor dynamics on the basis of information obtained from sensor inputs. For this purpose, outputs for actions of the robot should be generated in such a manner that the attractor dynamics continuously interact with the environment.

Methods for learning attractor dynamics instead of manually designing attractor dynamics have been proposed. One of the methods uses a recurrent neural network (hereinafter referred to as an RNN). The RNN includes context units that are connected to the network via a feedback loop. It is known that, theoretically, arbitrary dynamical systems can be approximated by holding internal states in the context units.

However, in a learning model composed of one tightly connected network module, when a large number of dynamics are learned for learning actions in a large scale, considerable interference occurs among dynamics that are to be stored, so that learning becomes difficult.

In view of this problem, several learning models employing modular architectures have been proposed. In a modular architecture, a plurality of network modules are combined to form a single learning model. In the modular architecture, in principle, by increasing the number of modules, it is readily possible to increase dynamics that can be stored. However, an issue arises as to selection of a module that is to be used for learning of a given learning sample.

Depending on the method of module selection, learning methods can be classified into supervised learning and unsupervised learning. In supervised learning, assignment of learning samples to modules is determined manually. On the other hand, in unsupervised learning, assignment of learning samples to modules is determined autonomously by the learning model. In order for a robot or a system to perform learning autonomously, unsupervised learning is to be employed for learning of modules.

As a method for learning of modules by unsupervised learning, a learning model called the mixture of RNN experts has been proposed. The mixture of RNN experts is described, for example, in Japanese Unexamined Patent Application Publication No. 11-126198. According to this learning model, outputs of a plurality of RNN modules are integrated by gate mechanisms to determine a final output, and learning of modules the individual RNNs proceeds by adjusting the gates according to maximum likelihood estimation so as to maximize the performance of the final output.

However, according to the method based on global optimization, learning becomes difficult when the number of modules becomes huge.

On the other hand, in methods such as self-organization map (hereinafter referred to as SOM) or neural gas used for learning categories of vector patterns, learning rules based on global optimization are not used, so that optimality is not ensured. However, it is known that these methods allow learning an appropriate category structure in a self-organizing manner by unsupervised learning. With these methods, learning is practically possible even when the number of modules is huge. The SOM is described, for example, in T. Kohonen, "Jiko soshikika mappu" (Self-organization map), Springer-Verlag Tokyo. The neural gas is described, for example, in T. M. Martinetz, S. G. Berkovich, K. J. Schulten, ""Neural-Gas" Network for Vector Quantization and its Application to Time-Series Prediction", IEEE Trans. Neural Networks, VOL. 4, NO. 4, pp. 558-569, 1993.

SUMMARY OF THE INVENTION

In Japanese Patent Application No. 2004-353832, the assignee of this application has proposed a model for learning time-series patterns instead of vector patterns.

However, a method for efficiently handling multidimensional time-series data has not been proposed.

There exists a demand for efficiently handling multidimensional time-series data.

According to an embodiment of the present invention, there is provided an information processing apparatus including storage means for storing a node holding dynamics; input-weight-coefficient adjusting means for adjusting input-weight coefficients on a dimension-by-dimension basis, the input-weight coefficients being weight coefficients for individual dimensions of input data input to input units of the node, the input data being observed time-series data having a plurality of dimensions; and output-weight-coefficient adjusting means for adjusting output-weight coefficients on a dimension-by-dimension basis, the output-weight coefficients being weight coefficients for individual dimensions of output data having a plurality of dimensions and output from output units of the node.

The time-series data may have attached thereto confidences for the individual dimensions. In this case, the input-weight-coefficient adjusting means adjusts the input-weight coefficients on the dimension-by-dimension basis according to the confidences for the individual dimensions, and the output-weight-coefficient adjusting means adjusts the output-weight coefficients on the dimension-by-dimension basis according to the confidences for the individual dimensions.

The information processing apparatus may further include obtaining means for obtaining the input-weight coefficients and the output-weight coefficients from outside. In this case, the input-weight-coefficient adjusting means adjusts the input-weight coefficients on the dimension-by-dimension basis according to the input-weight coefficients obtained by the obtaining means, and the output-weight-coefficient adjusting means adjusts the output-weight coefficients on the dimension-by-dimension basis according to the output-weight coefficients obtained by the obtaining means.

The information processing apparatus may further include input means for inputting the input data to the input units, the input data being obtained by adding together output data output from the output units in an immediately preceding iteration and newly observed time-series data on the dimension-by-dimension basis by ratios corresponding to the input-weight coefficients.

The information processing apparatus may further include internal-state updating means for updating initial values of internal-state quantities of the node according to an output error, the output error being obtained by adding together errors for the individual dimensions between the input data and output data output from the output units in an immediately preceding iteration by ratios corresponding to the output-weight coefficients.

The information processing apparatus may further include weight updating means for updating weights assigned to connections of the node, according to the output error.

The information processing apparatus may further include base-weight calculating means for calculating base weights for the individual dimensions according to the confidences for the individual dimensions, the base weights serving as bases of input-weight coefficients and output-weight coefficients used to generate time-series data.

The information processing apparatus may further include generating means for generating time-series data having a plurality of dimensions while updating internal-state quantities of the node by inputting the input data to the input units of the node.

The input-weight-coefficient adjusting means may adjust the input-weight coefficients on the dimension-by-dimension basis according to errors for the individual dimensions between the input data and output data output from the output units in an immediately preceding iteration, and the output-weight-coefficient adjusting means may adjust the output-weight coefficients on the dimension-by-dimension basis according to the errors for the individual dimensions.

The information processing apparatus may further include obtaining means for obtaining base-weight coefficients calculated for the individual dimensions when dynamics are learned on the basis of time-series data, the base-weight coefficients serving as bases of the input-weight coefficients and the output-weight coefficients. In this case, the input-weight-coefficient adjusting means adjusts the input-weight coefficients on the dimension-by-dimension basis according to the base-weight coefficients, and the output-weight-coefficient adjusting means adjusts the output-weight coefficients on the dimension-by-dimension basis according to the base weights.

The generating means may generate the time-series data for the individual dimensions by ratios corresponding to the output-weight coefficients.

According to another embodiment of the present invention, there is provided an information processing method comprising the steps of adjusting input-weight coefficients on a dimension-by-dimension basis, the input-weight coefficients being weight coefficients for individual dimensions of input data input to input units of a node holding dynamics, the input data being observed time-series data having a plurality of dimensions; and adjusting output-weight coefficients on a dimension-by-dimension basis, the output-weight coefficients being weight coefficients for individual dimensions of output data having a plurality of dimensions and output from output units of the node.

According to another embodiment of the present invention, there is provided a program for causing a computer to execute processing comprising the steps of adjusting input-weight coefficients on a dimension-by-dimension basis, the input-weight coefficients being weight coefficients for individual dimensions of input data input to input units of a node holding dynamics, the input data being observed time-series data having a plurality of dimensions; and adjusting output-weight coefficients on a dimension-by-dimension basis, the output-weight coefficients being weight coefficients for individual dimensions of output data having a plurality of dimensions and output from output units of the node.

According to these embodiments of the present invention, input-weight coefficients are adjusted on a dimension-by-dimension basis, the input-weight coefficients being weight coefficients for individual dimensions of input data input to input units of a node holding dynamics, the input data being observed time-series data having a plurality of dimensions, and output-weight coefficients are adjusted on a dimension-by-dimension basis, the output-weight coefficients being weight coefficients for individual dimensions of output data having a plurality of dimensions and output from output units of the node.

Accordingly, multidimensional data can be handled efficiently.

BRIEF DESCRIPTION OF THE DRAWINGS

FIG. 31 is a block diagram showing an example configuration of a computer according to an embodiment of the present invention.

DESCRIPTION OF THE PREFERRED EMBODIMENTS

Figure 1:
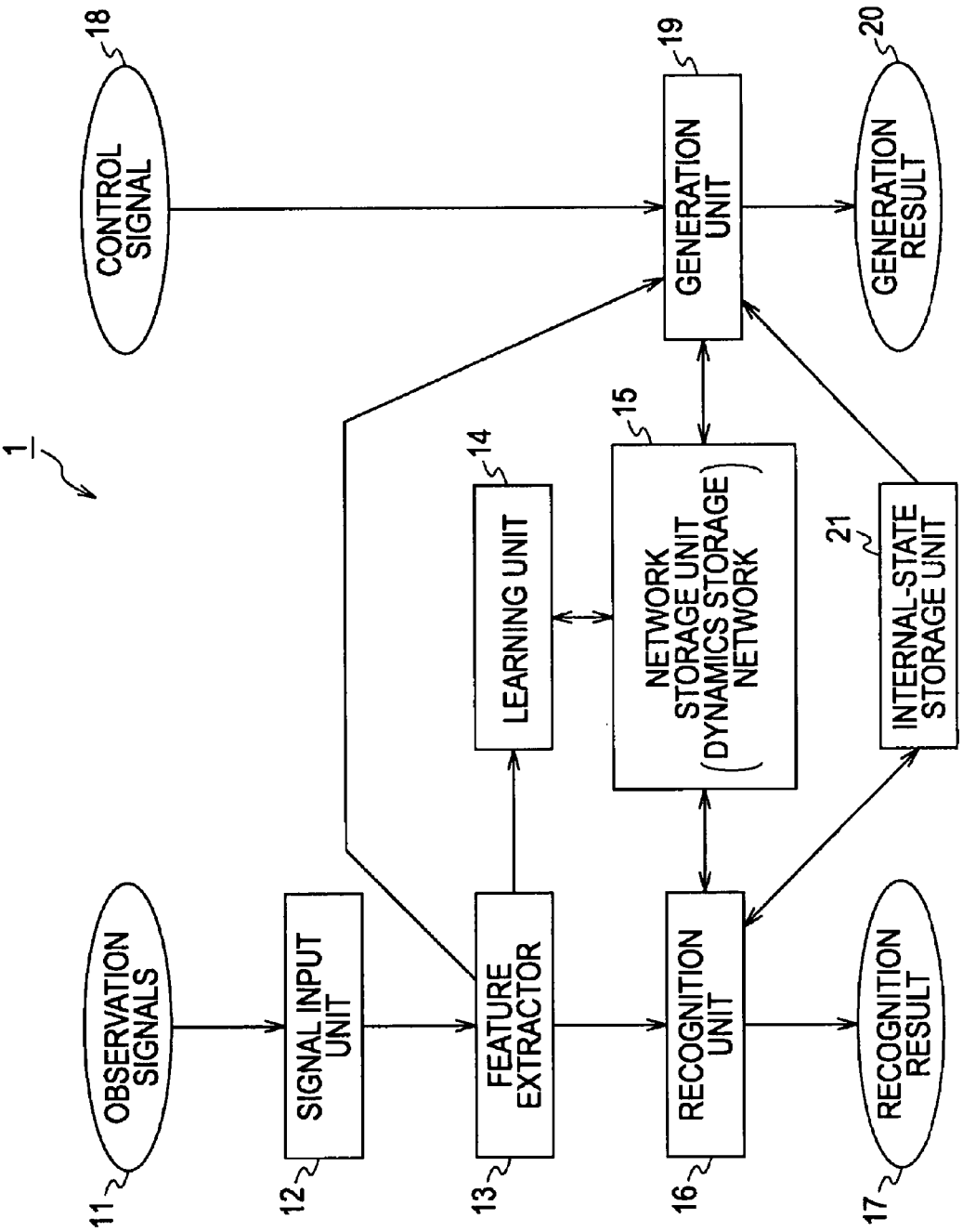
FIG. 1 is a block diagram showing an example configuration of an information processing apparatus according to an embodiment of the present invention.

Before describing embodiments of the present invention, examples of corresponding relationship between the features of the present invention and the embodiments described in this specification or shown in the drawings will be described below. This description is intended to ensure that embodiments supporting the present invention are described in this specification or shown in the drawings. Thus, even if any embodiment described in this specification or shown in the drawings is not described as corresponding to certain features of the present invention, that does not necessarily mean that the embodiment does not correspond to those features. Conversely, even if any embodiment is described herein as corresponding to certain features, that does not necessarily mean that the embodiment does not correspond to other features.

An information processing apparatus according to an embodiment of the present invention includes storage means (e.g., a network storage unit 15 shown in FIG. 1) for storing a node holding dynamics; input-weight-coefficient adjusting means (e.g., an input-weight adjuster 82 shown in FIG. 6) for adjusting input-weight coefficients on a dimension-by-dimension basis, the input-weight coefficients being weight coefficients for individual dimensions of input data input to input units of the node, the input data being observed time-series data having a plurality of dimensions; and output-weight-coefficient adjusting means (e.g., an output-weight adjuster 83 shown in FIG. 6) for adjusting output-weight coefficients on a dimension-by-dimension basis, the output-weight coefficients being weight coefficients for individual dimensions of output data having a plurality of dimensions and output from output units of the node.

The time-series data may have attached thereto confidences for the individual dimensions. In this case, the input-weight-coefficient adjusting means adjusts the input-weight coefficients on the dimension-by-dimension basis according to the confidences for the individual dimensions (e.g., step S5 shown in FIG. 7), and the output-weight-coefficient adjusting means adjusts the output-weight coefficients on the dimension-by-dimension basis according to the confidences for the individual dimensions (e.g., step S6 shown in FIG. 7).

The information processing apparatus may further include obtaining means (e.g., a weight obtainer 101 shown in FIG. 8) for obtaining the input-weight coefficients and the output-weight coefficients from outside. In this case, the input-weight-coefficient adjusting means adjusts the input-weight coefficients on the dimension-by-dimension basis according to the input-weight coefficients obtained by the obtaining means (e.g., step S25 shown in FIG. 9), and the output-weight-coefficient adjusting means adjusts the output-weight coefficients on the dimension-by-dimension basis according to the output-weight coefficients obtained by the obtaining means (e.g., step S26 shown in FIG. 9).

The information processing apparatus may further include input means (e.g., an adder 60 shown in FIG. 4) for inputting the input data to the input units, the input data being obtained by adding together output data output from the output units in an immediately preceding iteration and newly observed time-series data on the dimension-by-dimension basis by ratios corresponding to the input-weight coefficients.

The information processing apparatus may further include internal-state updating means (e.g., a score calculator 84 shown in FIG. 6) for updating initial values of internal-state quantities of the node according to an output error, the output error being obtained by adding together errors for the individual dimensions between the input data and output data output from the output units in an immediately preceding iteration by ratios corresponding to the output-weight coefficients.

The information processing apparatus may further include weight updating means (e.g., a parameter updater 87 shown in FIG. 6) for updating weights assigned to connections of the node, according to the output error.

The information processing apparatus may further include base-weight calculating means (e.g., a base-weight determiner 121 shown in FIG. 10) for calculating base weights for the individual dimensions according to the confidences for the individual dimensions, the base weights serving as bases of input-weight coefficients and output-weight coefficients used to generate time-series data.

The information processing apparatus may further include generating means (e.g., a time-series-data generator 316 shown in FIG. 13) for generating time-series data having a plurality of dimensions while updating internal-state quantities of the node by inputting the input data to the input units of the node.

Figure 21:
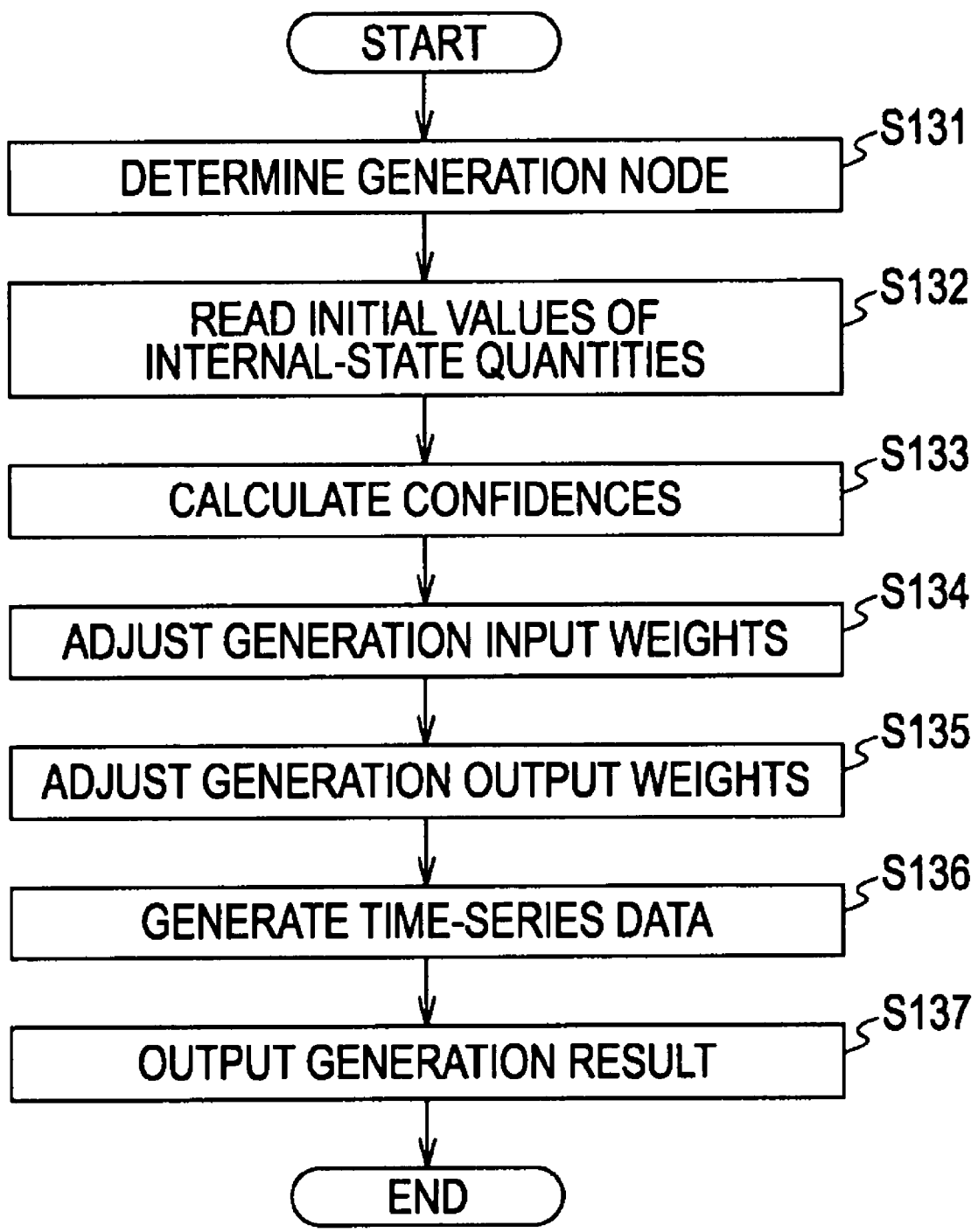
FIG. 21 is a flowchart of another generation process.

The input-weight-coefficient adjusting means may adjust the input-weight coefficients on the dimension-by-dimension basis according to errors for the individual dimensions between the input data and output data output from the output units in an immediately preceding iteration (e.g., step S134 shown in FIG. 21), and the output-weight-coefficient adjusting means may adjust the output-weight coefficients on the dimension-by-dimension basis according to the errors for the individual dimensions (step S135 shown in FIG. 21).

The information processing apparatus may further include obtaining means (e.g., a base-weight obtainer 621 shown in FIG. 22) for obtaining base-weight coefficients calculated for the individual dimensions when dynamics are learned on the basis of time-series data, the base-weight coefficients serving as bases of the input-weight coefficients and the output-weight coefficients. In this case, the input-weight-coefficient adjusting means adjusts the input-weight coefficients on the dimension-by-dimension basis according to the base-weight coefficients (e.g., step S152 shown in FIG. 24), and the output-weight-coefficient adjusting means adjusts the output-weight coefficients on the dimension-by-dimension basis according to the base weights (e.g., step S153 shown in FIG. 24).

Figure 15:
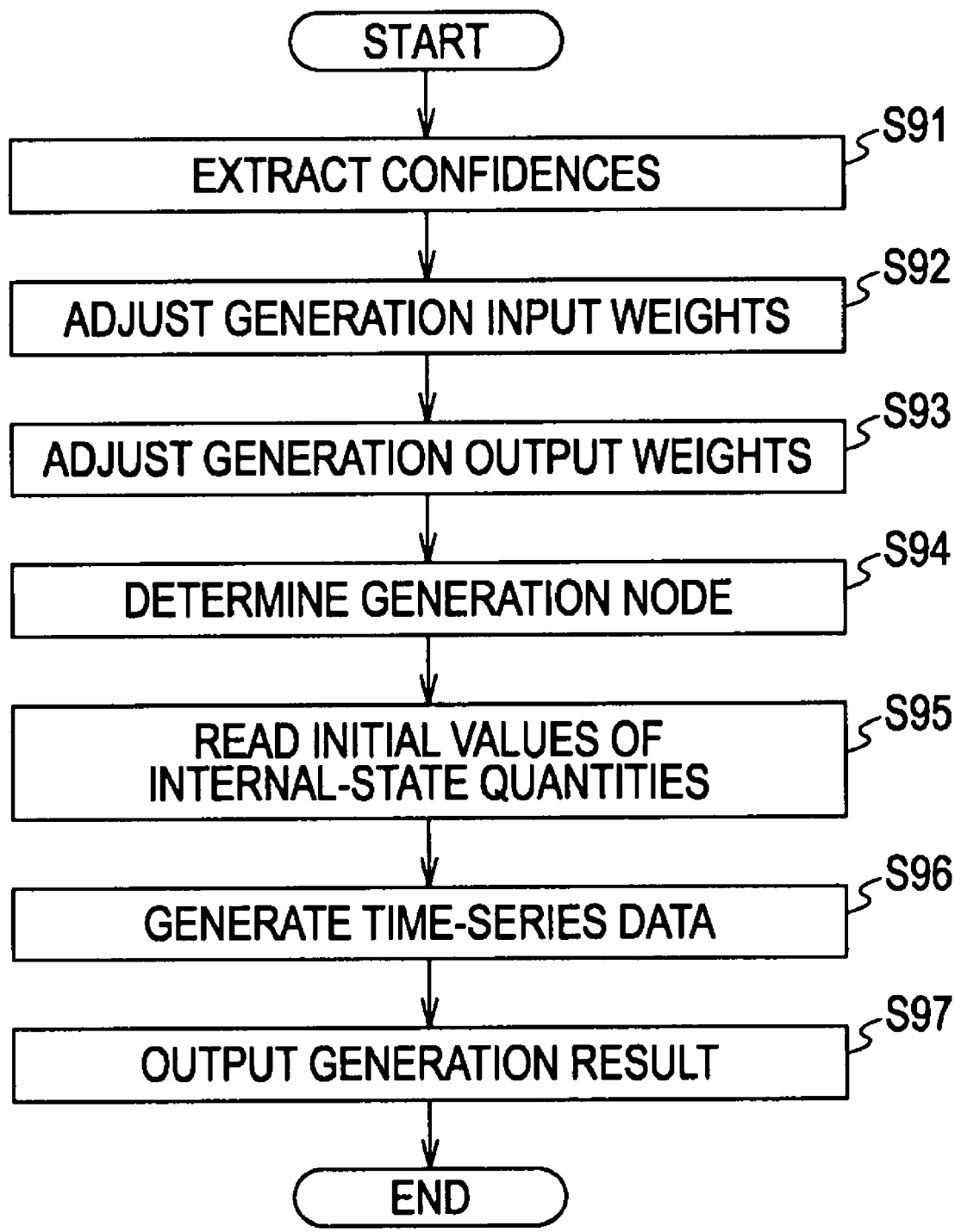
FIG. 15 is a flowchart of a generation process.

The generating means may generate the time-series data for the individual dimensions by ratios corresponding to the output-weight coefficients (e.g., step S96 shown in FIG. 15).

Figure 7:
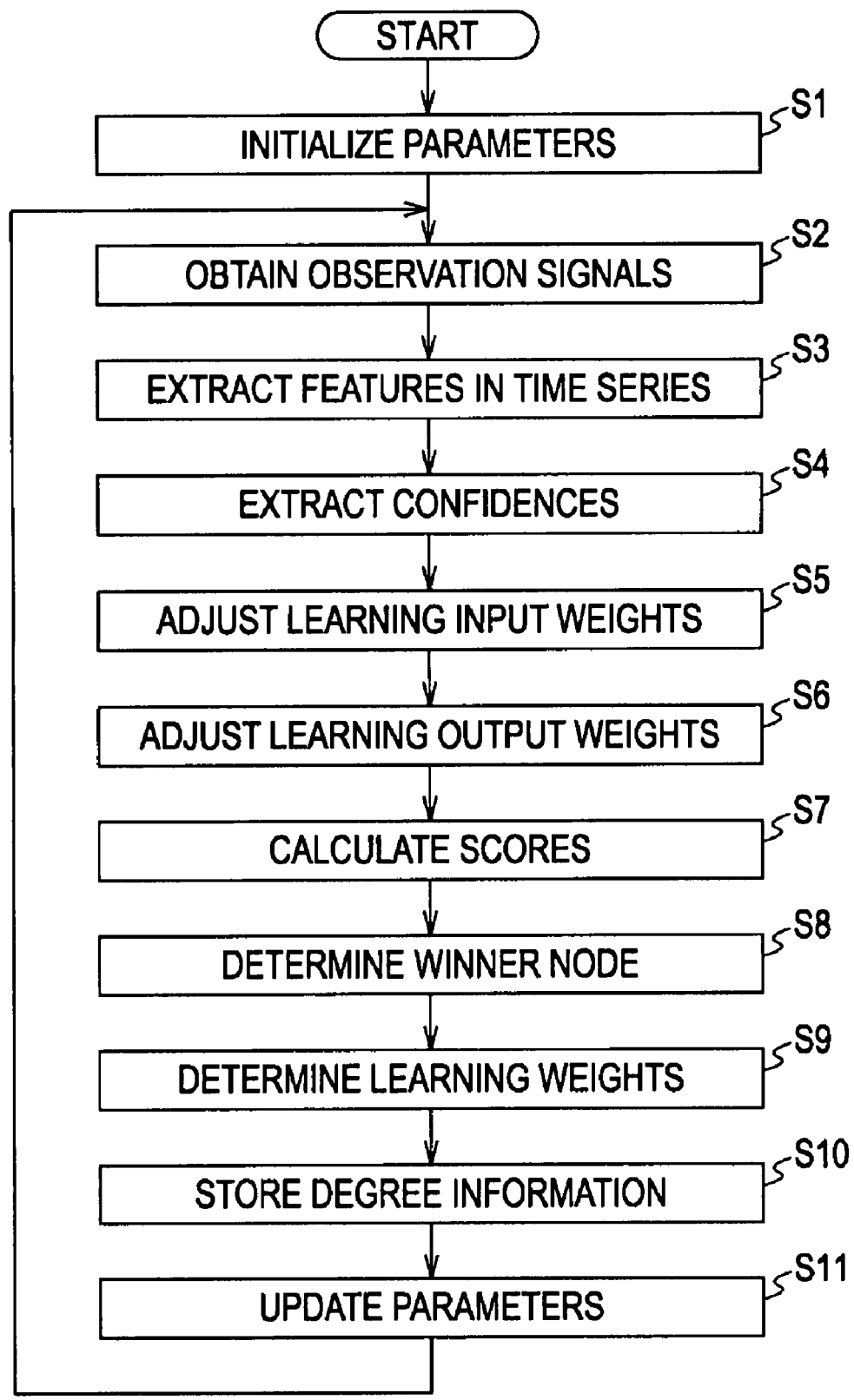
FIG. 7 is a flowchart of a learning process.

An information processing method or a program according to an embodiment of the present invention includes the steps of adjusting input-weight coefficients on a dimension-by-dimension basis, the input-weight coefficients being weight coefficients for individual dimensions of input data input to input units of a node holding dynamics, the input data being observed time-series data having a plurality of dimensions (e.g., step S5 shown in FIG. 7); and adjusting output-weight coefficients on a dimension-by-dimension basis, the output-weight coefficients being weight coefficients for individual dimensions of output data having a plurality of dimensions and output from output units of the node (e.g., step S6 shown in FIG. 7).

Now, specific embodiments of the present invention will be described in detail with reference to the drawings.

FIG. 1 is a block diagram showing an example configuration of an information processing apparatus 1 according to an embodiment of the present invention.

Referring to FIG. 1, the information processing apparatus 1 includes a network storage unit 15 that stores a dynamics storage network including nodes each implemented by a dynamical-system approximation model having internal-state quantities, and a learning unit 14 that updates parameters of the dynamics storage network in a self-organizing manner.

Each node of the dynamics storage network holds dynamics representing dynamical characteristics of time-series data. The dynamics held by each node of the dynamics storage network, defined by the parameters updated by the learning unit 14, are used for recognition and generation of time-series data.

The information processing apparatus 1 shown in FIG. 1 is used, for example, for recognition or generation of control signals for a robot or the like. Particularly, the information processing apparatus 1 is used for learning, recognition, or generation of signals input to or output from sensors and motors in an autonomous system, an autonomous robot, or the like.

In the information processing apparatus 1 shown in FIG. 1, signals input to the information processing apparatus 1 and signals output from the information processing apparatus 1 are both input to a signal input unit 12 as observation signals 11. The observation signals 11 include, for example, audio or image signals, signals representing luminance levels of light emitting diodes (LEDs), signals representing rotation angles or angular velocities of motors, and so forth.

The signal input unit 12 outputs electric signals corresponding to the input observation signals 11 to a feature extractor 13. More specifically, when the observation signals 11 are audio signals, the signal input unit 12 corresponds to, for example, a microphone. When the observation signals 11 are image signals, the signal input unit 12 corresponds to, for example, a camera. When the observation signals 11 are signals representing rotation angles or angular velocities of motors, the signal input unit 12 corresponds to, for example, devices for measuring rotation angles or angular velocities of the motors.

Hereinafter, signals output from the signal input unit 12, as well as signals input to the signal input unit 12, will be referred to as observation signals 11. The observation signals 11 may be either stationary signals or time-varying non-stationary signals.

Furthermore, in the following description, sensor/motor signals in a robot system will be mainly used as an example of the observation signals 11. The sensor/motor signals are vectors having components representing, for example, signals output from sensors or control signals input to motors in order to control the motors (hereinafter referred to as motor signals). Obviously, the observation signals 11 are not limited to sensor/motor signals.

Furthermore, the signal input unit 12 includes a segment detector or the like that outputs sensor/motor signals as divided into predetermined segments. The manner of segmentation is not particularly limited as long as sensor/motor signals are output as divided into appropriate lengths. Thus, sensor/motor signals divided into appropriate lengths in an optimal manner in accordance with input sensor/motor signals are output from the signal input unit 12 as the observation signals 11.

The feature extractor 13 extracts features in time series from the observation signals 11 output from the signal input unit 12. For example, the feature extractor 13 executes processing such as frequency analysis at regular time intervals on audio signals, which are a type of sensor signals, to thereby extract features, such as mel-cepstrum, in time series. The mel-cepstrum is a type of feature that is widely used in speech recognition or the like.

The feature extractor 13 supplies the time-series feature data (hereinafter simply referred to as time-series data) obtained by extracting features in time series from the observation signals 11 to the learning unit 14, a recognition unit 16, and a generation unit 19.

The learning unit 14 learns dynamics representing features of temporal change in the time-series data by a predetermined degree, using the time-series data supplied from the feature extractor 13. More specifically, the learning unit 14 updates the parameters of the dynamics storage network holding the dynamics by a predetermined degree.

As will be described later in detail, basically, when time-series data not having labels assigned thereto is successively given to the learning unit 14, the learning unit 14 executes unsupervised learning so that feature dynamics in the time-series data are obtained in a self-organizing manner. As a result, the dynamics storage network stored in the network storage unit 15 efficiently holds representative dynamics. The dynamics can be used at any time as needed by the recognition unit 16 or the generation unit 19.

The dynamics represent a time-varying dynamical system, and can be represented, for example, by a specific function. The dynamics storage network holds dynamics representing features of temporal change in the time-series data.

The recognition unit 16 determines dynamics most approximate to the time-series data supplied from the feature extractor 13, with reference to the dynamics that have been held in the dynamics storage network through learning that has been performed.

More specifically, the recognition unit 16 inputs the time-series data supplied from the feature extractor 13 to the dynamics storage network, and obtains output data associated with the input. Then, the recognition unit 16 determines dynamics most approximate to the time-series data on the basis of the output data and the time-series data supplied from the feature extractor 13. The recognition unit 16 outputs the dynamics as a recognition result 17.

The generation unit 19 can generate time-series data as needed from the dynamics held in the dynamics storage network. The generation unit 19 executes a generation process to generate time-series data.

More specifically, the generation unit 19 obtains a control signal 18 specifying which dynamics are to be used to generate time-series data. The generation unit 19 inputs the time-series data to a node having specified dynamics on the basis of the control signal 18 and the time-series data supplied from the feature extractor 13. Then, the generation unit 19 generates time-series data on the basis of output data associated with the input. Then, the generation unit 19 outputs the time-series data as a generation result 20.

An internal-state storage unit 21 holds internal-state quantities of each node of the dynamics storage network. For example, the internal-state quantities stored in the internal-state storage unit 21 are updated by the recognition unit 16 and used by the generation unit 19.

Learning

Next, learning performed by the information processing apparatus 1 shown in FIG. 1 will be described with reference to FIGS. 2 and 3.

Figure 2:
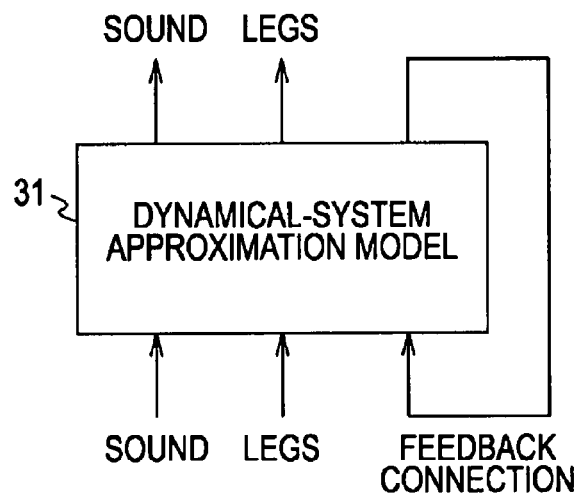
FIG. 2 is a diagram showing an example of a dynamical-system approximation model that is used in a case where learning is performed using two-dimensional time-series data.
Figure 3:
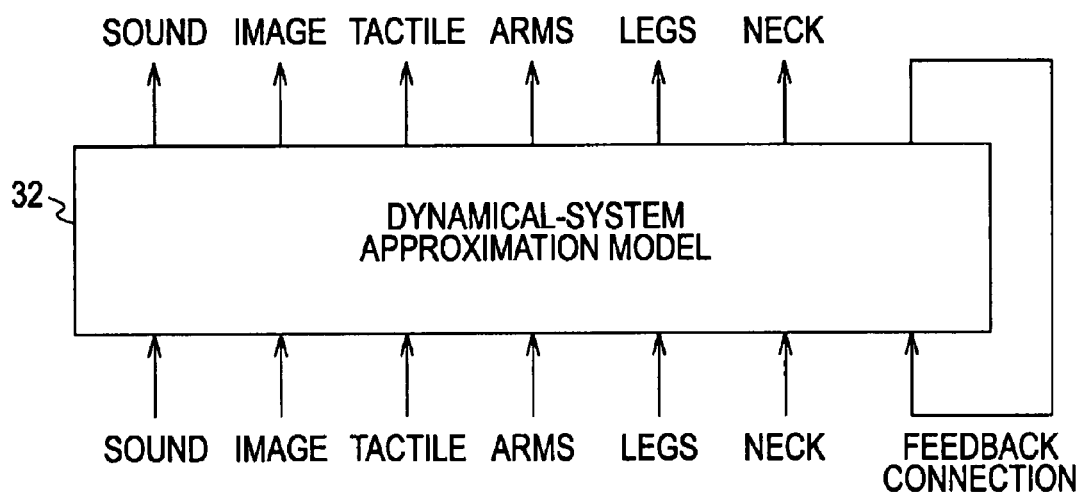
FIG. 3 is a diagram showing an example of a dynamical-system approximation model that is used in a case where learning is performed using six-dimensional time-series data.

In FIGS. 2 and 3, it is assumed that, as a dynamical-system approximation model, an RNN in which a feedback loop from an output layer to an input layer is provided in a three-layer neural network (NN) is used. Using the RNN, learning is performed to learn to predict and output a state vector $X_{t+1}$ at time t+1 on the basis of input of a state vector $X_t$ at time t in time-series data. That is, time-evolution rules of time-series data can be learned through prediction learning.

As a method of estimating parameters in a dynamical-system approximation model having internal-state quantities, such as an RNN, usually, back-propagation through time (BPTT) is used. BPTT is a learning method based on the steepest-descent method. In the BPTT method, learning is performed according to the gradient method through repeated calculations.

The BPTT is described, for example, in D. E. Rumelhart, G. E. Hinton & R. E. Williams, 1986, "Learning internal representations by error propagation", in D. E. Rumelhart & J. McClelland, "Parallel distributed processing", pp. 318-364, Cambridge, Mass.: MIT Press, and R. J. Williams and D. Zipser, "A learning algorithm for continually running fully recurrent neural networks", Neural Computation, 1: 270-280, 1989.

FIG. 2 shows a dynamical-system approximation model 31 for performing learning using two-dimensional time-series data. FIG. 3 shows a dynamical-system approximation model 41 for performing learning using six-dimensional time-series data. The dimensions refer to the types of time-series data classified in learning, recognition, or generation, and the number of dimensions corresponds to the number of units of the RNN.

In FIGS. 2 and 3, it is assumed that six-dimensional time-series data is generated. More specifically, six-dimensional time-series data is generated respectively from sensor signals representing sound (hereinafter referred to as audio signals), sensor signals representing images (hereinafter referred to as image signals), sensor signals representing tactile information (hereinafter referred to as tactile signals), motor signals for controlling motors that actuate arms (hereinafter referred to as arms signals), motor signals for controlling motors that actuate legs (hereinafter referred to as legs signals), and motor signals for controlling a motor that actuates a neck (hereinafter referred to as neck signals).

Referring to FIG. 2, of the six-dimensional time-series data obtained, two-dimensional time-series data corresponding to the audio signals and the legs signals are input respectively to two units of the input layer of the dynamical-system approximation model 31. The dynamical-system approximation model 31 learns to predict and output a state vector $X_{t+1}$ at time t+1 in the two-dimensional data on the basis of input of a state vector $X_t$ at time t in the two-dimensional time-series data. Thus, each of the number of units in the input layer and the number of units in the output layer of the dynamical-system approximation model 31 shown in FIG. 2 is two.

In the case shown in FIG. 3, all the six-dimensional time-series data obtained are input respectively to six units in the input layer of the dynamical-system approximation model 32. The dynamical-system approximation model 32 learns to predict and output a state vector $X_{t+1}$ at time t+1 in the six-dimensional data on the basis of input of a state vector $X_t$ at time t in the six-dimensional time-series data. Thus, each of the number of units in the input layer and the number of units in the output layer of the dynamical-system approximation model 32 shown in FIG. 3 is six.

As described above, compared with the dynamical-system approximation model 31 shown in FIG. 2, which performs learning using two-dimensional time-series data, in the dynamical-system approximation model 32 shown in FIG. 3, which performs learning using six-dimensional time-series data, the number of units in the input layer and the number of units in the output layer increase considerably, so that the scale increases.

It is known that it generally becomes more difficult to achieve convergence of parameters as the scale of a neural network increases. Furthermore, since learning is performed using an average value of prediction errors calculated on the basis of predictive values of time-series data output from the individual units of the output layer, as the number of dimensions of the time-series data increases, the ratio of effect of time-series data of each dimension on the average value of prediction errors becomes very small. Therefore, it is not easy to perform learning on the basis of the average value of prediction errors.

As described above, it becomes difficult to perform learning on the basis of time-series data as the number of dimensions of the time-series data increases.

For example, in order to learn an action of walking in a direction of sound, dynamics formed on the basis of interaction between time-series data representing sound directions and magnitudes, obtained from audio signals, and time-series data corresponding to legs signals for walking operations are to be learned. When the learning is performed using the two-dimensional time-series data corresponding to the audio signals and the legs signal among the six-dimensional time-series data as shown in FIG. 2, the dynamics can be readily learned. On the other hand, when learning is performed using all the six-dimensional time-series data as shown in FIG. 3, it is difficult to learn the dynamics.

As another example, in order to learn an action of stretching out arms when a red ball is seen just in front, dynamics formed on the basis of interaction between time-series data representing coordinates of the position of the red ball, obtained from image signals, and time-series data corresponding to arms signals for actuating arms, are to be learned. When learning is performed using all the six-dimensional time-series data as shown in FIG. 3, learning becomes difficult compared with a case where learning is performed using the two-dimensional time-series data corresponding to image signals and arms signals.

Thus, it is desired to learn dynamics using only time-series data of dimensions that are to be considered in learning instead of using time-series data of all the dimensions obtained.

However, although it is possible to determine in advance time-series data that is to be considered for each node in the case of supervised learning, this is not possible in the case of unsupervised learning.

Thus, on the basis of time-series data supplied from the feature extractor 13, the learning unit 14 determines weight coefficients for individual dimensions of time-series data input to a dynamical-system approximation model (hereinafter referred to as input weights) and weight coefficients for individual dimensions of time-series data output from the dynamical-system approximation model (hereinafter referred to as output weights) so that input weights and output weights for dimensions that are to be considered in learning are higher than the other weights.

Thus, time-series data that are input and output are weighted so that dynamics can be learned on the basis of only time-series data that is to be considered among all the time-series data. Accordingly, multi-dimensional time-series data that is input can be used efficiently in learning.

Figure 4:
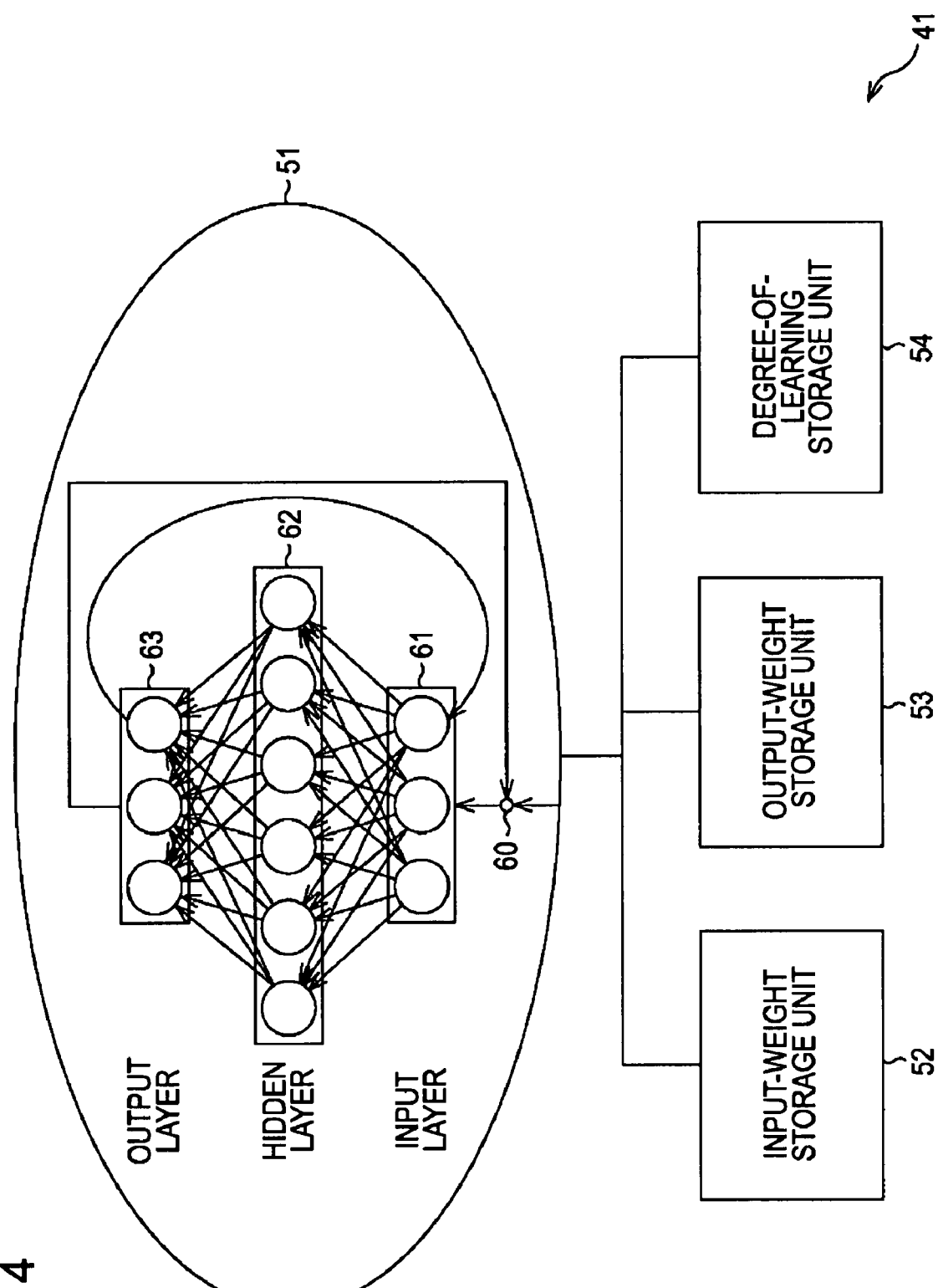
FIG. 4 is a diagram showing an example of a node.

FIG. 4 is a diagram showing details of one node 41 in the dynamics storage network stored in the network storage unit 15.

The node 41 includes a dynamical-system approximation model 51 having internal-state quantities, an input-weight storage unit 52, an output-weight storage unit 53, and a degree-of-learning storage unit 54.

The dynamical-system approximation model 51 is an RNN formed of an adder 60, an input layer 61, a hidden layer 62, and an output layer 63. The adder 60 adds together a state vector $X_t$ at time t in the time-series data corresponding to newly observed observation signals, supplied from the learning unit 14, and output data output from the output layer 63 in an immediately preceding iteration, i.e., output data representing a predictive value of a state vector at time t−1 in the time-series data, on a dimension-by-dimension basis by ratios based on the input weights used in learning for the individual dimensions (hereinafter referred to as learning input weights). Then, the adder 60 inputs the resulting data for the individual dimensions to the units of the input layer 61 as learning data at time t.

The learning data at time t, input to the individual units of the input layer 61, is output from the output layer 63 via the hidden layer 62. More specifically, a predetermined calculation is performed on the basis of the learning data at time t, input to the individual units of the input layer 61, and weights assigned to connections between the individual units of the input layer 61 and the individual units of the hidden layer 62 (hereinafter referred to as connection weights). Furthermore, a predetermined calculation is performed on the basis of data obtained as a result of the calculation and connection weights between the individual units of the hidden layer 62 and the individual units of the output layer 63, and data obtained as a result of the calculation is output from the output layer 63 as output data.

Using the output data output from the output layer 63, the learning unit 14 updates the connection weights of the dynamical-system approximation model 51 as parameters by a degree represented by the degree information stored in the degree-of-learning storage unit. That is, the dynamical-system approximation model 51 learns dynamics representing a time-series pattern of the learning data input to the units of the input layer 61, by a degree represented by the degree information stored in the degree-of-learning storage unit 54.

The learning performed by the learning unit 14 is online learning. That is, each time observation signals 11 are input, the learning unit 14 updates the parameters of the dynamical-system approximation model 51 little by little on the basis of learning data associated with the observation signals 11.

The input-weight storage unit 52 stores learning input weights supplied from the learning unit 14, input weights input from the recognition unit 16 and used for recognition (hereinafter referred to as recognition input weights), and input weights input from the generation unit 19 and used for generation (hereinafter referred to as generation input weights). The adder 60 adds together a state vector $X_t$ at time t in the time-series data supplied from the learning unit 14 and output data output from the output layer 63 in an immediately preceding iteration, on a dimension-by-dimension basis by ratios based on the learning input weights. That is, the adder 60 weights the time-series data supplied from the learning unit 14 on the basis of the learning input weights. Weighting based on the recognition input weights and weighting based on the generation input weights will be described later mainly with reference to FIG. 16.

The output-weight storage unit 53 stores output weights supplied from the learning unit 14 and used for learning (hereinafter referred to as learning output weights), output weights supplied from the recognition unit 16 and used for recognition (hereinafter referred to as recognition output weights), and output weights supplied from the generation unit 19 and used for generation (hereinafter referred to as generation output weights). On the basis of the learning output weights, the learning unit 14 weights time-series data of the individual dimensions, output from the individual units of the output layer 63 of the dynamical-system approximation model 51. Weighting based on the learning input weights and the learning output weights will be described later in detail with reference to FIG. 5. Furthermore, weighting based on the recognition output weights and weighting based on the generation output weights will be described mainly with reference to FIG. 16.

The degree-of-learning storage unit 54 stores information representing a degree of learning of the parameters of the dynamical-system approximation model 51 (hereinafter referred to as degree information). As the degree information, for example, the number of iterations of repeated calculation in the BPTT method is used.

The learning unit 14 adjusts the degree of learning according to the degree information so that the degree by which the parameters of the dynamical-system approximation model 51 are affected by learning data is adjusted.

Next, weighting based on the learning input weights and the learning output weights will be described with reference to FIG. 5.

Figure 5:
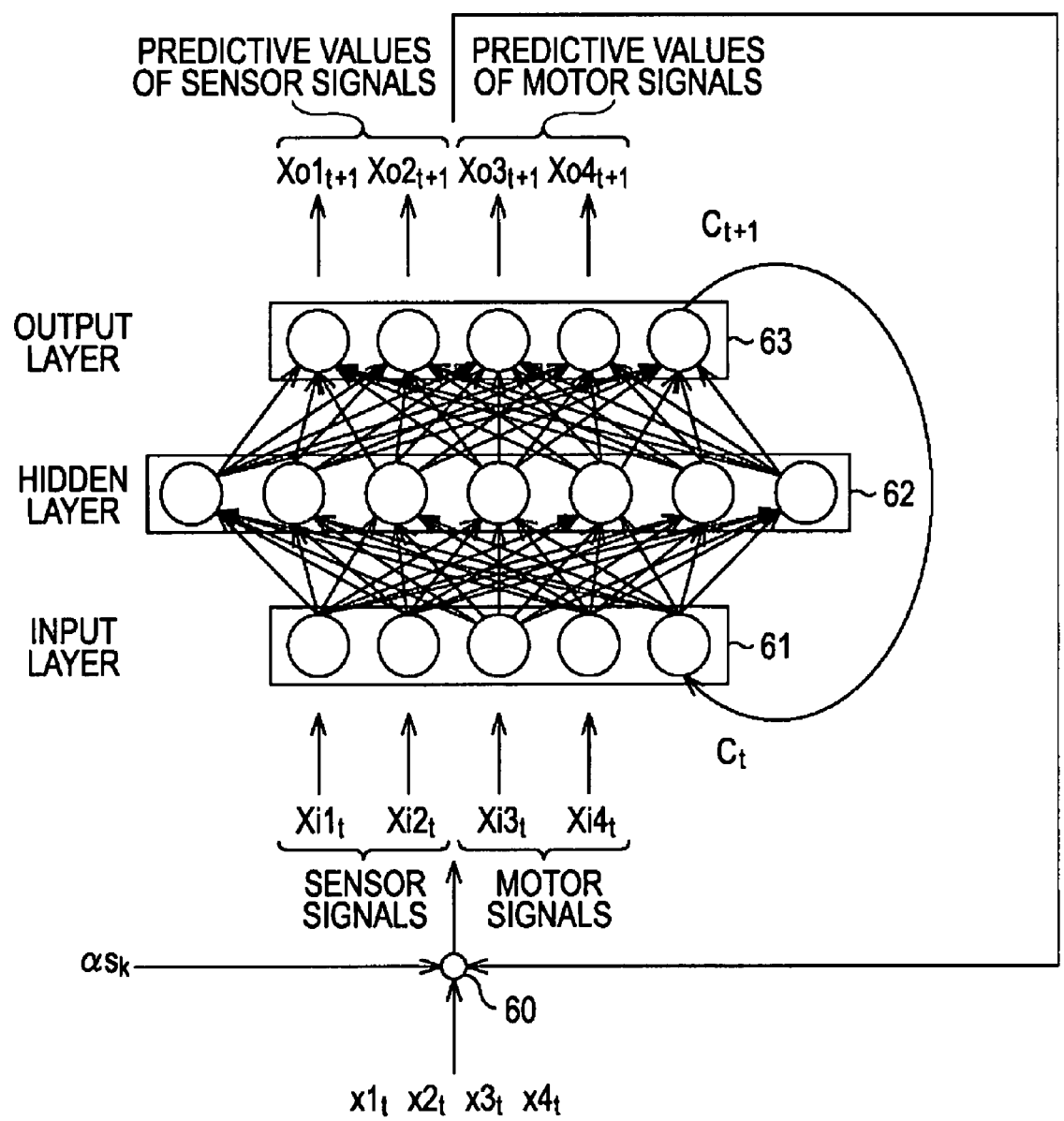
FIG. 5 is a diagram for explaining weighting.

In an example shown in FIG. 5, to the adder 60 of the dynamical-system approximation model 51, state vectors $x1_t$ and $x2_t$ at time t corresponding to sensor signals in the two-dimensional time-series data and state vectors $x3_t$ and $x4_t$ at time t corresponding to motor signals in the two-dimensional time-series data are input from the learning unit 14. That is, the adder 60 receives input of state vectors $x1_t$ to $x4_t$ at time t in the four-dimensional time-series data.

The adder 60 reads the learning input weights stored in the input-weight storage unit 52. Then, on the basis of the learning input weights, the adder 60 adds together the state vectors $x1_t$ to $x4_t$ input from the learning unit 14 and output data $Xo1_t$ to $Xo4_t$ representing predictive values of state vectors at time t, output in an immediately preceding iteration from the individual units of the output layer 63, according to equation (1) below, and inputs the resulting data to the input layer 61 as learning data.

$$Xik_t = \alpha s_k xk_t + (1-\alpha s_k) Xok_t \qquad (1)$$

In equation (1), $xk_t$, $Xik_t$, $Xok_t$, and $\alpha s_k$ ($0 \leq \alpha s_k \leq 1$) denote a state vector, input data input to the input layer, output data output from the output layer, and a learning input weight, respectively, associated with a k-th dimension (k=1, 2, 3, 4 in the example shown in FIG. 5).

According to equation (1), when the input weight $\alpha s_k$ is 1, only the state vector $xk_t$ from the learning unit 14 is input to the input layer 61. On the other hand, when the input weight $\alpha s_k$ is 0, only the output data $Xok_t$ is input to the input layer 61. Thus, by adjusting the value of the input weight $\alpha s_k$, it is possible to adjust the dimensions of time-series data that are to be considered in learning.

For example, when the input weights $\alpha s_1$ and $\alpha s_3$ are 1 and the inputs weights $\alpha s_2$ and $\alpha s_4$ are 0, of the state vectors $x1_t$ to $x4_t$ in the four-dimensional time-series data input to the adder 60, only the state vector $x1_t$ in the one-dimensional time-series data corresponding to the sensor signals and the state vector $x3_t$ in the one-dimensional time-series data corresponding to the motor signals are input to the input layer 61, so that learning is performed on the basis of only the state vectors $x1_t$ and $x3_t$.

In this case, the units of the input layer 61 associated with the state vectors $x2_t$ and $x4_t$ function similarly to context units of the input layer 61 connected via the feedback loop.

When the input weights $\alpha s_1$ to $\alpha s_4$ are all 0.5, learning is performed using the state vectors $x1_t$ to $x4_t$ in all the four-dimensional time-series data input to the adder 60, with equal weights. In this case, the adder 60 adds together the state vectors $x1_t$ to $x4_t$ and the immediately preceding output data $Xo1_t$ to $Xo4_t$ with equal weights according to equation (1), and inputs the results to the individual units of the input layer 61.

As described above, the time-series data of the individual dimensions, input from the learning unit 14, are weighted on the basis of the learning input weights $\alpha s_k$. Thus, dynamics can be learned efficiently by using only time-series data that is to be considered in learning among the input time-series data of the individual dimensions. This serves to reduce the load of learning.

The context units of the input layer 61 receive input of output data output from the context units of the output layer 63 in an immediately preceding iteration, as context $C_t$ at time t.

The learning unit 14 learns to predict and output state vectors at time t+1 on the basis of the state vectors $x1_t$ to $x4_t$ at time t. Thus, as a value of evaluation used for learning, the learning unit 14 uses a weighted-average square error E between predictive values and true values of state vectors at time t+1, calculated according to equation (2) below:

$$E = \frac{1}{2} \sum_{k=1}^{n} \beta s_i (Xok_{t+1} - xk_{t+1}) \qquad (2)$$

In equation (2), $\beta s_k$ ($0 \leq \beta s_k \leq 1$) denotes an output weight associated with a k-th dimension. n denotes the number of dimensions, which is 4 in the example shown in FIG. 5.

According to equation (2), a state vector $xk_{t+1}$ at time t+1 in the time-series data supplied from the learning unit 14 is used as a true value at time t+1, average square errors between the state vector $xk_{t+1}$ and the output data $Xok_{t+1}$ representing predictive values of a state vector at time t+1, i.e., the output data $Xok_{t+1}$ obtained by inputting the state vector $xk_t$ at time t of the immediately preceding iteration, are obtained for the individual dimensions, and the average square errors for the individual dimensions are added together using the output weights $\beta s_k$. Thus, by adjusting the values of the output weights $\beta s_k$, it is possible to adjust the dimensions of the output data that are to be considered as values of evaluation in learning.

For example, when the output weights $\beta s_1$ and $\beta s_3$ are 1 and the output weights $\beta s_2$ and $\beta s_4$ are 0, average square errors E obtained on the basis of the state vector $Xo1_t$ in the one-dimensional time-series data corresponding to sensor signals and the state vector $Xo3_t$ in the one-dimensional time-series data corresponding to motor signals among the output data $Xo1_{t+1}$ to $Xo4_{t+1}$ output from the individual units of the output layer 63 is used as a value of evaluation.

The learning unit 14 estimates parameters that minimize the average square error E obtained as described above, and updates parameters accordingly.

As described above, the learning unit 14 weights the average square error of the individual dimensions according to the learning output weights $\beta sk$. Thus, by using the resulting average square errors E as values of evaluation, learning can be performed using only values of evaluation obtained on the basis of only time-series data that is to be considered in learning among the output time-series data of the individual dimension. Accordingly, dynamics can be learned efficiently on the basis of time-series data of multiple dimensions.

Figure 6:
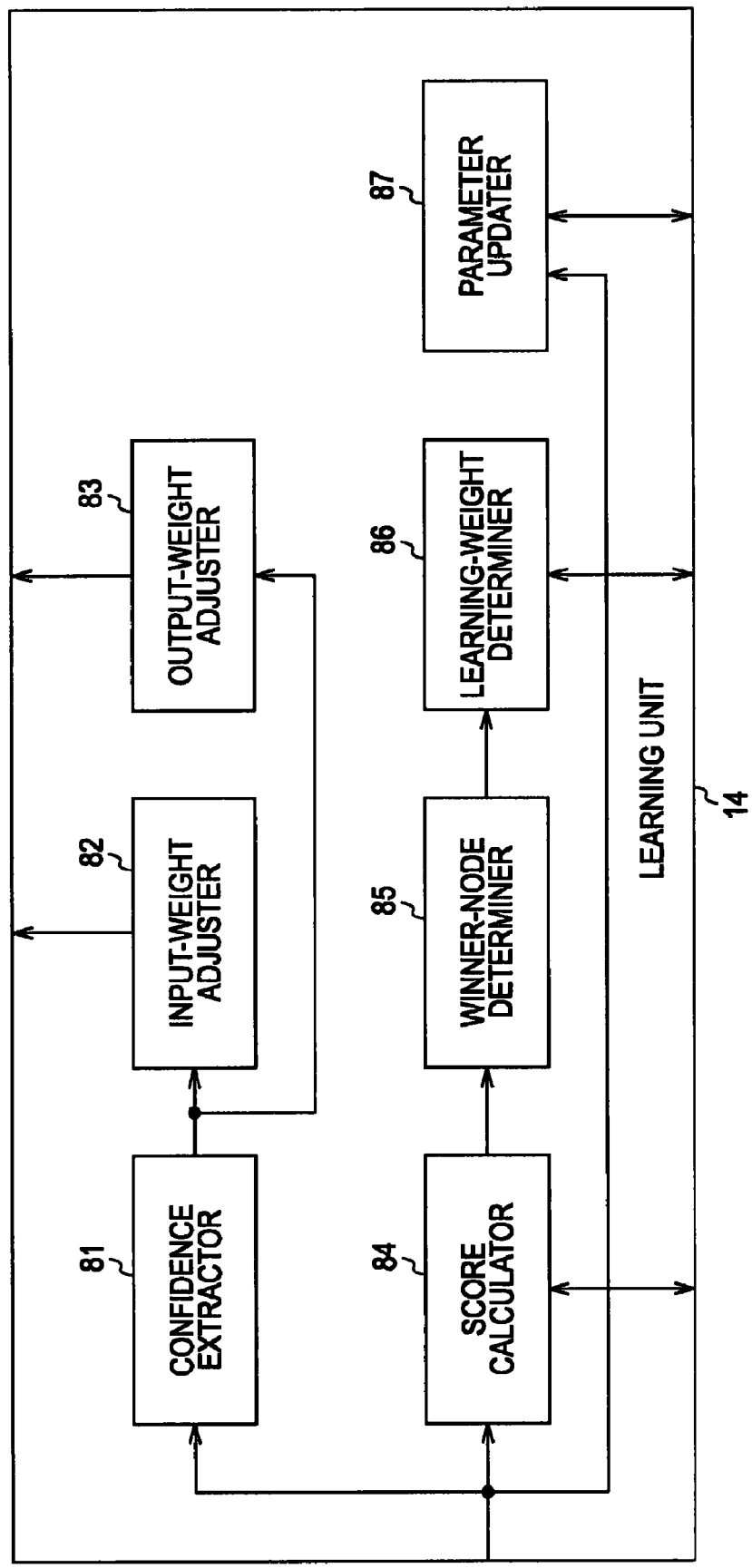
FIG. 6 is a block diagram showing an example of detailed configuration of a learning unit.

FIG. 6 is block diagram showing an example of detailed configuration of the learning unit 14 shown in FIG. 1.

The learning unit 14 includes a confidence extractor 81, an input-weight adjuster 82, an output-weight adjuster 83, a score calculator 84, a winner-node determiner 85, a learning-weight determiner 86, and a parameter updater 87. The learning unit 14 receives input of time-series data from the feature extractor 13 shown in FIG. 1, and the time-series data is supplied to the confidence extractor 81, the score calculator 84, and the parameter updater 87.

The time-series data input from the feature extractor 13 has attached thereto attached information representing confidences $\rho_k$ ($0 \leq \rho_k \leq 1$) of the individual dimensions. The confidence $\rho_k$ denotes the probability of observation of an observation signal 11 corresponding to time-series data of a k-th dimension. More specifically, the confidence $\rho_k$ becomes high when an observation signal 11 corresponding to the time-series data of the k-th dimension is observed, and the confidence $\rho_k$ becomes low when an observation signal 11 corresponding to the time-series data of the k-th dimension is not observed. The confidence $\rho_k$ is high when the value of the confidence $\rho_k$ is large, and the confidence $\rho_k$ is low when the value of the confidence $\rho_k$ is small.

For example, when the power of an audio signal obtained as an observation signal 11 is large, i.e., when sound is audible, the feature extractor 13 sets a value of 1 attached to time-series data of the dimension corresponding to the audio signal, and sets a value of 0 as the confidence $\rho_k$ when the power of the audio signal is small, i.e., when sound is not audible.

When the voltage of a motor signal obtained as an observation signal 11 is high, i.e., when the motor is operating, the feature extractor 13 sets a value of 1 attached to time-series data of a dimension corresponding to the motor signal, and sets a value of 0 as the confidence $\rho_k$ when the voltage of the motor signal is low, i.e., when the motor is not operating.

The method of determining the confidence $\rho_k$ is not limited to the method described above. For example, it is possible to measure or estimate the magnitude of a noise signal superposed on an observation signal corresponding to time-series data of each dimension, and to set a large value as the confidence $\rho$ attached to the time-series data when the noise signal is large and set a small value as the confidence $\rho$ attached to the time-series data when the noise signal is small.

The method of determining the confidence $\rho_k$ can be determined in accordance with factors such as the types of observation signals 11 input and the types of features extracted by the feature extractor 13.

The confidence extractor 81 extracts the confidences $\rho_k$ from the time-series data of the individual dimensions having attached thereto the confidences $\rho_k$ calculated in the manner described above, and supplies the confidences $\rho_k$ to the input-weight adjuster 82 and the output-weight adjuster 83.

On the basis of the confidences $\rho_k$ of the individual dimensions, supplied from the confidence extractor 81, the input-weight adjuster 82 adjusts the learning input weights $\alpha s_k$ stored in the input-weight storage unit 52 shown in FIG. 4, on a dimension-by-dimension basis. More specifically, on the basis of the confidences $\rho_k$, the input-weight adjuster 82 determines the learning input weights $\alpha s_k$ so that large learning input weights $\alpha s_k$ are assigned to dimensions with high confidences $\rho_k$ and so that small learning input weights $\alpha s_k$ are assigned to dimensions with low confidences $\rho_k$. The input-weight adjuster 82 then supplies the learning input weights $\alpha s_k$ that have been determined to the input-weight storage unit 52 so that the learning input weights $\alpha s_k$ are stored therein.

Similarly to the input-weight adjuster 82, on the basis of the confidences $\rho_k$ of the individual dimensions, supplied from the confidence extractor 81, the output-weight adjuster 83 adjusts the learning output weights $\beta s_k$ stored in the output-weight storage unit 53, on a dimension-by-dimension basis.

The score calculator 84 calculates a score, regarding the time-series data supplied from the feature extractor 13, for the dynamical-system approximation model 51 of each node 41 (FIG. 4) included in the dynamics storage network stored in the network storage unit 15 while updating the internal-state quantities.

More specifically, the score calculator 84 inputs time-series data to the adder 60 of the dynamical-system approximation model 51 of each node 41, and obtains output data associated with the input from the output layer 63 of the dynamical-system approximation model 51. The score calculator 84 calculates an average square error E according to equation (2) as a value of evaluation for each node 41. The score calculator 84 assigns the average square error E to the node 41 as a score.

For each node 41, the score calculator 84 determines an initial value $C_0$ of context representing internal-state quantities of the dynamical-system approximation model 51, and calculates a score while updating the context from the initial value $C_0$. As the initial value $C_0$, the score calculator 84 selects a value that minimizes the score among values obtained by successively updating a predetermined reference value according to equation (3) below:

$$C_{0,m}(s+1) = C_{0,m}(s) + \Delta C_{0,m}(s+1) \tag{3}$$

In equation (3), $C_{0,m}(s)$ denotes an initial value of context input to an m-th context unit and updated on an s-th iteration ($s = 0, 1, \ldots$). $\Delta C_{0,m}(s+1)$ denotes an amount of updating on an (s+1)-th iteration of updating of the initial value of context input to the m-th context unit, which is calculated according to equation (4) below:

$$\Delta C_{0,m}(s+1) = \eta \delta_{C0,m} + \gamma \Delta C_{0,m}(s) \tag{4}$$

In equation (4), $\eta$ denotes a learning coefficient, and $\gamma$ denotes an inertia coefficient. Furthermore, $d_{C0,m}$ denotes an amount of error of the initial value $C_{0,m}(s)$ of context, calculated by the BPTT method using the average square error E.

In the BPTT method, when the amount of error $d_c(t+1)$ of context $C_{t+1}$ at time t+1, input to the context units of the input layer 61, is back-propagated to the amount of error $d_c(t)$ of context $C_t$ at time t, output from the context units of the output layer 63, the time constant of context is adjusted by division by a certain positive factor m, as expressed in equation (5) below:

$$\delta_c(t) = \frac{1}{m} \delta_c(t+1) \tag{5}$$

By using equation (5) in the BPTT method, the degree of effect on context that is one time step ahead can be adjusted.

As the predetermined value used to determine initial values of context, i.e., the initial value $C_{0,m}(0)$, for example, a random value, or the last updated value of context obtained in the previous iteration of learning of the dynamical-system approximation model 51 can be used.

When it is known that learning data used for the current iteration of learning has no relationship with learning data used in the previous iteration of learning, for example, a random value can be used as the initial value $C_{0,m}(0)$.

On the other hand, when it is known that learning data used for the current iteration of learning has a certain relationship with learning data used in the previous iteration of learning, as in the case of continuous time-series data, for example, the last updated value can be used as the initial value $C_{0,m}(0)$. When the last updated value is used as the initial value $C_{0,m}(0)$, it is possible to use the last updated value as an initial value of context without updating.

The score calculator 84 supplies the scores assigned to the individual nodes 41 as results of score calculation to the winner-node determiner 85. The winner-node determiner 85 compares the scores of the individual nodes 41, supplied from the score calculator 84, and determines a node 41 with a smallest score as a winner node that best matches the learning data. Then, the winner-node determiner 85 supplies information identifying the winner node to the learning-weight determiner 86.

The learning-weight determiner 86 refers to the dynamics storage network stored in the network storage unit and calculates a distance d of each node 41 from the winner node identified by the information supplied from the winner-node determiner 85. Then, the learning-weight determiner 86 determines learning weights for the individual nodes 41 according to the distances d so that the learning weight is largest for the winner node and the learning weight decreases as the distance d from the winner node increases.

Furthermore, the learning-weight determiner 86 generates degree information for the individual nodes 41 on the basis of the learning weights. More specifically, the learning-weight determiner 86 generates degree information for the individual nodes 41 so that the degrees of learning for nodes 41 with large learning weights become high and so that the degrees of learning for nodes 41 with small learning weights become low. The learning-weight determiner 86 supplies the degree information to the degree-of-learning storage units 54 of the individual nodes 41 so that the degree information is stored therein.

Thus, the degrees of learning are adjusted so that learning is performed most intensely at the winner node and so that the degree of learning becomes weaker as the distance d from the winner node increases.

The parameter updater 87 reads the degree information for each node 41, stored in the degree-of-learning storage unit 54, and learns dynamics representing the time-series pattern of the learning data supplied from the feature extractor 13, by a degree indicated by the degree information.

More specifically, for each node 41, the parameter updater 87 inputs time-series data to the adder 60 of the node 41, and obtains output data associated with the input from the output layer 63 of the dynamical-system approximation model 51. Then, the score calculator 84 calculates an average square error as a value of evaluation for each node 41 according to equation (2).

On the basis of the average square error E, the time-series data, and the degree information, the parameter updater 87 repeatedly performs calculation of the BPTT method according to equation (6) below to update the parameters of the dynamical-system approximation model 51.

$$w_{i,j}(s+1)=w_{i,j}(s)+\Delta w_{i,j}(s+1) \quad (6)$$

In equation (6), $w_{i,j}(s)$ denotes a connection weight assigned to the connection between the units i and j and updated in an s-th iteration of repeated calculation (s=0, 1, . . . ). The updating according to equation (6) is repeated a number of times represented by the degree information. That is, s runs from 0 to a value obtained by subtracting 1 from the number of times represented by the degree information. $\Delta w_{i,j}(s+1)$ denotes an amount of updating of the connection weight $w_{i,j}$ in an (s+1)-th iteration, which is calculated according to equation (7) below:

$$\Delta w_{i,j}(s+1)=\eta \delta_{wij}+\gamma \Delta w_{i,j}(s) \quad (7)$$

In equation (7), $d_{wij}$ denotes an amount of error of the connection weight $w_{i,j}(s)$ obtained by the BPTT method using the average square error E.

As described above, the parameter updater 87 back-propagates errors by the BPTT method using the average square error E calculated on the basis of learning output weights $\beta s_k$, so that the dimensions of output data that are considered when back-propagating errors are adjusted on the basis of the learning output weights $\beta s_k$. That is, the dimensions of output data that are to be considered when updating parameters are adjusted on the basis of the learning output weights $\beta s_k$.

Furthermore, the parameter updater 87 performs learning on the basis of learning weights adjusted so that learning is performed most intensely at a winner node and so that the degree of learning becomes weaker as the distance d from the winner node increases, i.e., the parameter updater 87 performs competing-neighbor learning of the nodes 41. Thus, a large number of dynamics can be learned in a self-organizing manner.

Next, a learning process in which the information processing apparatus 1 shown in FIG. 1 learns a dynamics storage network will be described with reference to FIG. 7. The learning process is started when the information processing apparatus 1 shown in FIG. 1 powered on.

First, in step S1, the parameter updater 87 (FIG. 5) of the learning unit 14 initializes the parameters of the dynamics storage network stored in the network storage unit 15. More specifically, as initial values, the parameter updater 87 assigns appropriate values to the parameters of the dynamical-system approximation model 51 of each node 41 of the dynamics storage network.

After step S1, the process proceeds to step S2. In step S2, the signal input unit 12 shown in FIG. 1 obtains observation signals 11 and supplies the observation signals 11 to the feature extractor 13. The process then proceeds to step S3. In step S3, the feature extractor 13 extracts features of the observation signals 11 in time-series on a dimension-by-dimension basis, and supplies the resulting time-series data of the individual dimensions to the confidence extractor 81, the score calculator 84, and the parameter updater 87 of the learning unit 14 as learning data. At this time, the feature extractor 13 attaches confidences $\rho_k$ for the individual dimensions to the time-series data.

After step S3, the process proceeds to step S4. In step S4, the confidence extractor 81 extracts the confidences $\rho_k$ attached to the time-series data of the individual dimensions, supplied from the feature extractor 13, and supplies the confidences $\rho_k$ to the input-weight adjuster 82 and the output-weight adjuster 83. The process then proceeds to step S5.

In step S5, on the basis of the confidences $\rho_k$ supplied from the confidence extractor 81, the input-weight adjuster 82 adjusts the learning input weights $\alpha s_k$ stored in the input-weight storage unit 52 of each node 41. The process then proceeds to step S6.

In step S6, similarly to the input-weight adjuster 82, on the basis of the confidences $\rho_k$ supplied from the confidence extractor 81, the output-weight adjuster 83 adjusts the learning output weights $\beta s_k$ stored in the output-weight storage unit 53 of each node 41. The process then proceeds to step S7.

In step S7, regarding the learning data supplied from the feature extractor 13, the score calculator 84 calculates a score for the dynamical-system approximation model 51 of each node 41 included in the dynamics storage network stored in the network storage unit 15 while updating the internal-state quantities. The score calculator 84 supplies the scores assigned to the individual nodes 41 as results of score calculation to the winner-node determiner 85.

After step S7, the process proceeds to step S8. In step S8, the winner-node determiner 85 compares the scores of the individual nodes 41, supplied from the winner-node determiner 85, and determines a node with a smallest score as a winner node. Then, the winner-node determiner 85 supplies information identifying the winner node to the learning-weight determiner 86.

After step S8, the process proceeds to step S9. In step S9, the learning-weight determiner 86 refers to the dynamics storage network stored in the network storage unit 15, and determines a learning weight for each node 41 on the basis of the distance d from the winner node.

After step S9, the process proceeds to step S10. In step S10, the learning-weight determiner 86 generates degree information of each node 41 on the basis of the learning weight of the node 41, and supplies the degree information to the degree-of-learning storage unit 54 of the node 41 so that the degree information is stored therein.

After step S10, the process proceeds to step S11. In step S11, for each node 41, the parameter updater 87 repeatedly performs calculation according to the BPTT method on the basis of the learning data supplied from the feature extractor 13 and the degree information, thereby updating the parameters of the dynamical-system approximation model 51. The process then returns to step S2, and the subsequent steps are repeated. In this manner, dynamics are learned by the degree represented by the degree information.

Figure 8:
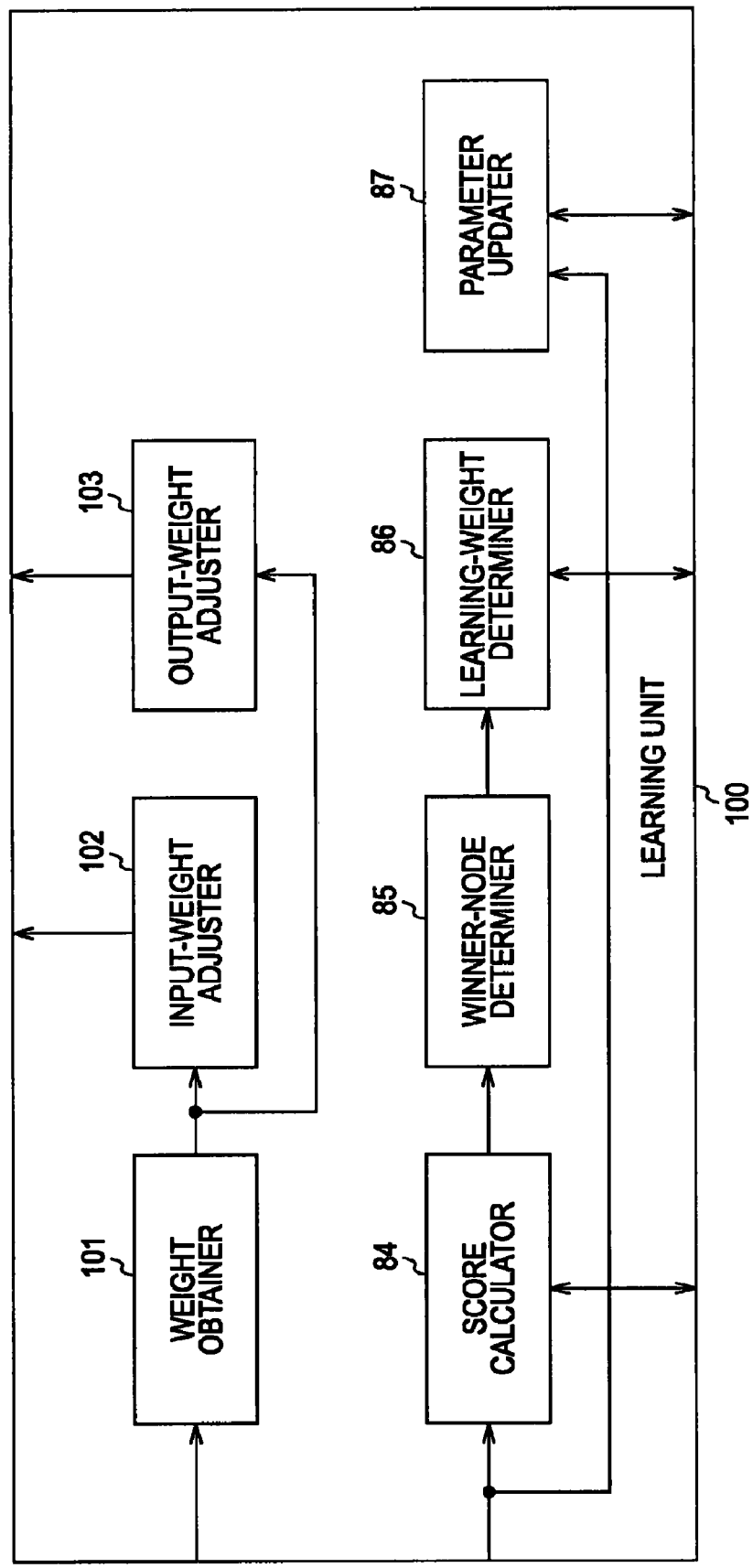
FIG. 8 is a block diagram showing another example of detailed configuration of a learning unit.

FIG. 8 is a block diagram showing another example of detailed configuration of the learning unit shown in FIG. 1.

A learning unit 100 includes a weight obtainer 101, an input-weight adjuster 102, and an output-weight adjuster 103 instead of the confidence extractor 81, the input-weight adjuster 82, and the output-weight adjuster 83.

That is, in the example shown in FIG. 8, confidences $\rho_k$ of the individual dimensions are not attached to time-series data input from the feature extractor 13, and learning input weights $\alpha s_k$ and learning output weights $\beta s_k$ are input directly from outside.

The weight obtainer 101 obtains the learning input weights $\alpha s_k$ and the learning output weights $\beta s_k$ input from outside. Then, the weight obtainer 101 supplies the learning input weights $\alpha s_k$ to the input-weight adjuster 102 and supplies the learning output weights $\beta s_k$ to the output-weight adjuster 103.

The input-weight adjuster 102 stores the learning input weights $\alpha s_k$ supplied from the weight obtainer 101 in the input-weight storage unit 52, thereby adjusting the learning input weights $\alpha s_k$.

Similarly to the input-weight adjuster 102, the output-weight adjuster 103 stores the learning output weights $\beta s_k$ supplied from the weight obtainer 101 in the output-weight storage unit 53, thereby adjusting the learning output weights $\beta s_k$.

Figure 9:
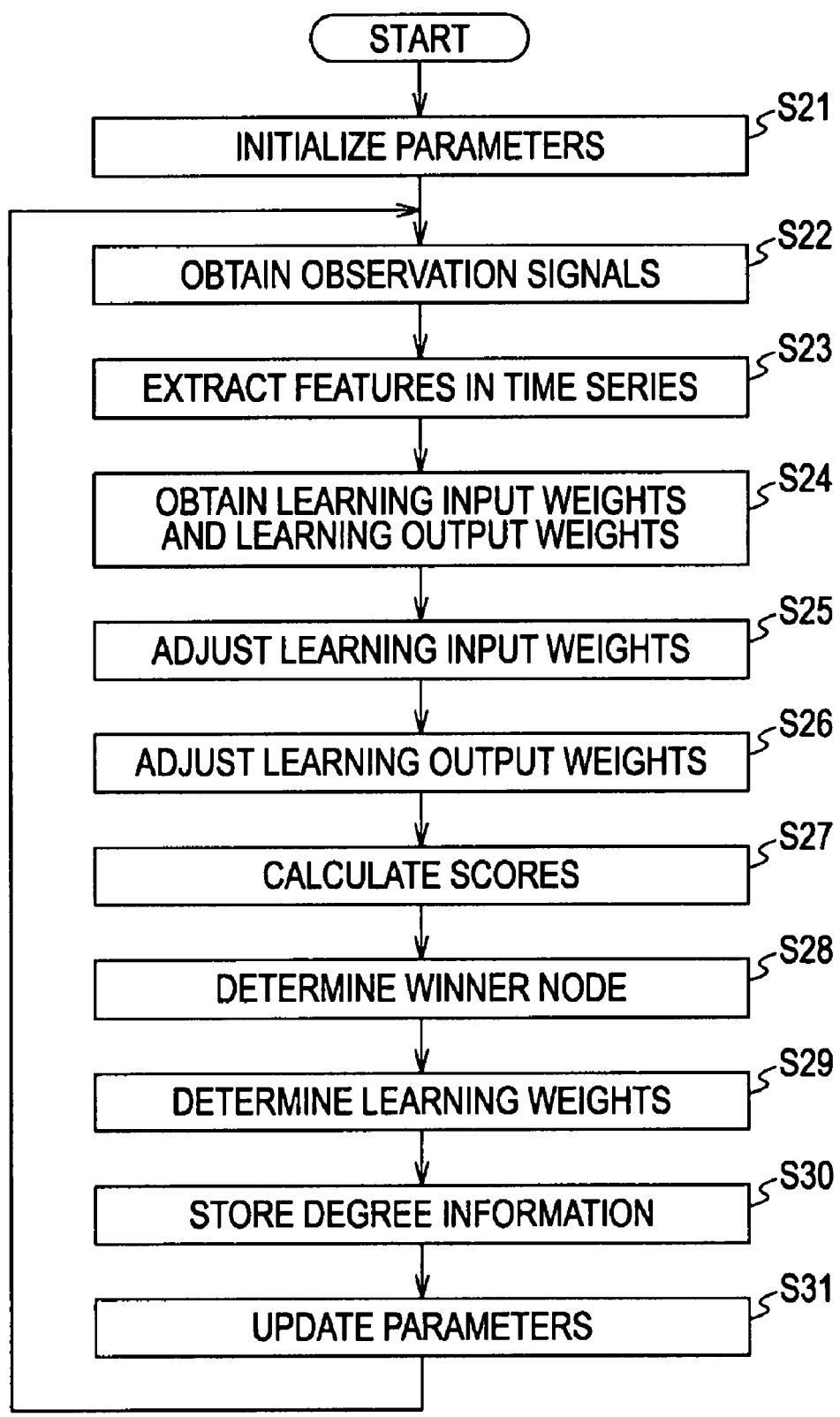
FIG. 9 is a flowchart of another learning process.

Next, a learning process in which an information processing apparatus including the learning unit 100 shown in FIG. 8 learns a dynamics storage network will be described with reference to FIG. 9. The learning process is started, for example, when the information processing apparatus is powered on.

First, in step S21, the parameter updater 87 (FIG. 8) of the learning unit 100 initializes the parameters of the dynamics storage network stored in the network storage unit 15. More specifically, as initial values, the parameter updater 87 assigns appropriate values to the parameters of the dynamical-system approximation model 51 of each node 41 in the dynamics storage network.

After step S21, the process proceeds to step S22. In step S22, the signal input unit 12 obtains observation signals 11 and supplies the observation signals 11 to the feature extractor 13. Then, in step S23, the feature extractor 13 extracts features of the observation signals 11 in time series on a dimension-by-dimension basis, and supplies the resulting time-series data of the individual dimensions to the score calculator 84 and the parameter updater 87 of the learning unit 14 as learning data.

After step S23, the process proceeds to step S24. In step S24, the weight obtainer 101 obtains the learning input weights $\alpha s_k$ and the learning output weights $\beta s_k$ input from outside. Then, the weight obtainer 101 supplies the learning input weights $\alpha s_k$ to the input-weight adjuster 102 and supplies the learning output weights $\beta s_k$ to the output-weight adjuster 103.

After step S24, the process proceeds to step S25. In step S25, the input-weight adjuster 102 stores the learning input weights $\alpha s_k$ supplied from the weight obtainer 101 in the input-weight storage unit 52, thereby adjusting the learning input weights $\alpha s_k$. The process then proceeds to step S26.

In step S26, similarly to the input-weight adjuster 102, the output-weight adjuster 103 stores the learning output weights $\beta s_k$ supplied from the weight obtainer 101 in the output-weight storage unit 53, thereby adjusting the learning output weights $\beta s_k$. The process then proceeds to step S27.

Steps S27 to S31 are executed correspondingly to steps S7 to S11 shown in FIG. 7, so that description thereof will be omitted.

Figure 10:
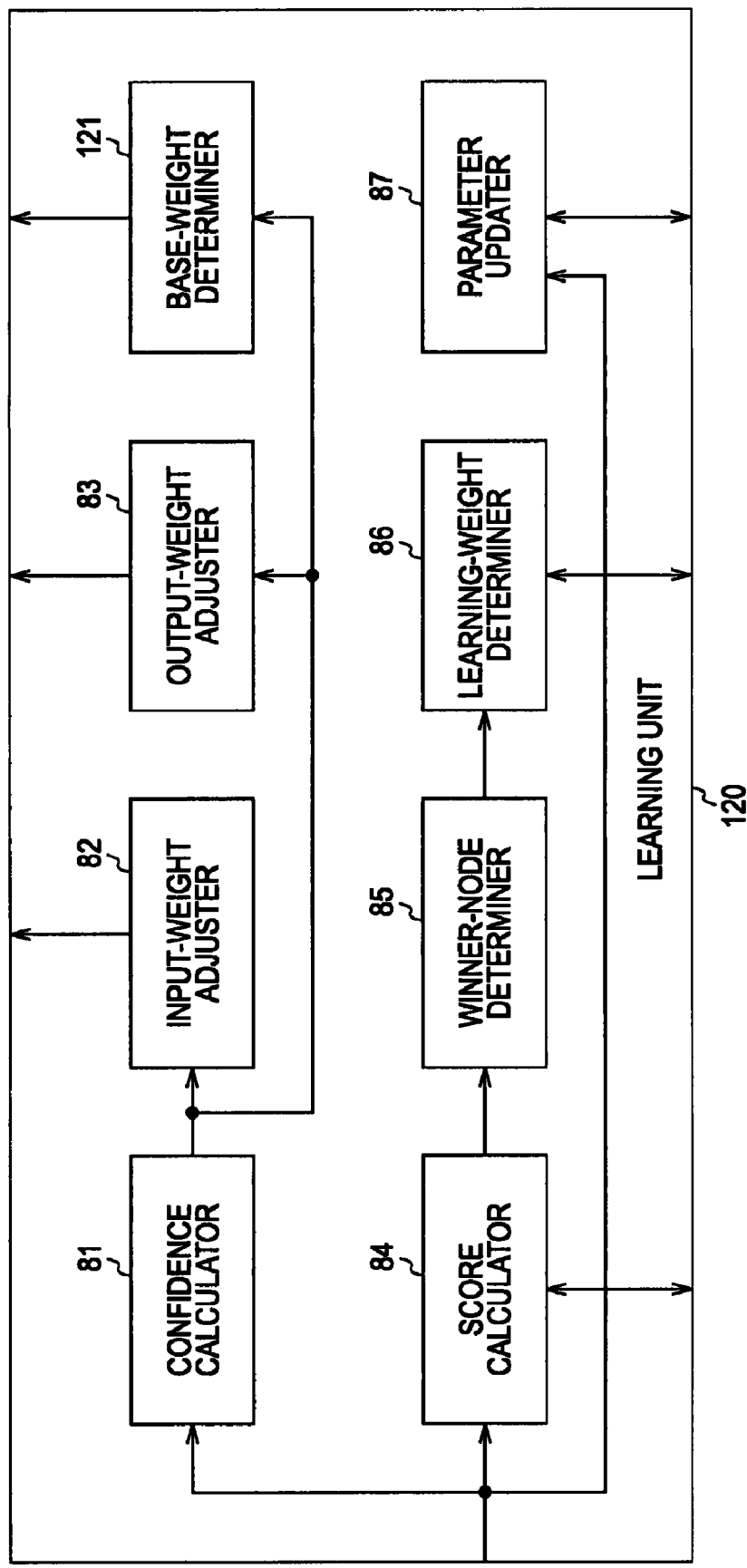
FIG. 10 is a block diagram showing yet another example of detailed configuration of a learning unit.

FIG. 10 is a block diagram showing yet another example of detailed configuration of the learning unit shown in FIG. 1.

Referring to FIG. 10, a learning unit 120 includes a base-weight determiner 121 in addition to the components of the learning unit 14 shown in FIG. 6.

The base-weight determiner 121 receives confidences $\rho_k$ of the individual dimensions from the confidence extractor 81. On the basis of the confidences $\rho_k$, the base-weight determiner 121 determines base weights $\omega_k$ ($0 \leq \omega_k \leq 1$) that serve as bases of input weights and output weights used for recognition and generation as will be described later. More specifically, the base-weight determiner 121 sets values of 1 as the base weights $\omega_k$ prior to starting learning, and updates the base weights $\omega_k$ according to equation (8) on the basis of the confidences $\rho_k$ supplied from the confidence extractor 81. Thus, the base weights $\omega_k$ are adjusted as learning proceeds.

$$\omega'_k = \omega_k + \Delta(\rho_k - \omega_k) \qquad (8)$$

In equation (8), $\omega'_k$ denotes an updated base weight, and $\Delta$ ($0 < \Delta < 1$) denotes a step size of change in the base weight $\omega_k$ by updating, which is chosen to be, for example, 0.05.

According to equation (8), when stationary values are continuously input as the confidences $\rho_k$ and the base weights $\omega_k$ are updated sufficiently, the base weights $\omega_k$ converge to the confidences $\rho_k$. That is, the base weights $\omega_k$ are adjusted so that base weights $\omega_k$ for dimensions that have high confidences $\rho_k$ and that are to be considered in learning have large values.

For example, the base weights $\omega_1$ and $\omega_3$ are 1 and the base weights $\omega_2$ and $\omega_4$ are 0 for a node 141 for which learning is performed using the state vectors $x1_t$ and $x3_t$ among the state vectors $x1_t$ and $x2_t$ at time t in the two-dimensional time-series data corresponding to sensor signals and the state vectors $x3_t$ and $x4_t$ at time t in the two-dimensional time-series data corresponding to motor signals.

The base-weight determiner 121 determines the updated base weights $\omega'_k$ as new base weights $\omega_k$, and supplies the new base weights $\omega_k$ to nodes 141 (described below with reference to FIG. 11) stored in the network storage unit 15 so that the new base weights $\omega_k$ are stored therein.

Figure 11:
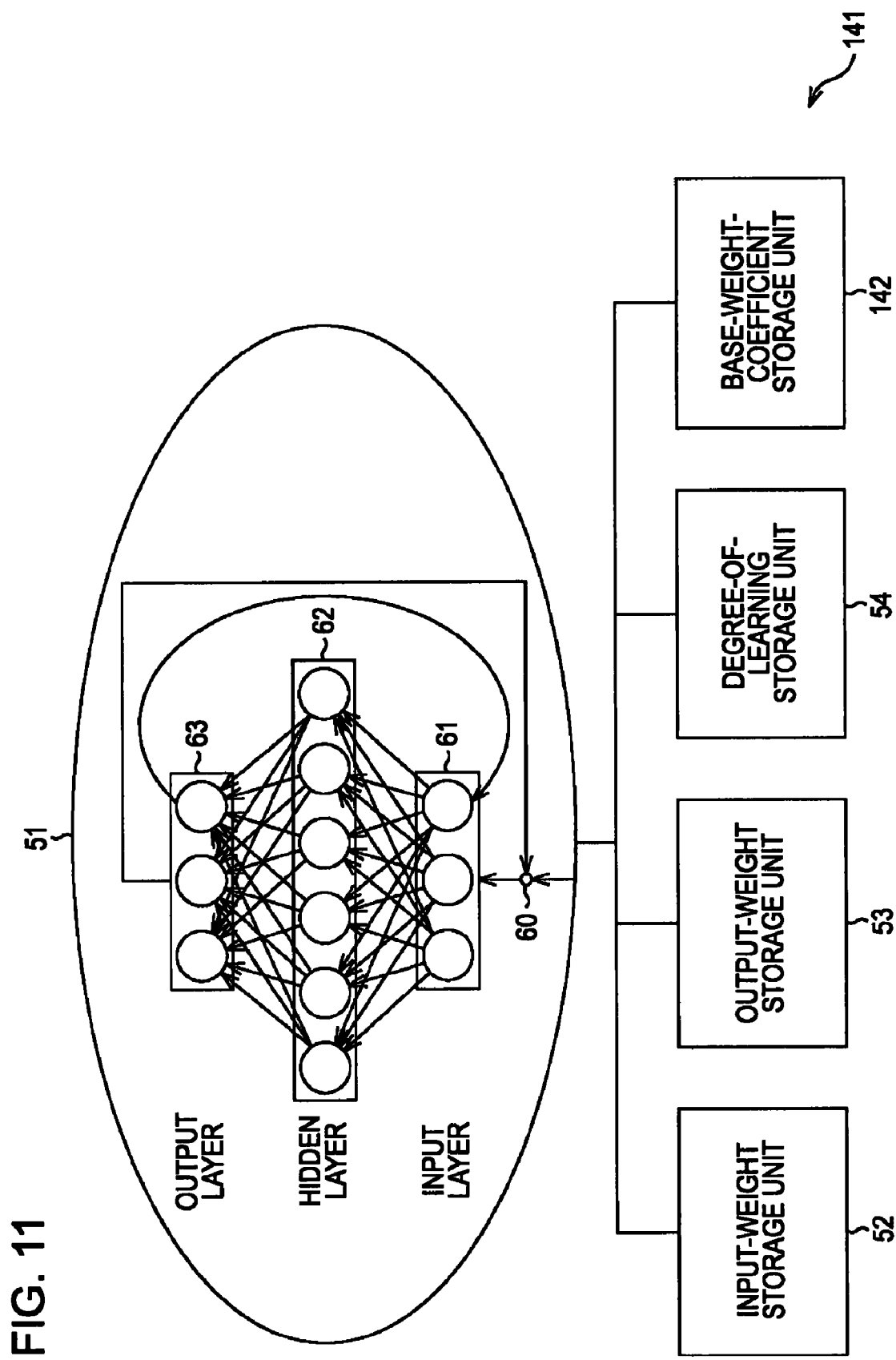
FIG. 11 is a diagram showing another example of a node.
Figure 12:
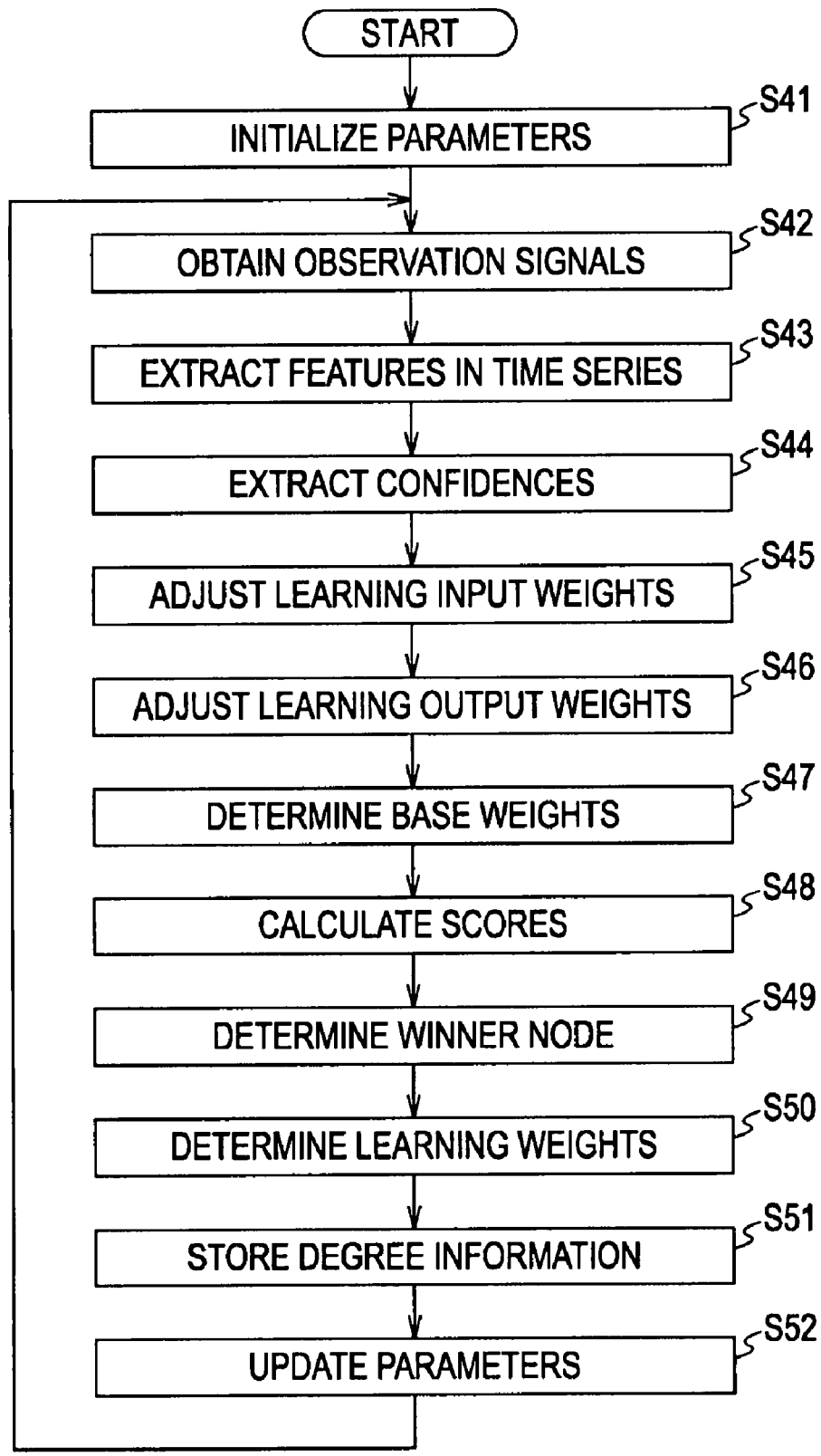
FIG. 12 is a flowchart of yet another learning process.

FIG. 11 is a diagram showing details of a node 141 in a case where base weights $\omega_k$ are stored.

Referring to FIG. 11, the node 141 includes the dynamical-system approximation model 51 having internal-state quantities, the input-weight storage unit 52, the output-weight storage unit 53, the degree-of-learning storage unit 54, and a base-weight storage unit 142. Parts corresponding to those shown in FIG. 4 are designated by the same numerals, and repeated description thereof will be refrained.

The base-weight storage unit 142 stores base weights $\omega_k$ of the individual dimensions, supplied from the base-weight determiner 121 shown in FIG. 10. The base weights $\omega_k$ are used to adjust input weights and output weights that are used for recognition and generation as will be described later.

Next, a learning process in which an information processing apparatus including the learning unit 120 shown in FIG. 10 learns a dynamics storage network will be described. The learning process is started, for example, when the information processing apparatus is powered on.

Steps S41 to S46 are executed correspondingly to steps S1 to S6 shown in FIG. 7, so that descriptions thereof will be omitted.

After step S46, the process proceeds to step S47. In step S47, the base-weight determiner 121 shown in FIG. 10 determines the base weights $\omega_k$ according to equation (8) on the basis of the confidences $\rho_k$ supplied from the confidence extractor 81. The process then proceeds to step S48.

Steps S48 to S52 are executed correspondingly to steps S7 to S11 shown in FIG. 7, so that description thereof will be omitted.

As described above, through weighting based on the learning input weights $\alpha s_k$ and the learning output weights $\beta s_k$, the information processing apparatus shown in FIG. 1 can learn dynamics efficiently, so that more stable learning can be achieved. Furthermore, by performing recognition and generation using a dynamics storage network having dynamics learned in the manner described above, more stable recognition and learning can be achieved.

Recognition and Generation

Figure 13:
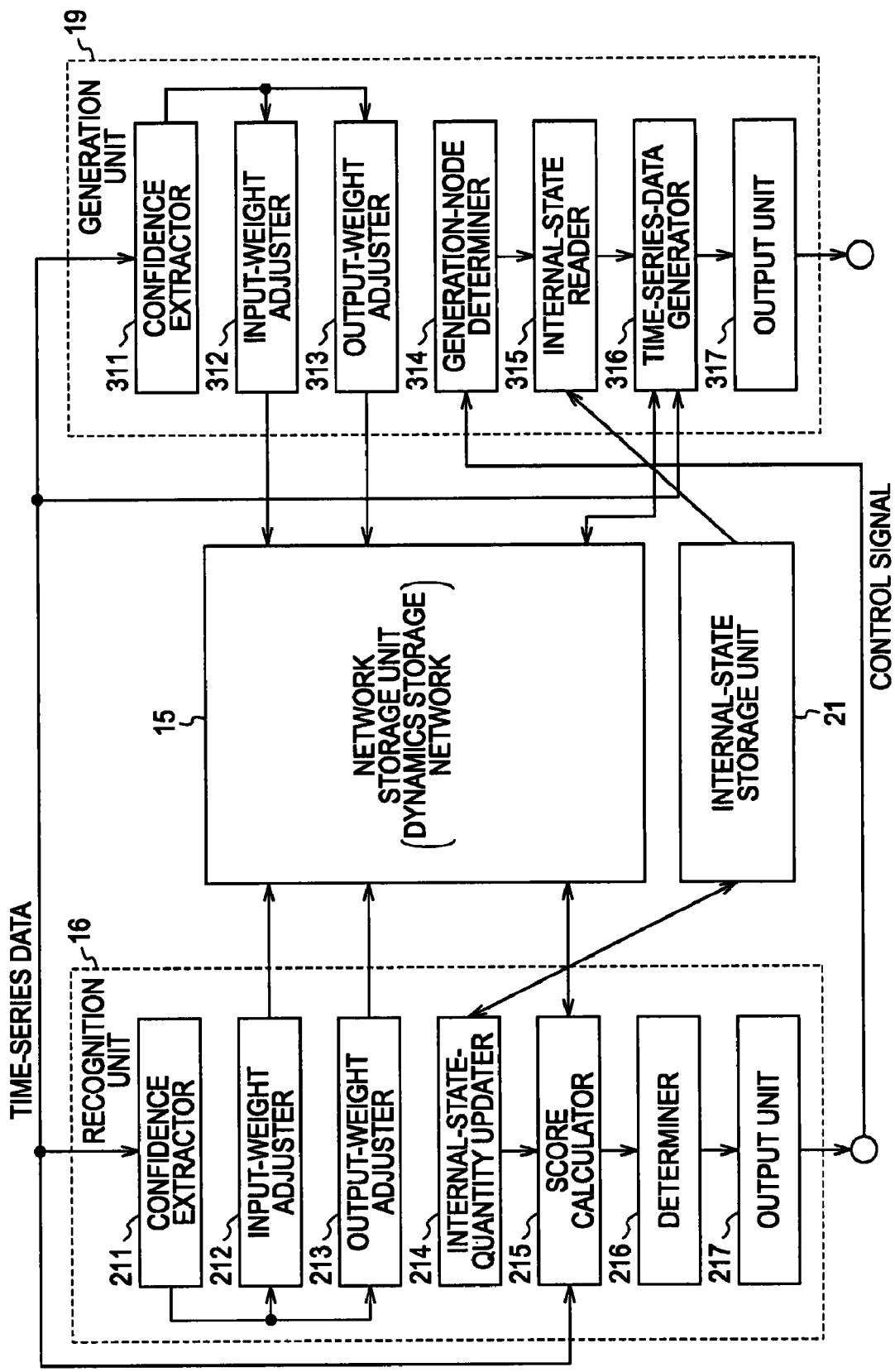
FIG. 13 is a block diagram showing an example of detailed configurations of a recognition unit and a generation unit.

FIG. 13 shows an example of detailed configurations of the recognition unit 16 and the generation unit 19 of the information processing apparatus 1 shown in FIG. 1.

The recognition and generation of time-series data refers to recognizing input time-series data and generating new time-series data on the basis of results of the recognition.

In the recognition and generation, for example, when a person issues a speech to a robot, motor signals for taking actions in response to the speech, parameter signals for generating synthetic speech in response to the speech, or the like are generated in the robot.

As shown in FIG. 13, the recognition unit 16 includes a confidence extractor 211, an input-weight adjuster 212, an output-weight adjuster 213, and internal-state-quantity updater 214, a score calculator 215, a determiner 216, and an output unit 217.

The time-series data output from the feature extractor 13 has attached thereto attached information representing confidences $\rho_k$ Of the individual dimensions.

The confidence extractor 211 extracts the confidences $\rho_k$ of the individual dimensions from the time-series data of the individual dimensions having the confidences $\rho_k$ attached thereto, and supplies the confidences $\rho_k$ to the input-weight adjuster 212 and the output-weight adjuster 213.

On the basis of the confidences $\rho_k$ supplied from the confidence extractor 211, the input-weight adjuster 212 adjusts input weights $\alpha r_k$ ($0 \leq \alpha r_k \leq 1$) used for recognition (hereinafter referred to as recognition input weights), stored in the input-weight storage unit 52 shown in FIG. 4. More specifically, on the basis of the confidences $\rho_k$, the input-weight adjuster 212 determines recognition input weights $\alpha r_k$ so that dimensions with high confidences $\rho_k$ have large recognition input weights $\alpha r_k$ and so that dimensions with low confidences $\rho_k$ have small recognition input weights $\alpha r_k$, and supplies the recognition input weights $\alpha r_k$ to the input-weight storage unit 52 so that the recognition input weights $\alpha r_k$ are stored therein.

Similarly to the input-weight adjuster 212, on the basis of the confidences $\rho_k$ supplied from the confidence extractor 211, the output-weight adjuster 213 adjusts output weights $\beta r_k$ ($0 \leq \beta r_k \leq 1$) used for recognition (hereinafter referred to as recognition output weights), stored in the output-weight storage unit 53.

The internal-state-quantity updater 214 reads the internal-state quantities that have been last updated and stored from the internal-state storage unit 21 into the dynamical-system approximation model 51 of each node 41 of the dynamics storage network. More specifically, the internal-state-quantity updater 214 reads the internal-state quantities from the internal-state storage unit 21 and supplies the internal-state quantities to the score calculator 215 as internal-state quantities of the dynamical-system approximation model 51 of each node 41.

Thus, in the dynamical-system approximation model 51, the internal-state quantities can be updated on the basis of the input time-series data using the values read by the internal-state-quantity updater 214 as initial values.

Furthermore, the internal-state-quantity updater 214 stores, in the internal-state storage unit 21, updated values of internal-state quantities (updated internal-state quantities) of each node 41 at the time of determination of a winner node by the determiner 216 and initial values of internal-state quantities of each node 41 at the time of determination of the winner node.

The updated values of the internal-state quantities stored in the internal-state storage unit 21 are read into the dynamical-system approximation model 51, and are used for a next iteration of score calculation. Furthermore, the initial values of internal-state quantities stored in the internal-state storage unit 21 are used for generation of time-series data by the generation unit 19.

Similarly to the score calculator 84, the score calculator 215 calculates a score, regarding the time-series data supplied from the feature extractor 13, of the dynamical-system approximation model 51 of each node 41 included in the dynamics storage network stored in the network storage unit 15 while updating the internal-state quantities.

More specifically, the score calculator 215 inputs the time-series data to the adder 60 of the dynamical-system approximation model 51 of each node 41, and obtains output data associated with the input from the output layer 63 of the dynamical-system approximation model 51. Similarly to the case of learning, the adder 60 assigns weights on the basis of the recognition input weights $\alpha r_k$ according to an equation corresponding to equation (1) with the learning input weights $\alpha s_k$ replaced by the recognition input weights $\alpha r_k$. Thus, by adjusting the recognition input weights $\alpha r_k$, it is possible to adjust the dimensions of time-series data that are to be considered in recognition.

Furthermore, the score calculator 215 calculates an average square error as a value of evaluation for each node 41 according to an equation corresponding to equation (2) with the learning output weights $\beta s_k$ replaced by the recognition output weights $\beta r_k$. Thus, by adjusting the recognition output weights $\beta r_k$, it is possible to adjust the dimensions of time-series data that are to be considered as a value of evaluation in recognition. The score calculator 215 assigns the average square error to the node 41 as a score.

For each node 41, the score calculator 215 calculates a score while determining an initial value $C_{0,m}$ of context representing internal-state quantities of the dynamical-system approximation model 51 and updating the context from the initial value $C_{0,m}$. As the initial value $C_{0,m}$, the score calculator 215 selects a value that minimizes the score among values obtained by successively updating a predetermined value according to equations (3) and (4) using an amount of error $d_{C0,m}$ obtained using the average square error obtained as a value of evaluation for recognition.

The score calculator 215 supplies the score assigned to each node 41 as a result of score calculation to the determiner 216. Furthermore, the score calculator 215 supplies the updated values and initial values of internal-state quantities of the node 41 at the time of assignment of the score to the internal-state-quantity updater 214 as the updated values and initial values of the internal-state quantities of the node 41 at the time of determination of a winner node.

As described above, time-series data input from the score calculator 215 is weighted on the basis of the recognition input weights $\alpha r_k$, and a weighted average error based on the recognition output weights $\beta r_k$ is used as a value of evaluation for recognition. Thus, recognition can be executed using only time-series data that is to be considered for recognition among the input time-series data. Accordingly, the load of processing for recognition can be reduced, so that recognition can be executed efficiently on the basis of multidimensional time-series data. Furthermore, the accuracy of recognition can be improved.

On the basis of the scores supplied from the score calculator 215, the determiner 216 determines a node with a smallest score as a winner node. That is, the determiner 216 selects dynamics associated with the winner node as dynamics that best match the time-series data input from the feature extractor 13. The determiner 216 supplies a signal identifying the winner node best matching the input time-series data to the output unit 217.

The output unit 217 outputs the signal identifying the winner node, supplied from the determiner 216, as a recognition result 17. In this manner, the recognition unit 16 recognizes the input time-series data. The recognition result 17 is used as a control signal 18 specifying a node 41 having dynamics that are to be used to generate time-series data.

The generation unit 19 shown in FIG. 13 includes a confidence extractor 311, an input-weight adjuster 312, an output-weight adjuster 313, a generation-node determiner 314, an internal-state reader 315, a time-series-data generator 316, and an output unit 317.

The confidence extractor 311 extracts confidences $\rho_k$ of the individual dimensions from time-series data of the individual dimensions having the confidences $\rho_k$ attached thereto, and supplies the confidences $\rho_k$ to the input-weight adjuster 312 and the output-weight adjuster 313.

The input-weight adjuster 312 adjusts input weights $\alpha g_k$ ($0 \leq \alpha g_k \leq 1$) used for generation (hereinafter referred to as generation input weights), stored in the input-weight storage unit 52 shown in FIG. 4, on the basis of the confidences $\rho_k$ supplied from the confidence extractor 311. More specifically, the input-weight adjuster 312 determines the generation input weights $\alpha g_k$ on the basis of the confidences $\rho_k$ so that large generation input weights $\alpha g_k$ are assigned to dimensions with high confidences $\rho_k$ and so that small generation input weights $\alpha g_k$ are assigned to dimensions with low confidences $\rho_k$, and supplies the generation input weights $\alpha g_k$ to the input-weight storage unit 52 so that the generation input weights $\alpha g_k$ are stored therein.

Similarly to the input-weight adjuster 312, the output-weight adjuster 313 adjusts output weights $\beta g_k$ ($0 \leq \beta g_k \leq 1$) used for generation (hereinafter referred to as generation output weights), stored in the output-weight storage unit 53, on the basis of the confidences $\rho_k$ supplied from the confidence extractor 311.

The generation-node determiner 314 receives input of the control signal 18, i.e., the recognition result 17 output from the output unit 217. On the basis of the control signal 18, the generation-node determiner 314 determines a generation node, i.e., a node 41 with which time-series data is to be generated. That is, the winner node determined by the determiner 216 is determined as a generation node. The generation-node determiner 314 supplies information identifying the generation node to the internal-state reader 315.

On the basis of the information supplied from the generation-node determiner 314, as initial values of internal-state quantities, the internal-state reader 315 reads the values stored in the internal-state storage unit 21 into the dynamical-system approximation model 51 of the generation node among the nodes 41 included in the dynamics storage network stored in the network storage unit 15.

That is, the internal-state reader 315 reads the initial values of internal-state quantities at the time of determination of the winner node by the recognition unit 16 among the values stored in the internal-state storage unit 21, and supplies the initial values of internal-state quantities to the time-series-data generator 316 as the internal-state quantities of the dynamical-system approximation model 51 of the generation node.

The time-series-data generator 316 receives time-series data supplied from the feature extractor 13. On the basis of the time-series data, the time-series-data generator 316 generates time-series data while updating the internal-state quantities.

More specifically, the time-series-data generator 316 inputs the time-series data to the adder 60 of the dynamical-system approximation model 51 of the generation node, and obtains output data associated with the input from the output layer 63 of the dynamical-system approximation model 51.

Similarly to the case of learning or recognition, the adder 60 assigns weights on the basis of the generation input weights $\alpha g_k$ according to an equation corresponding to equation (1) with the learning input weights $\alpha s_k$ replaced by the generation input weights $\alpha g_k$. Thus, by adjusting the generation input weights $\alpha g_k$, it is possible to adjust the dimensions of time-series data that are to be considered in generation.

Furthermore, the time-series-data generator 316 calculates an average square error as a value of evaluation for each node 41 according to an equation corresponding to equation (2) with the learning output weights $\beta s_k$ replaced by the generation output weights $\beta g_k$. Thus, by adjusting the generation output weights $\beta g_k$, it is possible to adjust the dimensions of time-series data that are to be considered as a value of evaluation in generation.

For each node 41, the time-series-data generator 316 outputs output data while determining an initial value $C_{0,m}$ of context representing internal-state quantities of the dynamical-system approximation model 51 and updating the context from the initial value $C_{0,m}$. As the initial value $C_{0,m}$, the time-series-data generator 316 selects a value that minimizes the score among values obtained by successively updating a predetermined value according to equations (3) and (4) using an amount of error $d_{C0,m}$ obtained using the average square error obtained as a value of evaluation for generation.

On the basis of the generation output weights $\beta g_k$, the time-series-data generator 316 generates time-series data by weighting the output data of the individual dimensions, obtained from the dynamical-system approximation model 51 of the generation node. That is, the time-series-data generator 316 generates time-series data of the individual dimensions by ratios corresponding to the generation output weights $\beta g_k$. Then, the time-series-data generator 316 supplies the time-series data to the output unit 317.

As described above, time-series data input from the feature extractor 13 is weighted on the basis of the generation input weights $\alpha g_k$, and output data output from the dynamical-system approximation model 51 is weighted on the basis of the generation output weights $\beta g_k$. Thus, time-series data can be generated using only time-series data that is to be considered for generation among input time-series data. Accordingly, it is possible to prevent generation of time-series data inconsistent with the time-series data input to the information processing apparatus 1.

The output unit 317 outputs the time-series data supplied from the time-series-data generator 316 as a generation result 20. In this manner, as the generation result 20, the generation unit 19 generates and outputs time-series data from the winner node determined through recognition by the recognition unit 16.

Next, a recognition process in which the recognition unit 16 shown in FIG. 13 recognizes time-series data will be described with reference to FIG. 14. The recognition process is started, for example, when time-series data is input from the feature extractor 13.

In step S71, the confidence extractor 211 extracts confidences $\rho_k$ of the individual dimensions from the time-series data of the individual dimensions having the confidences $\rho_k$ attached thereto, and supplies the confidences $\rho_k$ to the input-weight adjuster 212 and the output-weight adjuster 213.

After step S71, the process proceeds to step S72. In step S72, the input-weight adjuster 212 adjusts the recognition input weights $\alpha r_k$ used for recognition, stored in the input-weight storage unit 52 shown in FIG. 4, on the basis of the confidences $\rho_k$ supplied from the confidence extractor 211.

After step S72, the process proceeds to step S73. In step S73, similarly to the input-weight adjuster 212, the output-weight adjuster 213 adjusts the recognition output weights $\rho r_k$ used for recognition, stored in the output-weight storage unit 53, on the basis of the confidences $\rho_k$ supplied from the confidence extractor 211.

After step S73, the process proceeds to step S74. In step S74, the internal-state-quantity updater 214 reads the internal-state quantities that have been last updated and stored from the internal-state storage unit 21 into the dynamical-system approximation model 51 of each node 41 of the dynamics storage network.

After step S74, the process proceeds to step S75. In step S75, the score calculator 215 calculates a score, regarding the time-series data supplied from the feature extractor 13, of the dynamical-system approximation model 51 of each node 41 included in the dynamics storage network stored in the network storage unit 15 while updating the internal-state quantities.

The score calculator 215 supplies the score assigned to each node 41 as a result of score calculation to the determiner 216, and supplies the updated values and initial values of the internal-state quantities of the node 41 at the time of assignment of the score to the internal-state-quantity updater 214 as the updated values and initial values of the internal-state quantities of the node 41 at the time of determination of the winner node.

After step S75, the process proceeds to step S76. In step S76, the internal-state-quantity updater 214 stores in the internal-state storage unit 21 the updated values of the internal-state quantities of each node 41 at the time of determination of the winner node by the determiner 216 and the initial values of the internal-state quantities of each node 41 at the time of determination of the winner node, supplied from the score calculator 215.

After step S76, the process proceeds to step S77. In step S77, the determiner 216 determines a node with a smallest score as a winner node on the basis of the scores supplied from the score calculator 215. Then, the determiner 216 supplies a signal identifying the winner node to the output unit 217.

After step S77, the process proceeds to step S78. In step S78, the output unit 217 outputs the signal identifying the winner node, supplied from the determiner 216, as a recognition result 17. This concludes the recognition process.

Next, a generation process in which the generation unit 19 shown in FIG. 13 generates time-series data will be described with reference to FIG. 15. The generation process is started, for example, when a recognition result 17 output from the output unit 217 is input as a control signal 18.

In step S91, the confidence extractor 311 extracts confidences $\rho_k$ of the individual dimensions from the time-series data of the individual dimensions having the confidences $\rho_k$ attached thereto, and supplies the confidences $\rho_k$ to the input-weight adjuster 312 and the output-weight adjuster 313.

After step S91, the process proceeds to step S92. In step S92, on the basis of the confidences $\rho_k$ supplied from the confidence extractor 311, the input-weight adjuster 312 adjusts the generation input weights $\alpha g_k$ used for generation, stored in the input-weight storage unit 52 shown in FIG. 4.

After step S92, the process proceeds to step S93. In step S93, similarly to the input-weight adjuster 312, on the basis of the confidences $\rho_k$ supplied from the confidence extractor 311, the output-weight adjuster 313 adjusts the generation output weights $\beta g_k$ used for generation, stored in the output-weight storage unit 53.

After step S93, the process proceeds to step S94. In step S94, on the basis of the control signal 18, the generation-node determiner 314 determines a generation node, i.e., a node 41 with which time-series data is to be generated. Then, the generation-node determiner 314 supplies information identifying the generation node to the internal-state reader 315.

After step S94, the process proceeds to step S95. In step S95, on the basis of the information supplied from the generation-node determiner 314, the internal-state reader 315 reads the initial values of internal-state quantities stored in the internal-state storage unit 21 into the dynamical-system approximation model 51 of the generation node among the nodes 41 included in the dynamics storage network stored in the network storage unit 15.

After step S95, the process proceeds to step S96. In step S96, on the basis of the time-series data supplied from the feature extractor 13, the time-series-data generator 316 generates time-series data while updating the internal-state quantities. The time-series-data generator 316 supplies the time-series data generated to the output unit 317.

After step S96, the process proceeds to step S97. In step S97, the output unit 317 outputs the time-series data supplied from the time-series-data generator 316 as a generation result 20. This concludes the generation process.

Figure 16:
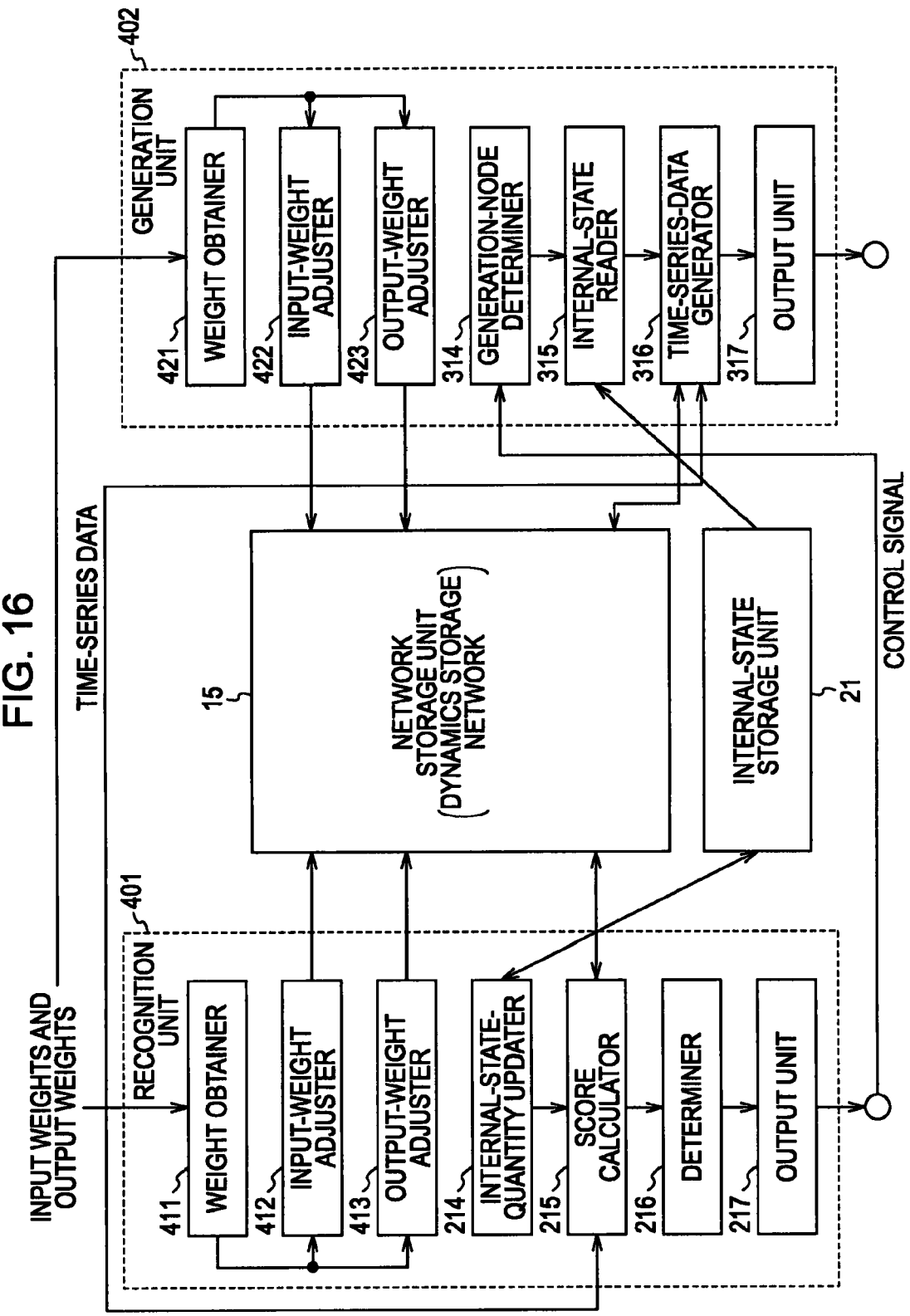
FIG. 16 is a block diagram showing another example of detailed configurations of a recognition unit and a generation unit.

FIG. 16 is a block diagram showing another example of detailed configurations of the recognition unit and the generation unit shown in FIG. 1.

A recognition unit 401 shown in FIG. 16 includes a weight obtainer 411, an input-weight adjuster 412, and an output-weight adjuster 413 instead of the confidence extractor 211, the input-weight adjuster 212, and the output-weight adjuster 213.

That is, in the example shown in FIG. 16, confidences $\rho_k$ of the individual dimensions are not attached to time-series data input from the feature extractor 13, and recognition input weights $\alpha r_k$ and recognition output weights $\beta r_k$ are input directly from outside.

The weight obtainer 411 obtains the recognition input weights $\alpha r_k$ and the recognition output weights $\beta r_k$ input from outside. Then, the weight obtainer 411 supplies the recognition input weights $\alpha r_k$ to the input-weight adjuster 412 and supplies the recognition output weights $\beta r_k$ to the output-weight adjuster 413.

The input-weight adjuster 412 stores the recognition input weights $\alpha r_k$ supplied from the weight obtainer 411 in the input-weight storage unit 52, thereby adjusting the recognition input weights $\alpha r_k$.

Similarly to the input-weight adjuster 412, the output-weight adjuster 413 stores the recognition output weights $\beta r_k$ supplied from the weight obtainer 411, thereby adjusting the recognition output weights $\beta r_k$.

A generation unit 402 shown in FIG. 16 includes a weight obtainer 421, an input-weight adjuster 422, and an output-weight adjuster 423 instead of the confidence extractor 311, the input-weight adjuster 312, and the output-weight adjuster 313. That is, in the example shown in FIG. 16, generation input weights $\alpha g_k$ and generation output weights $\beta g_k$ are input directly from outside.

The input-weight adjuster 412 obtains the generation input weights $\alpha g_k$ and the generation output weights $\beta g_k$ input from outside. Then, the weight obtainer 421 supplies the generation input weights $\alpha g_k$ to the input-weight adjuster 422, and supplies the generation output weights $\beta g_k$ to the output-weight adjuster 423.

The input-weight adjuster 422 stores the generation input weights $\alpha g_k$ supplied from the weight obtainer 421 in the input-weight storage unit 52, thereby adjusting the generation input weights $\alpha g_k$.

Similarly to the input-weight adjuster 422, the output-weight adjuster 423 stores the generation output weights $\beta g_k$ supplied from the weight obtainer 421 in the output-weight storage unit 53, thereby adjusting the generation output weights $\beta g_k$.

Figure 17:
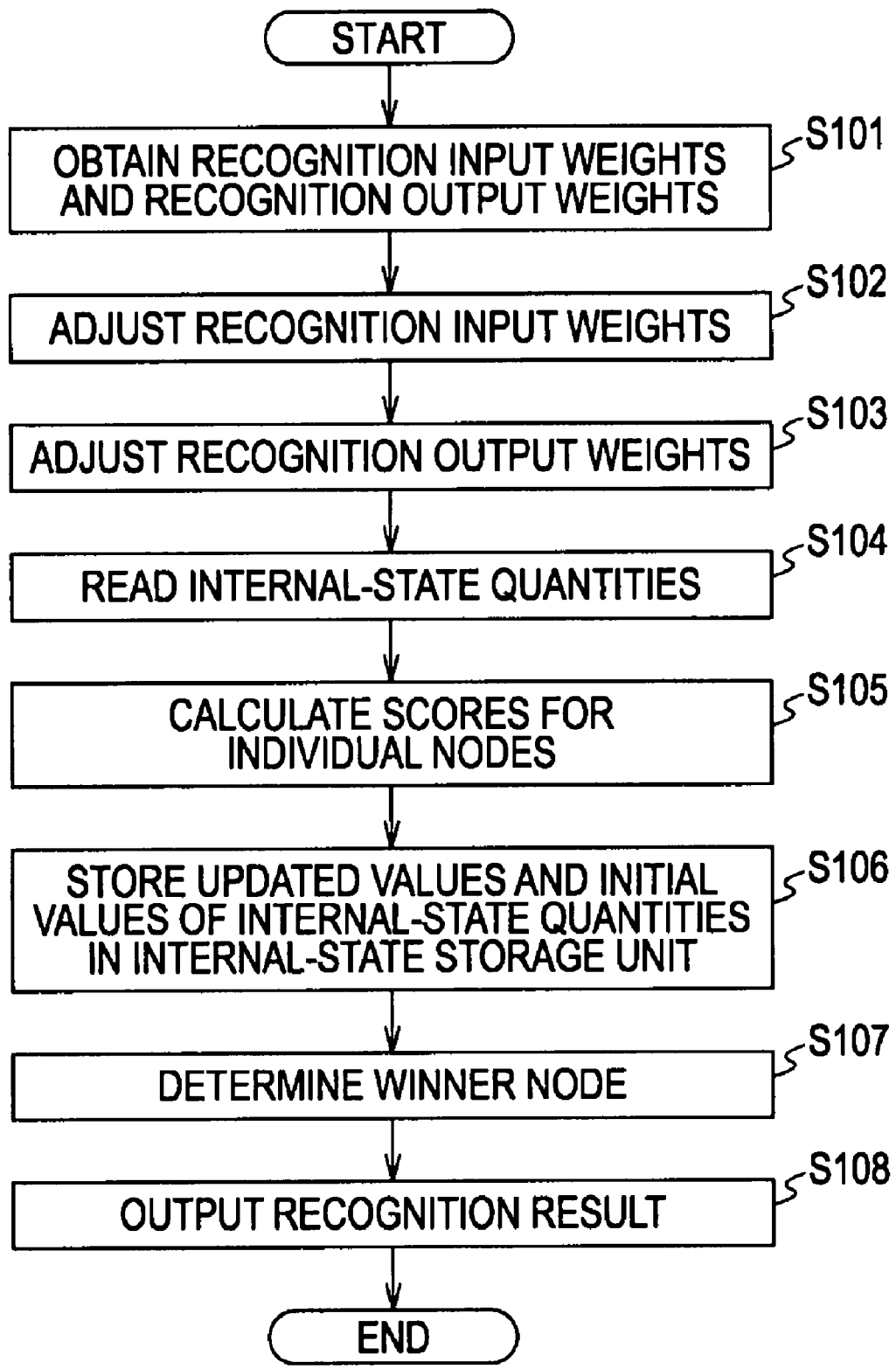
FIG. 17 is a flowchart of another recognition process.

Next, a recognition process in which the recognition unit 401 shown in FIG. 16 recognizes time-series data will be described with reference to FIG. 17. The recognition process is started, for example, when time-series data is supplied from the feature extractor 13.

In step S101, the weight obtainer 411 obtains recognition input weights $\alpha r_k$ and recognition output weights $\beta r_k$ input from outside. Then, the weight obtainer 411 supplies the recognition input weights $\alpha r_k$ to the input-weight adjuster 412, and supplies the recognition output weights $\beta r_k$ to the output-weight adjuster 413.

After step S101, the process proceeds to step S102. In step S102, the input-weight adjuster 412 stores the recognition input weights $\alpha r_k$ supplied from the weight obtainer 411 in the input-weight storage unit 52, thereby adjusting the recognition input weights $\alpha r_k$.

After step S102, the process proceeds to step S103. In step S103, similarly to the input-weight adjuster 412, the output-weight adjuster 413 stores the recognition output weights $\beta r_k$ supplied from the weight obtainer 411 in the output-weight storage unit 53, thereby adjusting the recognition output weights $\beta r_k$. The process then proceeds to step S104.

Figure 14:
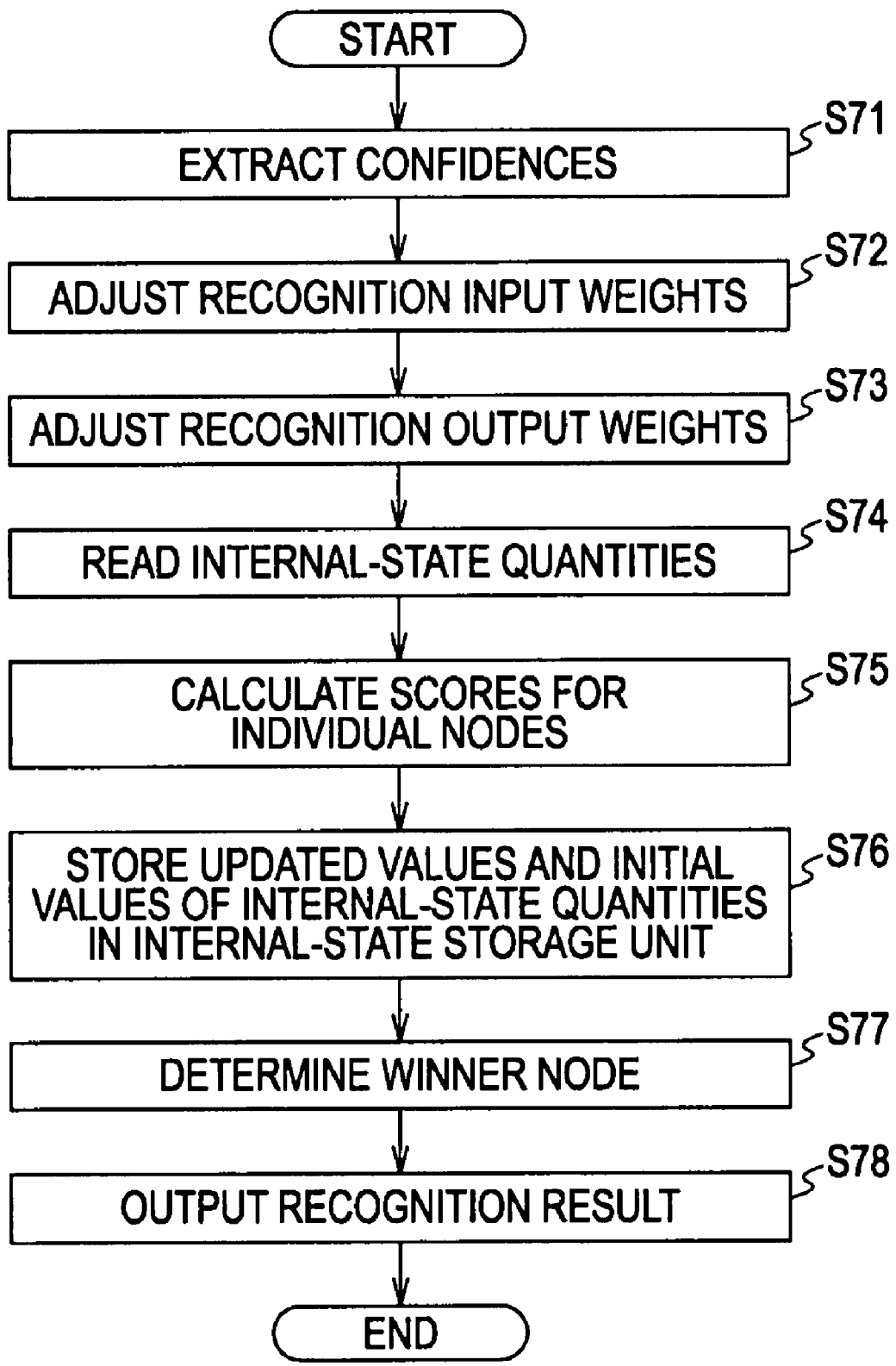
FIG. 14 is a flowchart of a recognition process.

Steps S104 to S108 are executed correspondingly to steps S74 to S78 shown in FIG. 14, so that description thereof will be omitted.

Figure 18:
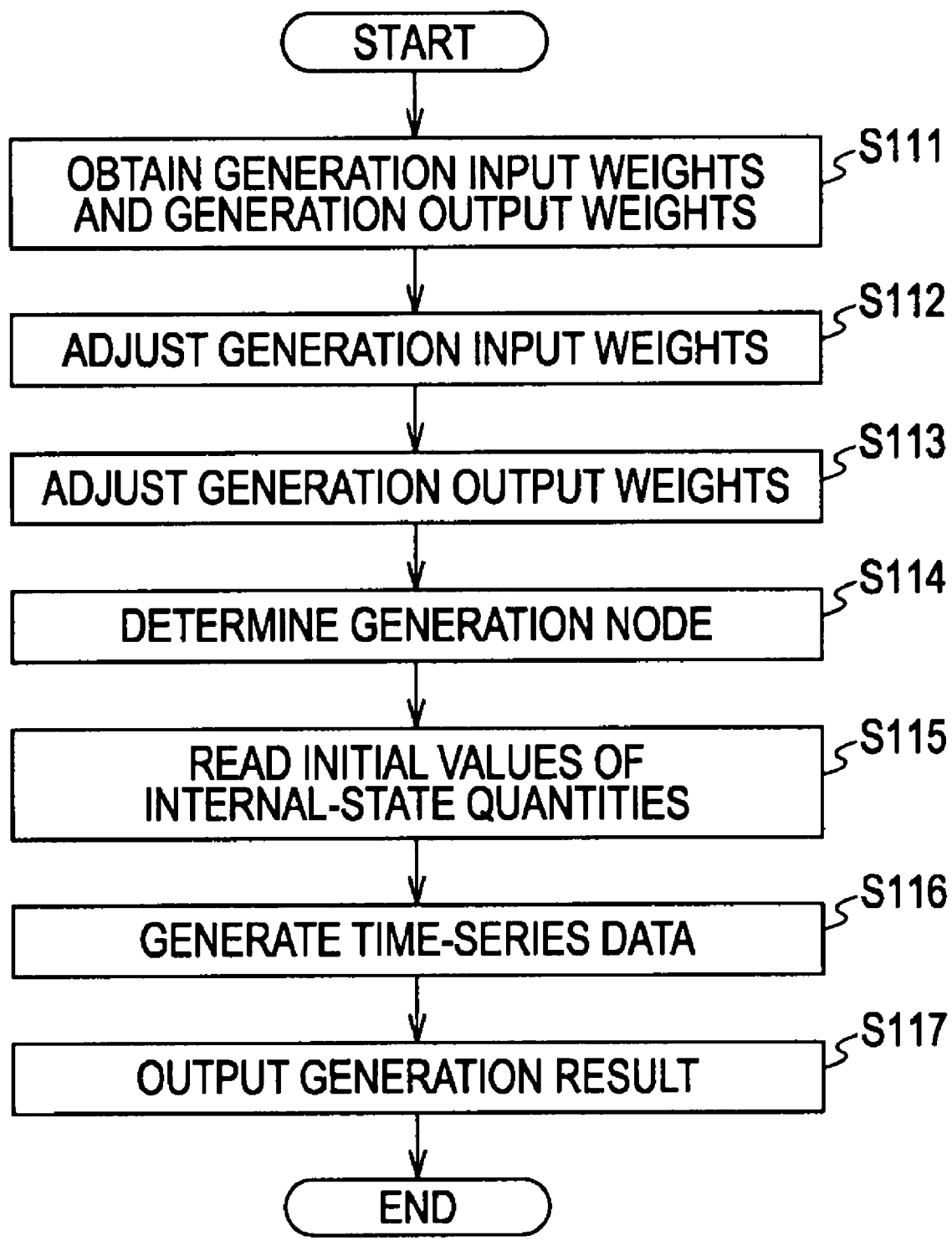
FIG. 18 is a flowchart of another generation process.

Next, a generation process in which the generation unit 402 shown in FIG. 16 generates time-series data will be described with reference to FIG. 18. The generation process is started, for example, when a recognition result 17 output from the output unit 217 is input as a control signal 18.

In step S111, the weight obtainer 421 obtains the generation input weights $\alpha g_k$ and the generation output weights $\beta g_k$ input from outside. Then, the weight obtainer 421 supplies the generation input weights $\alpha g_k$ to the input-weight adjuster 422 and supplies the generation output weights $\beta g_k$ to the output-weight adjuster 423.

After step S111, the process proceeds to step S112. In step S112, the input-weight adjuster 422 stores the generation input weights $\alpha g_k$ supplied from the weight obtainer 421 in the input-weight storage unit 52, thereby adjusting the generation input weights $\alpha g_k$.

After step S112, the process proceeds to step S113. In step S113, similarly to the input-weight adjuster 422, the output-weight adjuster 423 stores the generation output weights $\beta g_k$ supplied from the weight obtainer 421 in the output-weight storage unit 53, thereby adjusting the generation output weights $\beta g_k$. The process then proceeds to step S114.

Steps S114 to S117 are executed correspondingly to steps S94 to S97 shown in FIG. 15, so that description thereof will be omitted.

Figure 19:
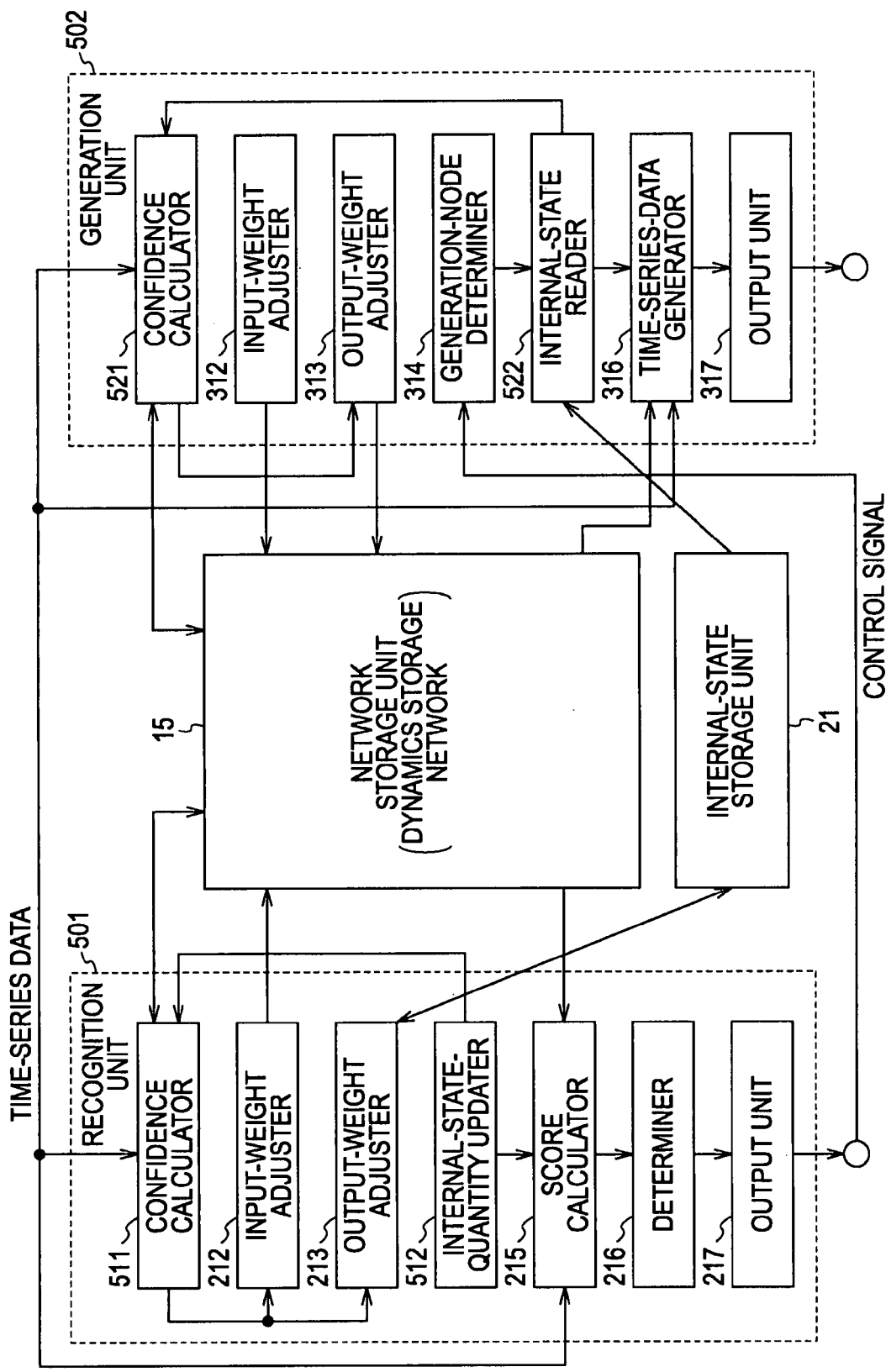
FIG. 19 is a block diagram showing another example of detailed configurations of a recognition unit and a generation unit.

FIG. 19 is a block diagram showing yet another example of detailed configurations of the recognition unit and the generation unit shown in FIG. 1.

A recognition unit 501 shown in FIG. 19 includes a confidence calculator 511 and an internal-state-quantity updater 512 instead of the confidence extractor 211 and the internal-state-quantity updater 214 shown in FIG. 13.

That is, in the example shown in FIG. 19, confidences $\rho_k$ of the individual dimensions are not attached to time-series data input from the feature extractor 13, and confidences $\rho_k$ of the input time-series data are calculated in the recognition unit 501.

The confidence calculator 511 receives time-series data of the individual dimensions, supplied from the feature extractor 13. The confidence calculator 511 calculates confidences $\rho_k$ of the individual dimensions on the basis of the time-series data of the individual dimensions and initial values of internal-state quantities supplied from the internal-state-quantity updater 512.

More specifically, the confidence calculator 511 inputs the time-series data of the individual dimensions to the adder 60 of the dynamical-system approximation model 51 of each node 41 of the dynamics storage network stored in the network storage unit 15, inputs context representing the initial values of internal-state quantities to the context units of the input layer 61, and obtains output data associated with the input from the output layer 63 of the dynamical-system approximation model 51. At this time, the adder 60 supplies the input time-series data of the individual dimensions directly to the units of the input layer 61.

On the basis of the time-series data input to the dynamical-system approximation model 51 and output data and time-series data obtained from the dynamical-system approximation model 51 in the immediately preceding iteration, for each node 41, the confidence calculator 511 calculates prediction errors $e_k$ ($0<e_k<1$) for the individual dimensions, representing errors between true values of output for the individual dimensions that are to be obtained in association with the time-series data and output values of the individual dimensions output from the dynamical-system approximation model 51 in relation to the time-series data.

Then, for each node 41, the confidence calculator 511 calculates confidences $\rho_k$ of the individual dimensions according to equation (9) below using the prediction errors $e_k$.

$$\rho_k = 1 - \epsilon_k \tag{9}$$

According to equation (9), low confidences $\rho_k$ are assigned to dimensions with large prediction errors $e_k$, and high confidences $\rho_k$ are assigned to dimensions with small prediction errors $e_k$.

The confidence calculator 511 supplies the confidences $\rho_k$ calculated according to equation (9) to the input-weight adjuster 212 and the output-weight adjuster 213.

The internal-state-quantity updater 512 reads the internal-state quantities that have been last updated and stored from the internal-state storage unit 21 into the dynamical-system approximation model 51 of each node 41 of the dynamics storage network.

More specifically, the internal-state-quantity updater 512 reads the internal-state quantities that have been last updated and stored from the internal-state storage unit 21, and supplies the internal-state quantities to the confidence calculator 511 or the score calculator 215 as initial values of internal-state quantities of the dynamical-system approximation model 51 of each node 41.

Furthermore, similarly to the internal-state-quantity updater 214 shown in FIG. 13, the internal-state-quantity updater 512 stores in the internal-state storage unit 21 the updated values of internal-state quantities of each node 41 at the time of determination of a winner node by the determiner 216, and the initial values of internal-state quantities of each node 41 at the time of determination of the winner node, supplied from the score calculator 215.

A generation unit 502 shown in FIG. 19 includes a confidence calculator 521 and an internal-state reader 522 instead of the confidence extractor 311 and the internal-state reader 315 shown in FIG. 13. That is, in the example shown in FIG. 19, confidences $\rho_k$ of input time-series data are calculated in the generation unit 502.

Similarly to the confidence calculator 501, the confidence calculator 521 receives time-series data supplied from the feature extractor 13. Similarly to the confidence calculator 501, the confidence calculator 521 calculates confidences $\rho_k$ of the individual dimensions on the basis of the time-series data of the individual dimensions and the initial values of internal-state quantities supplied from the internal-state reader 522. The confidence calculator 521 supplies the confidences $\rho_k$ obtained by the calculation to the input-weight adjuster 312 and the output-weight adjuster 313.

On the basis of the information supplied from the generation-node determiner 314, the internal-state reader 522 reads values stored in the internal-state storage unit 21 as initial values of internal-state quantities into the dynamical-system approximation model 51 of the generation node among the nodes 41 included in the dynamics storage network stored in the network storage unit 15.

More specifically, the internal-state reader 522 reads the initial values of internal-state quantities at the time of determination of the generation as a winner node by the recognition unit 16 among the values stored in the internal-state storage unit 21, and supplies the initial values of internal-state quantities to the confidence calculator 521 and the time-series-data generator 316 as initial values of internal-state quantities of the dynamical-system approximation model 51 of the generation node.

Figure 20:
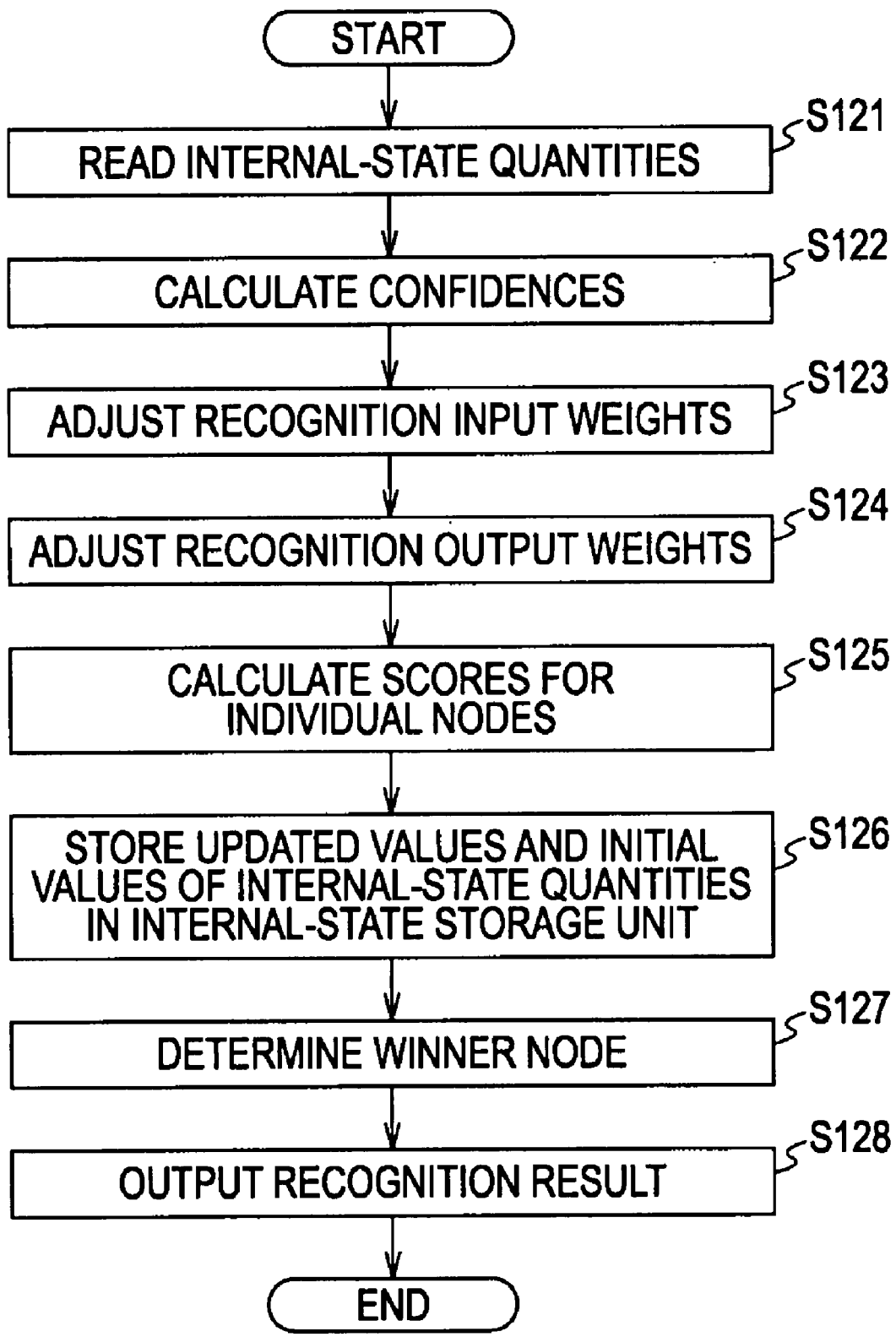
FIG. 20 is a flowchart of another recognition process.

Next, a recognition process in which the recognition unit 501 shown in FIG. 19 recognizes time-series data will be described with reference to FIG. 20. The recognition process is started, for example, when time-series data of the individual dimensions is supplied from the feature extractor 13.

In step S121, the internal-state-quantity updater 512 reads the internal-state quantities that have been last updated and stored from the internal-state storage unit 21 into the dynamical-system approximation model 51 of each node 41 of the dynamics storage network.

After step S121, the process proceeds to step S122. In step S122, the confidence calculator 511 calculates confidences $\rho_k$ of the individual dimensions according to equation (9) on the basis of the time-series data of the individual dimensions supplied from the feature extractor 13 and the initial values of internal-state quantities supplied from the internal-state-quantity updater 512. Then, the confidence calculator 511 supplies the confidences $\rho_k$ to the input-weight adjuster 212 and the output-weight adjuster 213.

After step S122, the process proceeds to step S123. In step S123, on the basis of the confidences $\rho_k$ supplied from the confidence calculator 511, the input-weight adjuster 212 adjusts the recognition input weights $\alpha r_k$ used for recognition, stored in the input-weight storage unit 52 shown in FIG. 4.

After step S123, the process proceeds to step S124. In step S124, similarly to the input-weight adjuster 212, on the basis of the confidences $\rho_k$ supplied from the confidence calculator 511, the output-weight adjuster 213 adjusts the recognition output weights $\beta r_k$ used for recognition, stored in the input-weight storage unit 53. The process then proceeds to step S125.

Steps S125 to S128 are executed correspondingly to steps S75 to S78 shown in FIG. 14, so that description thereof will be omitted.

Next, a generation process in which the generation unit 502 shown in FIG. 19 generates time-series data will be described with reference to FIG. 21. The generation process is started, for example, when a recognition result 17 output from the output unit 217 is input as a control signal 18.

In step S131, on the basis of the control signal 18, the generation-node determiner 314 determines a generation node, i.e., a node 41 with which time-series data is to be generated. The generation-node determiner 314 supplies information identifying the generation node to the internal-state reader 522.

After step S131, the process proceeds to step S132. In step S132, on the basis of the information supplied from the generation-node determiner 314, the internal-state reader 522 reads the initial values of internal-state quantities stored in the internal-state storage unit 21 into the dynamical-system approximation model 51 of the generation node among the nodes 41 included in the dynamics storage network stored in the network storage unit 15.

After step S132, the process proceeds to step S133. In step S133, similarly to the confidence calculator 511, the confidence calculator 521 calculates confidences $\rho_k$ of the individual dimensions according to equation (9) on the basis of the time-series data of the individual dimensions supplied from the feature extractor 13 and the initial values of internal-state quantities supplied from the internal-state reader 522. Then, the confidence calculator 521 supplies the confidences $\rho_k$ obtained by the calculation to the input-weight adjuster 312 and the output-weight adjuster 313.

After step S133, the process proceeds to step S134. In step S134, on the basis of the confidences $\rho_k$ supplied from the confidence calculator 511, the input-weight adjuster 312 adjusts the generation input weights $\alpha g_k$ used for recognition, stored in the input-weight storage unit 52.

After step S134, the process proceeds to step S135. In step S135, similarly to the input-weight adjuster 312, on the basis of the confidences $\rho_k$ supplied from the confidence calculator 511, the output-weight adjuster 313 adjusts the generation output weights $\beta g_k$ used for recognition, stored in the output-weight storage unit 53. The process then proceeds to step S136.

Steps S136 and S137 are executed correspondingly to steps S96 and S97 shown in FIG. 15, so that description thereof will be omitted.

Figure 22:
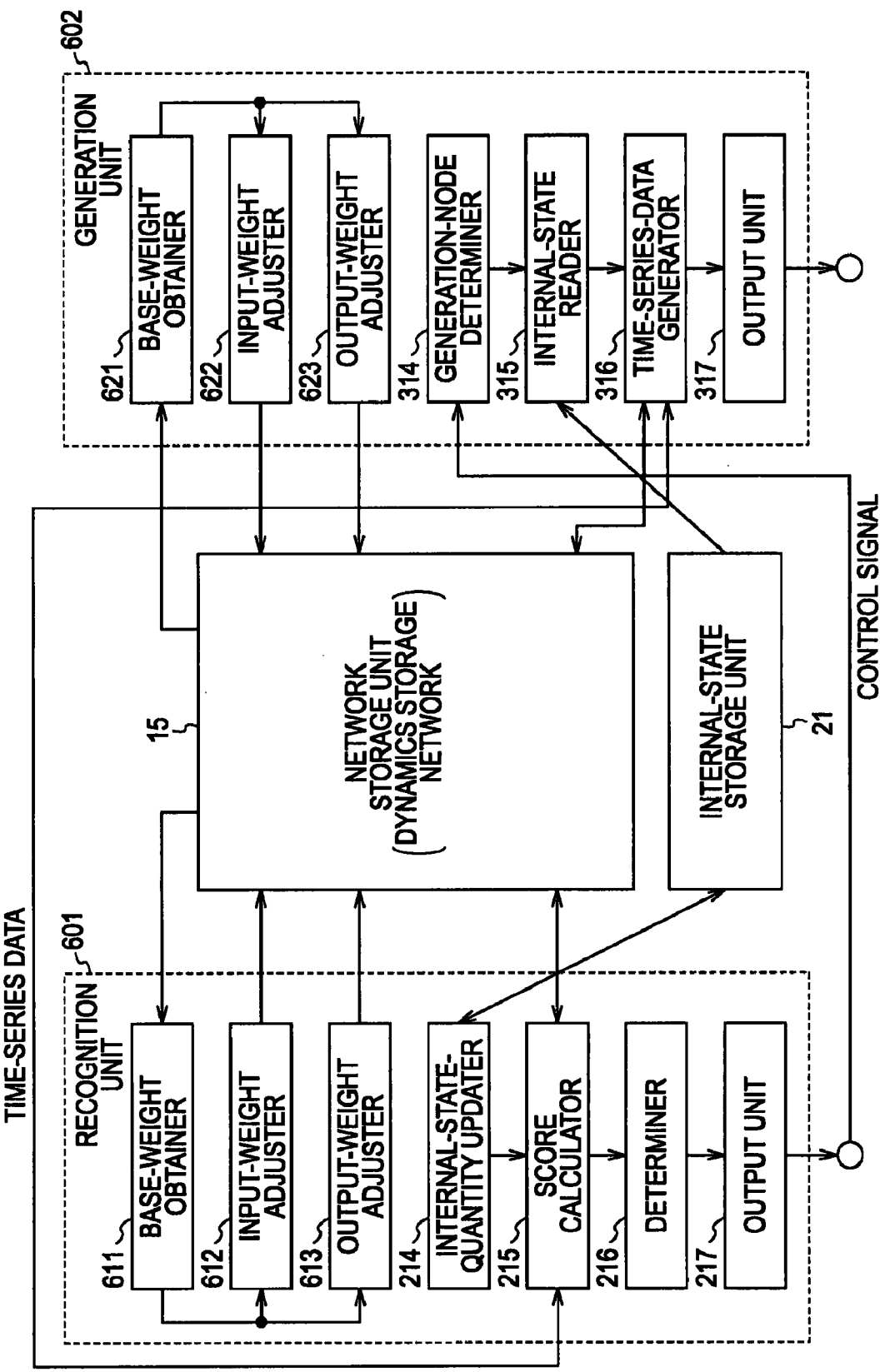
FIG. 22 is a block diagram showing yet another example of detailed configurations of a recognition unit and a generation unit.

FIG. 22 is a block diagram showing another example of detailed configurations of the recognition unit and the generation unit shown in FIG. 1.

A recognition unit 601 and a generation unit 602 shown in FIG. 22 are associated with the learning unit 120 shown in FIG. 10, and execute recognition and generation using a dynamics storage network learned by the learning unit 120.

More specifically, the recognition unit 601 shown in FIG. 22 includes a base-weight obtainer 611, an input-weight adjuster 612, and an output-weight adjuster 613 instead of the confidence extractor 211, the input-weight adjuster 212, and the output-weight adjuster 213 shown in FIG. 13. In the recognition unit 601, recognition input weights $\alpha r_k$ and recognition output weights $\beta r_k$ are adjusted on the basis of base weights $\omega_k$ calculated by the learning unit 120 shown in FIG. 10 in learning.

The base-weight obtainer 611 obtains base weights $\omega_k$ from the base-weight storage unit 142 of each node 141 of the dynamics storage network stored in the network storage unit 15. Then, the base-weight obtainer 611 supplies the base weights $\omega_k$ to the input-weight adjuster 612 and the output-weight adjuster 613.

On the basis of the base weights $\omega_k$ supplied from the base-weight obtainer 611, the input-weight adjuster 612 determines recognition input weights $\alpha r_k$ so that large recognition input weights $\alpha r_k$ are assigned to dimensions with large base weights $\omega_k$, and stores the recognition input weights $\alpha r_k$ in the input-weight storage unit 52. For example, the input-weight adjuster 612 stores the base weights $\omega_k$ in the input-weight storage unit 52 as recognition input weights $\alpha r_k$. Thus, the recognition input weights $\alpha r_k$ stored in the input-weight storage unit 52 are adjusted.

Similarly to the input-weight adjuster 612, on the basis of the base weights $\omega_k$ supplied from the base-weight obtainer 611, the output-weight adjuster 613 determines recognition output weights $\beta r_k$, and stores the recognition output weights $\beta r_k$ in the output-weight storage unit 53, thereby adjusting the recognition output weights $\beta r_k$. For example, the output-weight adjuster 613 stores the base weights $\omega_k$ in the output-weight storage unit 53 as recognition output weights $\beta r_k$.

As described above, the input-weight adjuster 612 and the output-weight adjuster 613 determine recognition input weights $\alpha r_k$ and recognition output weights $\beta r_k$ so that large recognition input weights $\alpha r_k$ and recognition output weights $\beta r_k$ are assigned to dimensions with large base weights $\omega_k$. Thus, dimensions considered in learning are also considered in recognition.

For example, the base weights $\omega_1$ and $\omega_3$ are 1 and the base weights $\omega_2$ and $\omega_4$ are 0 for a node 141 with which learning is performed using the state vectors $x1_t$ and $x3_t$ among the state vectors $x1_t$ and $x2_t$ at time t in the two-dimensional time-series data corresponding to sensor signals and the state vectors $x3_t$ and $x4_t$ at time t in the two-dimensional time-series data corresponding to motor signals. In this case, for example, the base weights $\omega_k$ are determined directly as recognition input weights $\alpha r_k$ and recognition output weights $\beta r_k$, so that the first dimension and the third dimension corresponding to the state vectors $x1_t$ and $x3_t$ are considered among the four dimensions of the time-series data supplied from the feature extractor 13 at the time of recognition.

The input-weight adjuster 612 and the output-weight adjuster 613 may calculate recognition input weights $\alpha r_k$ and recognition output weights $\beta r_k$ by multiplying the base weights $\omega_k$ by confidences $\rho_k$ for recognition instead of using the base weights $\omega_k$ directly as recognition input weights $\alpha r_k$ and recognition output weights $\beta r_k$. In this case, for example, as the confidences $\rho_k$ for recognition, confidences $\rho_k$ attached to the time-series data supplied from the feature extractor 13 or confidences $\rho_k$ calculated on the basis of prediction errors $e_k$ can be used.

The generation unit 602 shown in FIG. 22 includes a base-weight obtainer 621, an input-weight adjuster 622, and an output-weight adjuster 623 instead of the confidence extractor 311, the input-weight adjuster 312, and the output-weight adjuster 313 shown in FIG. 13. In the generation unit 602, generation input weights $\alpha g_k$ and generation output weights $\beta g_k$ are adjusted on the basis of base weights $\omega_k$ calculated by the learning unit 120 shown in FIG. 10 in learning.

The weight obtainer 621 obtains base weights $\omega_k$ from the base-weight storage unit 142 of each node 141 of the dynamics storage network stored in the network storage unit 15. Then, the weight obtainer 621 supplies the base weights $\omega_k$ to the input-weight adjuster 622 and the output-weight adjuster 623.

Similarly to the input-weight adjuster 612, on the basis of the base weights $\omega_k$ supplied from the weight obtainer 621, the input-weight adjuster 622 determines generation input weights $\alpha g_k$ so that large generation input weights $\alpha g_k$ are assigned to dimensions with large base weights $\omega_k$, and stores the generation input weights $\alpha g_k$ in the input-weight storage unit 52. Thus, the generation input weights $\alpha g_k$ stored in the input-weight storage unit 52 are adjusted.

Similarly to the output-weight adjuster 613, on the basis of the base weights $\omega_k$ supplied from the weight obtainer 621, the output-weight adjuster 623 determines generation output weights $\beta g_k$, and stores the generation output weights $\beta g_k$ in the output-weight storage unit 53, thereby adjusting the generation output weights $\beta g_k$.

As described above, similarly to the input-weight adjuster 612 and the output-weight adjuster 613, the input-weight adjuster 622 and the output-weight adjuster 623 determine generation input weights $\alpha g_k$ and generation output weights $\beta g_k$ on the basis of base weights $\omega_k$, so that dimensions considered in learning are also considered in generation.

For example, the base weights $\omega_1$ and $\omega_3$ are 1 and the base weights $\omega_2$ and $\omega_4$ are 0 for a node 141 with which learning is performed using the state vectors $x1_t$ and $x3_t$ among the state vectors $x1_t$ and $x2_t$ at time t in the two-dimensional time-series data corresponding to sensor signals and the state vectors $x3_t$ and $x4_t$ at time t in the two-dimensional time-series data corresponding to motor signals.

In this case, for example, the base weights $\omega_k$ are determined directly as generation input weights $\alpha g_k$ and generation output weights $\beta g_k$, so that the first dimension and the third dimension corresponding to the state vectors $x1_t$ and $x3_t$ are considered among the four dimensions of the time-series data supplied from the feature extractor 13 at the time of generation. Thus, the time-series-data generator 316 generates time-series data using only output data of the first and third dimensions among the four-dimensional output data obtained from the dynamical-system approximation model 51.

By determining generation input weights $\alpha g_k$ on the basis of the base weights $\omega_k$ as described above, it is possible to prevent output data of dimensions not considered in learning from being included in a generation result 20 that is output. Thus, depending on the node 141 determined as a generation node, for example, only time-series data associated with arms signals or only time-series data associated with legs signals is generated.

Figure 23:
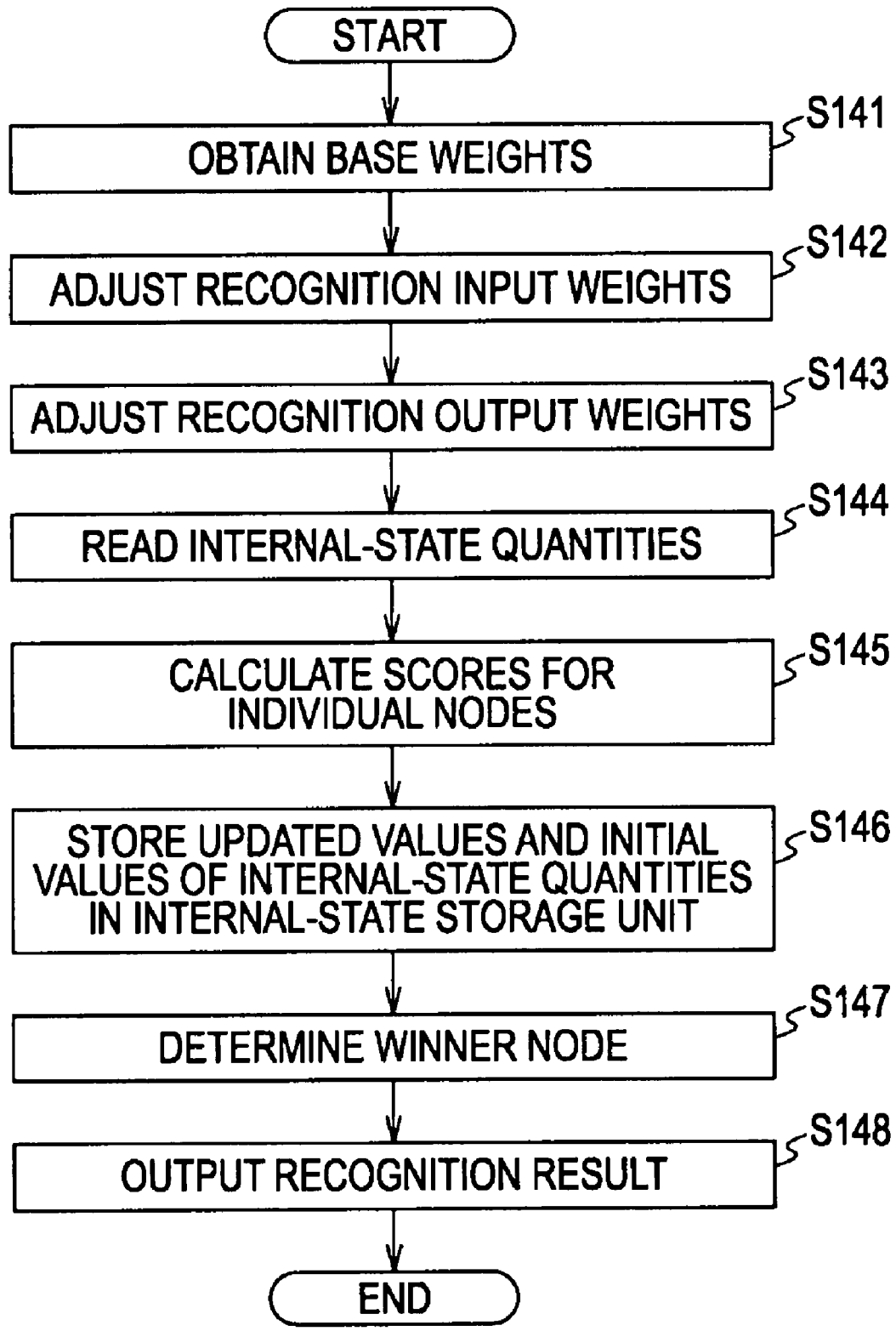
FIG. 23 is a flowchart of yet another recognition process.

Next, with reference to FIG. 23, a recognition process in which the recognition unit 601 shown in FIG. 22 recognizes time-series data will be described with reference to FIG. 23. The recognition process is started, for example, when time-series data is supplied from the feature extractor 13.

In step S141, the base-weight obtainer 611 obtains base weights $\omega_k$ from the base-weight storage unit 142 of each node of the dynamics storage network stored in the network storage unit 15. Then, the base-weight obtainer 611 supplies the base weights $\omega_k$ to the input-weight adjuster 612 and the output-weight adjuster 613.

After step S141, the process proceeds to step S142. In step S142, on the basis of the base weights $\omega_k$ supplied from the base-weight obtainer 611, the input-weight adjuster 612 stores the recognition input weights $\alpha r_k$ in the input-weight storage unit 52, thereby adjusting the recognition input weights $\alpha r_k$.

After step S142, the process proceeds to step S143. In step S143, similarly to the input-weight adjuster 612, on the basis of the base weights $\omega_k$ supplied from the base-weight obtainer 611, the output-weight adjuster 613 stores the recognition output weights $\beta r_k$ in the output-weight storage unit 53, thereby adjusting the recognition output weights $\beta r_k$. The process then proceeds to step S144.

Steps S144 to S148 are executed correspondingly to steps S74 to S78 shown in FIG. 14, so that description thereof will be omitted.

Figure 24:
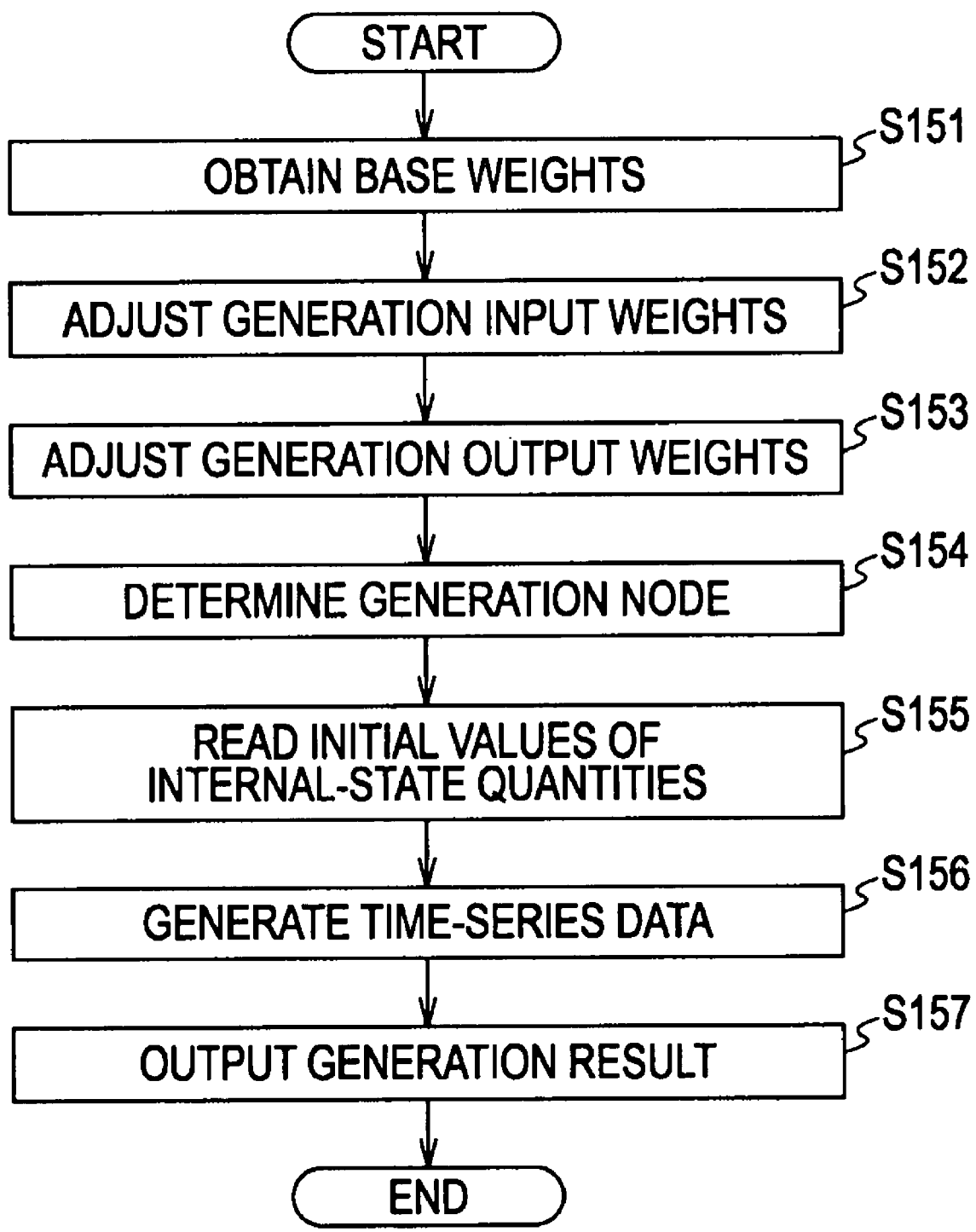
FIG. 24 is a flowchart of yet another generation process.

Next, a generation process in which the generation unit 602 shown in FIG. 22 generates time-series data will be described with reference to FIG. 24. The generation process is started, for example, when a recognition result 17 output from the output unit 217 is input as a control signal 18.

In step S151, the weight obtainer 621 obtains base weights $\omega_k$ from the base-weight storage unit 142 of each node 141 of the dynamics storage network stored in the network storage unit 15. Then, the weight obtainer 621 supplies the base weights $\omega_k$ to the input-weight adjuster 622 and the output-weight adjuster 623.

After step S151, the process proceeds to step S152. In step S152, similarly to the input-weight adjuster 612, on the basis of the base weights $\omega_k$ supplied from the weight obtainer 621, the input-weight adjuster 622 stores generation input weights $\alpha g_k$ in the input-weight storage unit 52, thereby adjusting the generation input weights $\alpha g_k$.

After step S152, the process proceeds to step S153. In step S153, similarly to the output-weight adjuster 613, on the basis of the base weights $\omega_k$ supplied from the weight obtainer 621, the output-weight adjuster 623 stores generation output weights $\beta g_k$ in the output-weight storage unit 53, thereby adjusting the generation output weights $\beta g_k$. The process then proceeds to step S154.

Steps S154 to S157 are executed correspondingly to steps S94 to S97 shown in FIG. 15, so that description thereof will be omitted.

Figure 25:
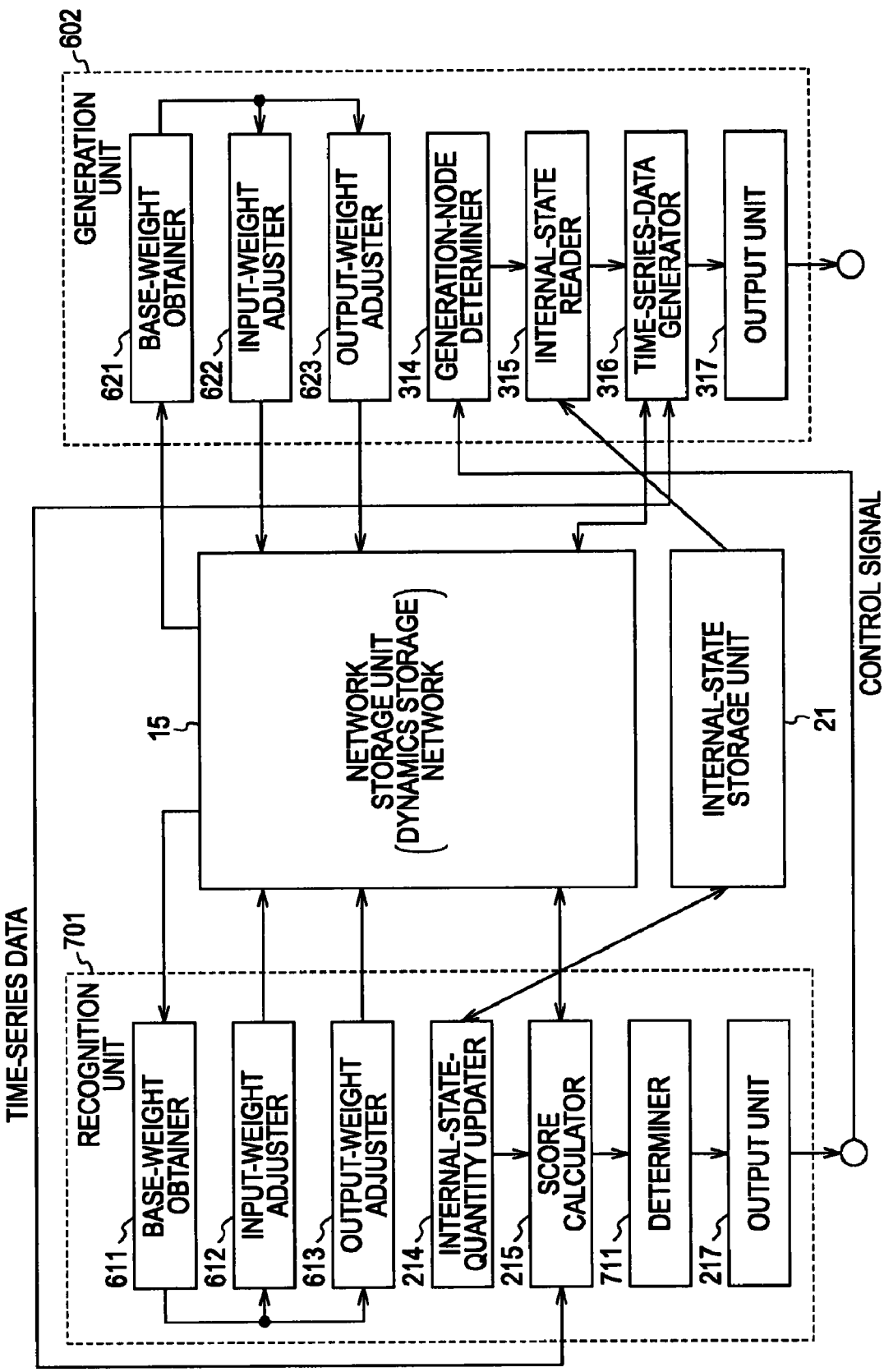
FIG. 25 is a block diagram showing yet another example of detailed configurations of a recognition unit and a generation unit.

FIG. 25 is a block diagram showing yet another example of detailed configurations of the recognition unit shown in FIG. 1.

A recognition unit 701 shown in FIG. 25 includes a determiner 711 instead of the determiner 216 shown in FIG. 22 so that all nodes 141 having scores within a predetermined range are determined as winner nodes.

On the basis of scores supplied from the score calculator 215, the determiner 711 determines all nodes having scores in a predetermined range including a smallest score as winner nodes. That is, on the basis of the scores, the determiner 711 determines a node with a smallest score, i.e., a node having dynamics that best match the time-series data supplied from the feature extractor 13, as a top winner node, and determines the top winner node and nodes having scores within a predetermined range of the score of the top winner node as winner nodes.

The predetermined range is, for example, a range defined by predetermined constants, or a range within a value that is A (A>1) times as large as the smallest score. The determiner 711 supplies signals identifying the winner nodes to the output unit 217.

Thus, signals identifying all the nodes 141 having scores within the predetermined range including the smallest score are supplied to the generation unit 602 as control signals 18, so that all the winner nodes are determined as generation nodes. For each of the nodes 141 determined as the winner nodes, the time-series-data generator 316 weights output data of individual dimensions obtained from the dynamical-system approximation model 51 of the node on the basis of generation output weights $\beta g_k$, and generates time-series data by combining the resulting output data of the individual dimensions for the node 41.

For example, time-series data corresponding to arms signals among output data of one winner node and time-series data corresponding to legs signals among output data of another winner node are combined to generate time-series data.

As described above, the determiner 711 determines nodes 141 having scores within a predetermined range including a smallest score as winner nodes. Thus, it is possible to inhibit generation of a generation result 20 inconsistent with input observation signals 11.

Furthermore, the determiner 711 determines nodes 141 having scores within a predetermined range including a smallest score as winner nodes, and the time-series-data generator 316 weights output data of individual dimensions output from the winner nodes on the basis of generation output weights $\beta g_k$. Thus, for each dimension, time-series data output from a node 141 that is to be considered at a highest degree is selected for the dimension among the winner nodes. This serves to generate a generation result 20 that matches the observation signals 11 even better. Accordingly, for example, it is possible to cause a robot to take actions more suitably in accordance with actual situations.

Figure 26:
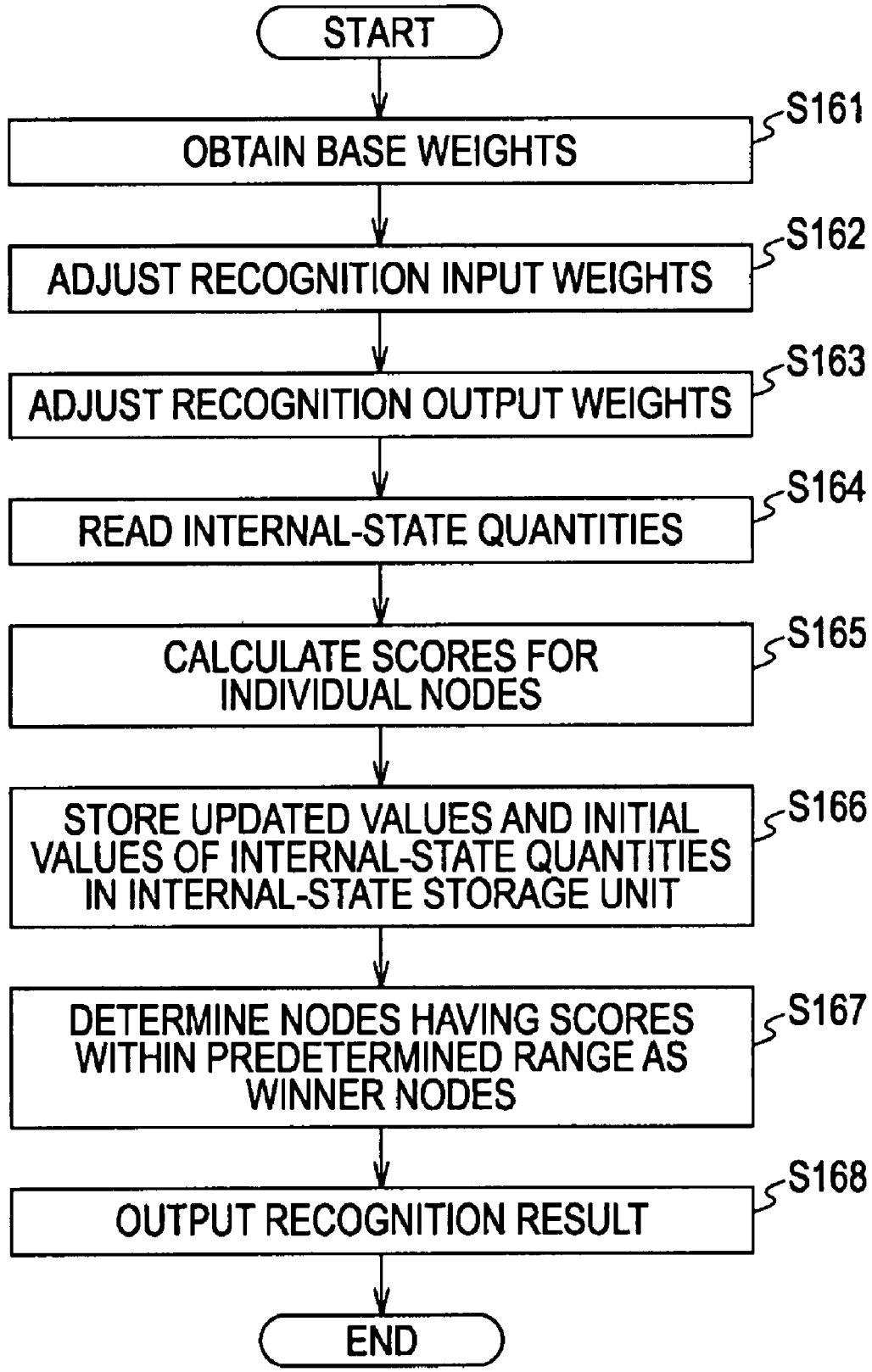
FIG. 26 is a flowchart of yet another recognition process.

Next, a recognition process in which the recognition unit 701 shown in FIG. 25 recognizes time-series data will be described with reference to FIG. 26. The recognition process is started, for example, when time-series data is supplied from the feature extractor 13.

Steps S161 to S166 are executed correspondingly to steps S91 to S96 shown in FIG. 14, so that description thereof will be omitted.

After step S166, the process proceeds to step S167. In step S167, on the basis of scores supplied from the score calculator 215, the determiner 711 determines all the nodes having scores within a predetermined range including a smallest score as winner nodes. The determiner 711 supplies signals identifying the winner nodes to the output unit 217.

After step S167, the process proceeds to step S168. In step S168, the output unit 217 outputs the signals identifying the winner nodes, supplied from the determiner 711, as a recognition result 17. This concludes the recognition process.

FIGS. 27A and 27B and FIGS. 28A and 28B are graphs showing results of experiments for verifying the effects of assigning weights based on learning input weights $\alpha s_k$ and learning output weights $\beta s_k$ in learning.

In the experiments shown in FIGS. 27A and 27B and FIGS. 28A and 28B, learning was performed by a single RNN using time-series data relating to a task A of playing with a red car and time-series data relating to a task B of moving a green ball up and down.

FIGS. 27A and 27B and FIGS. 28A and 28B show generation results 20 obtained using the RNN by performing recognition and generation with input of time-series data composed of a mixture of time-series data representing visual information relating to the task A and time-series data representing visual information relating to the task B, i.e., virtually generated time-series data representing visual information corresponding to both a red car and a green ball in view.

Figure 27A:
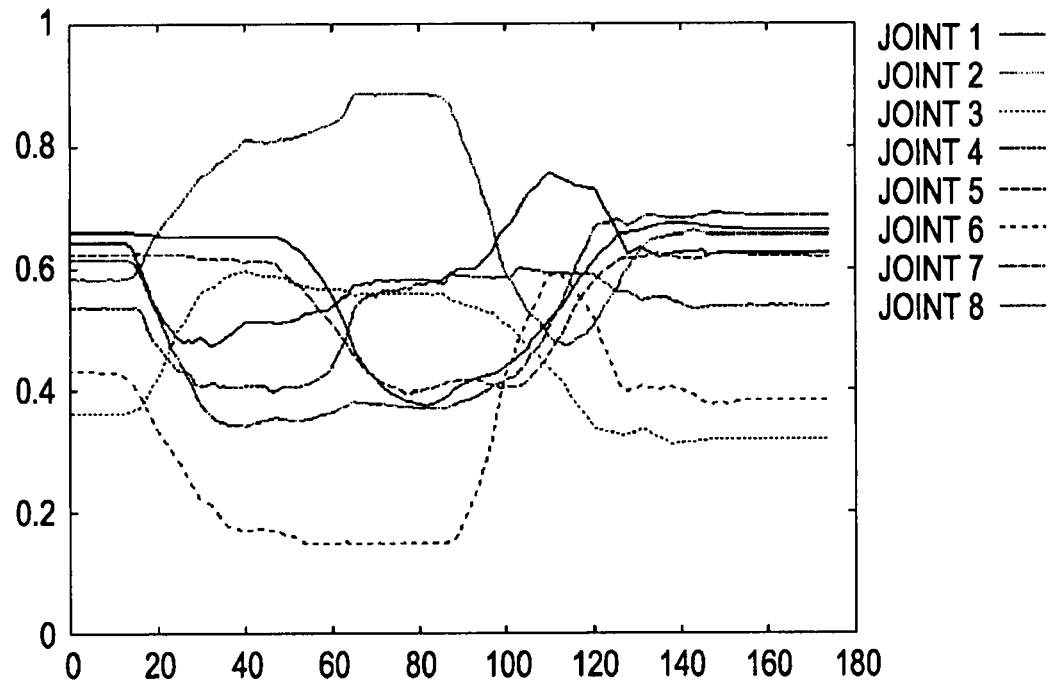
FIGS. 27A and 27B are graphs showing results of an experiment in which recognition and generation were performed using an RNN in which weights were not assigned in learning.
Figure 27B:
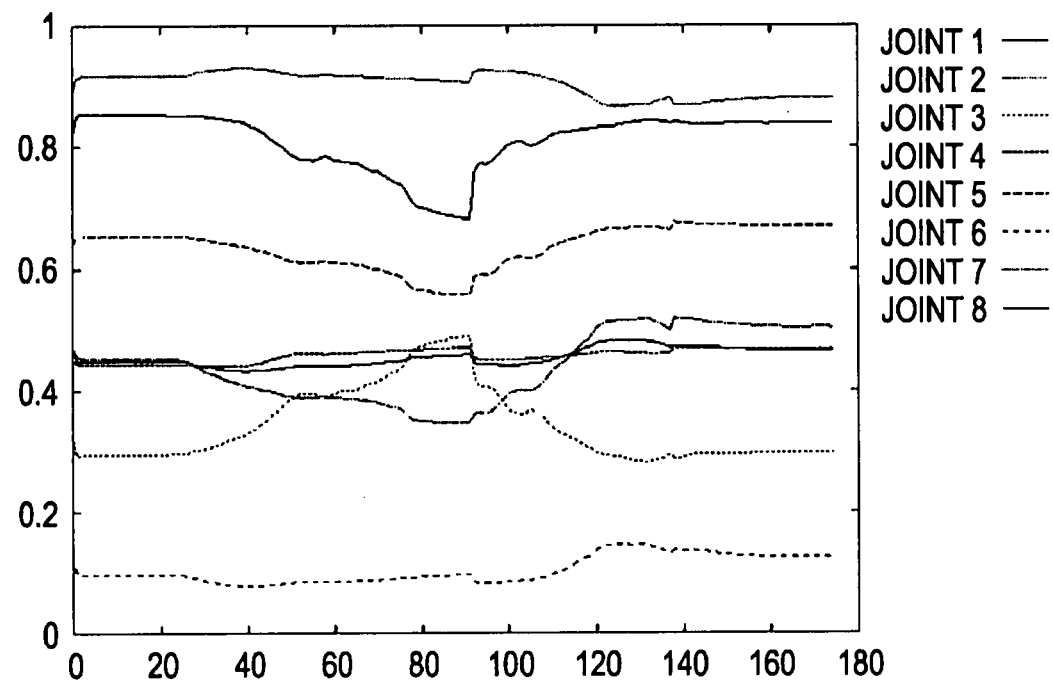
Figure 28A:
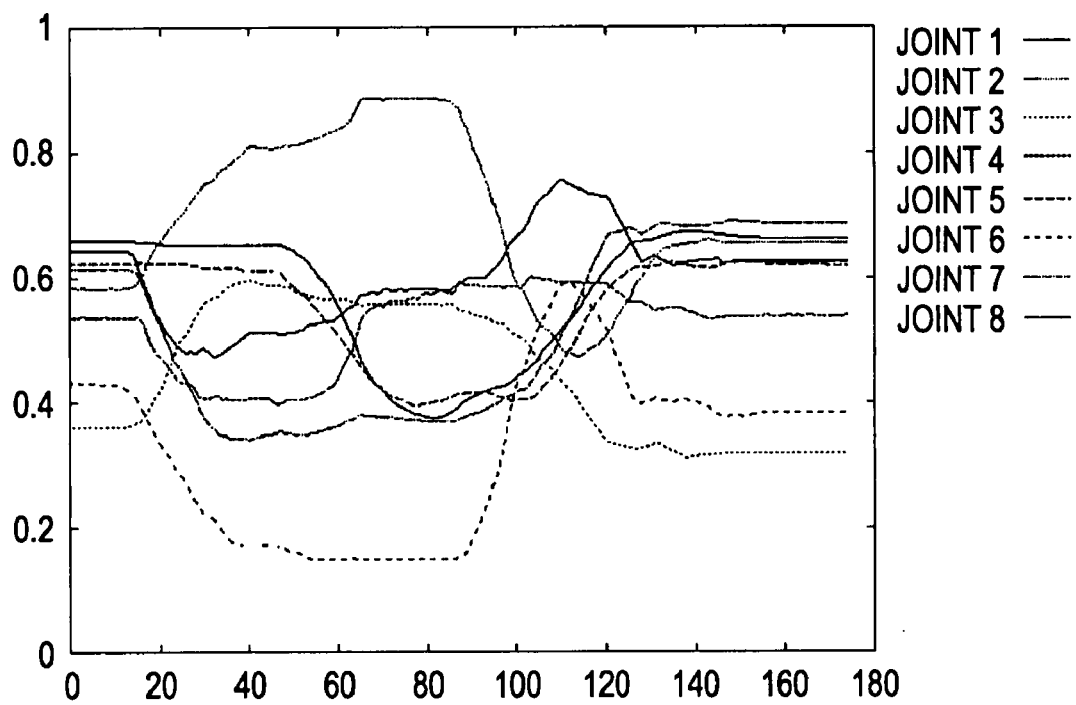
FIGS. 28A and 28B are graphs showing results of an experiment in which recognition and generation were performed using an RNN in which weights were assigned in learning.

In FIGS. 27A and 27B and FIGS. 28A and 28B, the horizontal axis represents time steps, and the vertical axis represents values of joint angles of the robot normalized for the RNN. This also applies to FIGS. 29A and 29B and FIGS. 30A and 30B described later. FIGS. 27A and 28A show target generation results.

FIG. 27B is a graph showing a generation result obtained by performing recognition and generation by an RNN without assigning weights in learning. Comparison between FIGS. 27A and 27B reveals that a generation result with a time-series pattern approximate to a time-series pattern of the target generation result shown in FIG. 27A was not generated when weights were not assigned in learning. Particularly, generation and recognition of the task B failed in the experiment.

Figure 28B:
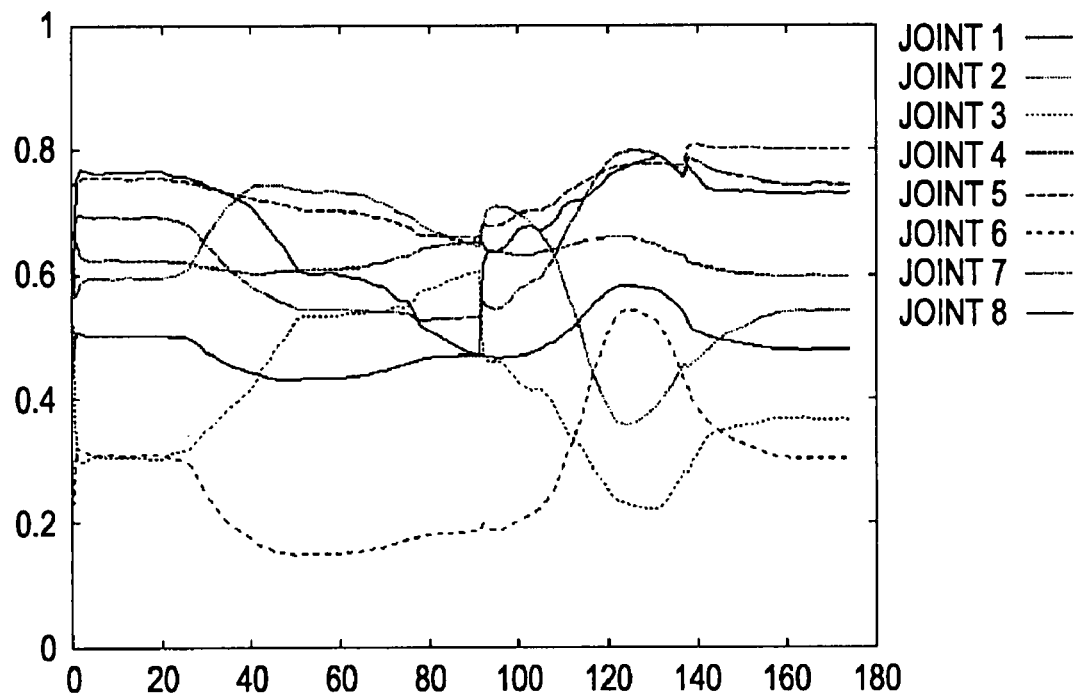

FIG. 28B is a graph showing a generation result obtained when recognition and generation were performed by an RRN in which larger learning input weights $\alpha s_k$ and learning output weights $\beta s_k$ were assigned to dimensions regarding vision than other dimensions in learning. Comparison between FIGS. 28A and 28B reveals that a generation result with a time-series pattern approximate to a time-series pattern of the target generation result shown in FIG. 28A was generated when recognition and learning were performed by the RNN in which weights were assigned in learning. That is, in this case, recognition and generation of the task A and the task B were performed correctly.

From what has been described above, it is understood that by assigning weights on the basis of learning input weights $\alpha s_k$ and learning output weights $\beta s_k$ in learning, recognition and generation of observation signals 11 that are different from those used in learning, as well as observation signals 11 that are the same as those used in learning, are allowed. That is, robustness in unknown environments, as well as in an environment that is the same as an environment used in learning, is improved.

FIGS. 29A and 29B and FIGS. 30A and 30B are graphs showing results of experiments for verifying the effects of assigning weights on the basis of recognition input weights $\alpha r_k$, recognition output weights $\beta r_k$, generation input weights $\alpha g_k$, and generation output weights $\beta g_k$ in recognition and generation.

FIGS. 29A and 29B and FIGS. 30A and 30B are graphs showing results of experiments executed similarly to the cases shown in FIGS. 27A and 27B and FIGS. 28A and 28B.

Figure 29A:
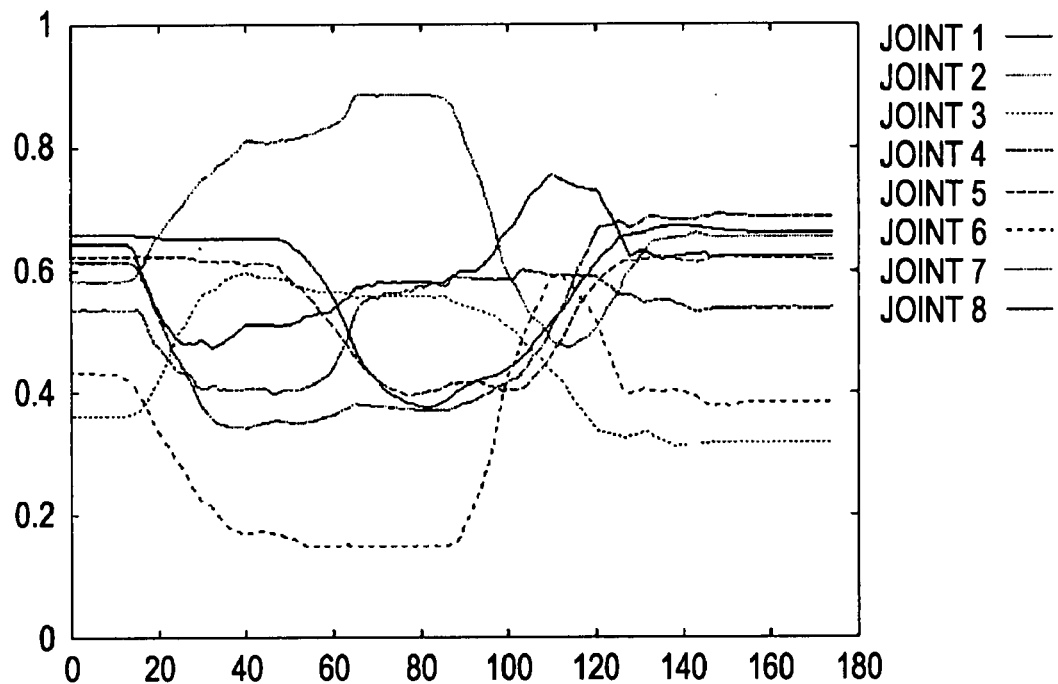
FIGS. 29A and 29B are graphs showing results of an experiment in which weights were not assigned in recognition and generation.
Figure 30A:
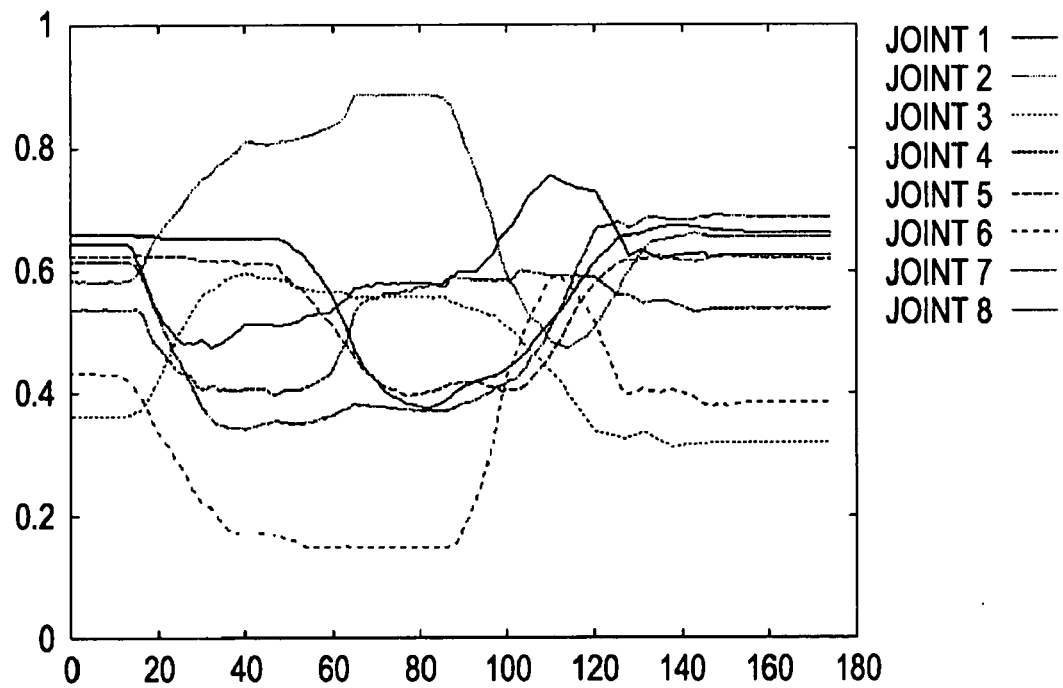
FIGS. 30A and 30B are graphs showing results of an experiment in which weights were assigned in recognition and generation.

FIGS. 29A and 30A show target generation results.

Figure 29B:
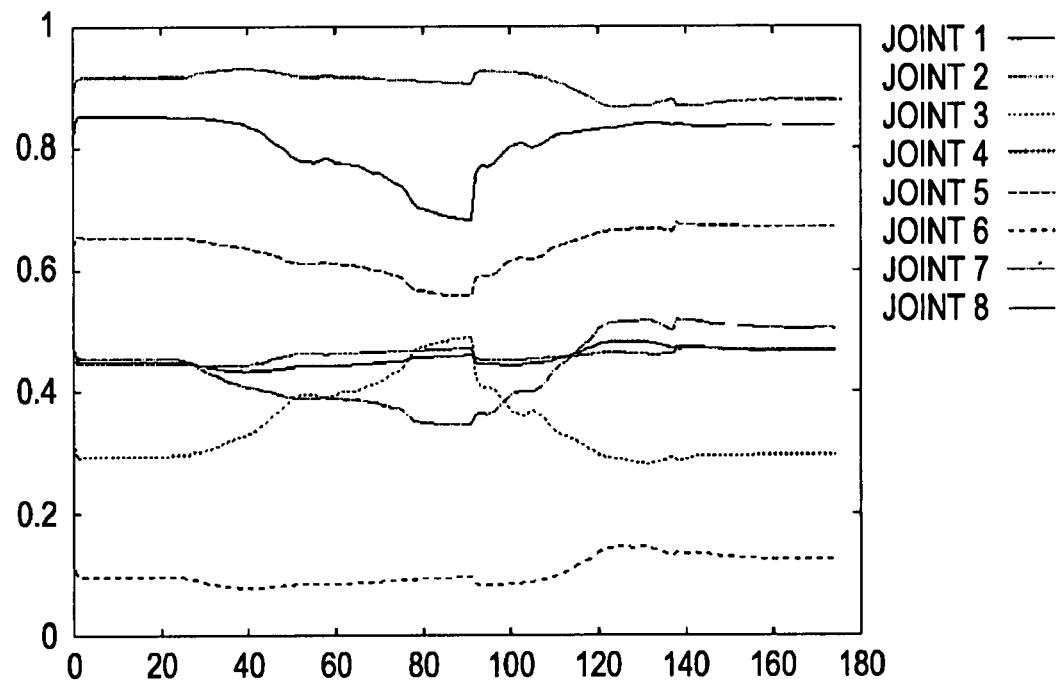

FIG. 29B is a graph showing a generation result obtained by performing generation and recognition by an RNN in which weights were not assigned in recognition and generation. Comparison between FIGS. 29A and 29B reveals that a generation result having a time-series pattern approximate to the time-series pattern of the target generation result shown in FIG. 29A was not generated when recognition and generation were performed by the RNN in which weights were not assigned in recognition and generation. That is, in this case, recognition and generation were not performed correctly.

Figure 30B:
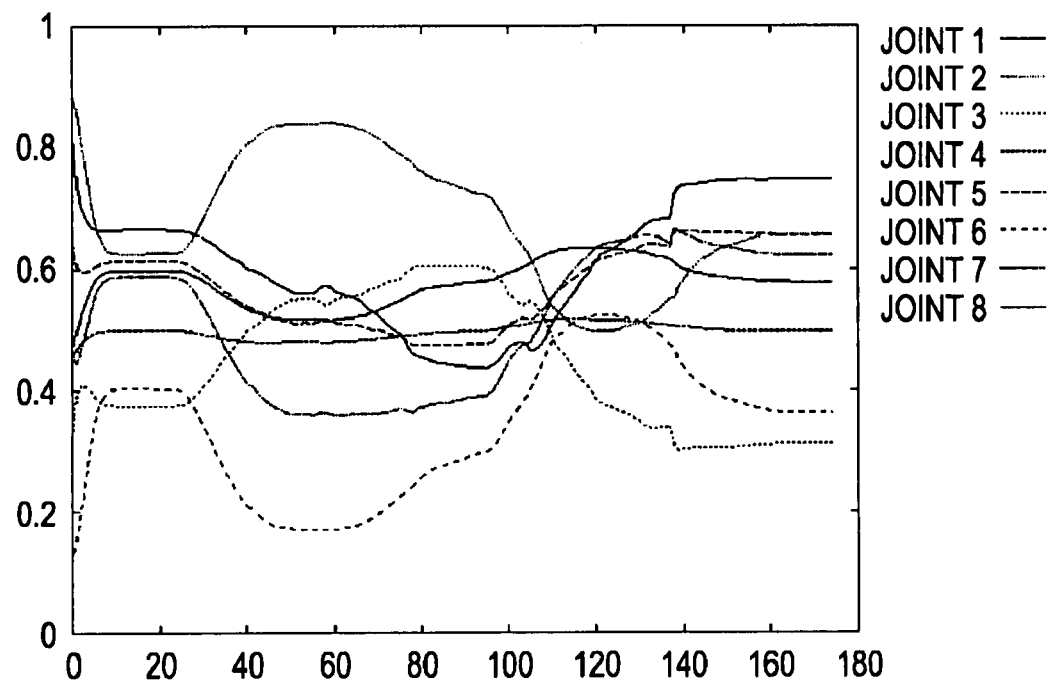

FIG. 30B is a graph showing a generation result 20 obtained when recognition and generation were performed by an RNN in which larger recognition input weights $\alpha r_k$, recognition output weights $\beta r_k$, generation input weights $\alpha g_k$, and generation output weights $\beta g_k$ were assigned to dimensions regarding vision than other dimensions in recognition and generation. Comparison between FIGS. 30A and 301B reveals that a generation result having a time-series pattern approximate to a time-series pattern of the target generation result shown in FIG. 30A was generated when recognition and generation were performed using the RNN in which weights were assigned in recognition and generation. That is, in this case, recognition and generation of the task A and the task B were performed correctly.

From what has been described above, it is understood that by assigning weights on the basis of recognition input weights $\alpha r_k$, recognition output weights $\beta r_k$, generation input weights $\alpha g_k$, and generation output weights $\beta g_k$ in recognition and generation, the ability of recognition and generation becomes stable, so that recognition and generation performance can be improved.

As described above, in the information processing apparatus 1 shown in FIG. 1, input weights serving as weight coefficients for individual dimensions of input data input to the individual units of the input layer 61 of the dynamical-system approximation model 51 are adjusted on a dimension-by-dimension basis, and output weights serving as weight coefficients for individual dimensions of multidimensional output data output from the individual units of the output layer 63 are adjusted on a dimension-by-dimension basis. Thus, multidimensional time-series data can be handled efficiently in an RNN.

In the above description, a score corresponds to an average square error between true values of output associated with time-series data and values output from the dynamical-system approximation model 51 and associated with the time-series data. However, without limitation, for example, the score may correspond to a distance between true values and output values or correspond to a probability. When the score corresponds to a distance, similarly to the case where the score corresponds to an average square error, a node having a small score is determined as a winner node. On the other hand, when the score corresponds to a probability, a node having a large score is determined as a winner node.

Although learning, recognition, and generation are performed using a dynamics storage network including a plurality of nodes in the above description, learning or generation may be performed using a single node.

The series of processes described above may be executed by hardware or by software. When the series of processes are executed by software, programs constituting the software are installed on a general-purpose computer or the like.

FIG. 31 shows an example configuration of a computer according to an embodiment of the present invention, on which programs for executing the series of processes described above are installed.

The programs can be recorded in advance in a hard disc 805 or a read-only memory (ROM) 803 included in the computer as a recording medium.

Alternatively, the programs may be stored (recorded) temporarily or permanently on a removable recording medium 811, such as a compact disc read-only memory (CD-ROM), a magneto-optical (MO) disc, a digital versatile disc (DVD), a magnetic disc, or a semiconductor memory. The removable recording medium 811 can be provided in the form of what is called package software.

Instead of installing the programs from the removable recording medium 811 onto a computer as described above, the programs may be transferred to a computer by wireless via an artificial satellite for digital satellite broadcasting or transferred to a computer by wire via a network such as a local area network (LAN) or the Internet so that the programs transferred are received by a communication unit 808 and installed on the hard disc 805 in the computer.

The computer includes a central processing unit (CPU) 802. The CPU 802 is connected to an input/output interface 810 via a bus 801. When instructions are input via the input/output interface 810, for example, by user's operations of an input unit 807, such as a keyboard, a mouse, or a microphone, the CPU 802 executes programs stored in the ROM 803 according to the instructions. Alternatively, the CPU 802 loads into a random access memory (RAM) 804 programs stored in the hard disc 805, programs transferred from a satellite or a network, received by the communication unit 808, and installed on the hard disc 805, or programs read from the removable recording medium mounted on a drive 809 and installed on the hard disc 805, and then executes the programs loaded. Thus, the CPU 802 executes processes according to the flowcharts or processes executed by the configuration shown in block diagrams as described above. Then, as needed, for example, the CPU 802 outputs results of the processes from an output unit 806, such as a liquid crystal display (LCD) or a speaker, sends results of the processes from the communication unit 808, or records results of the processes in the hard disc 805, via the input/output interface 810.

The processing steps of the programs for causing the computer to execute various processes need not necessarily be executed in the orders described herein with reference to the flowcharts, and may include processes that are executed in parallel or individually (e.g., parallel processing or processing by objects).

The programs may be executed by a single computer, or by a plurality of computers in a distributed manner. Furthermore, the programs may be transferred to and executed by a remote computer.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    storage means for storing a node holding dynamics;
    input-weight-coefficient adjusting means for adjusting input-weight coefficients on a dimension-by-dimension basis, the input-weight coefficients being weight coefficients for individual dimensions of input data input to input units of the node, the input data being observed time-series data having a plurality of dimensions; and
    output-weight-coefficient adjusting means for adjusting output-weight coefficients on a dimension-by-dimension basis, the output-weight coefficients being weight coefficients for individual dimensions of output data having a plurality of dimensions and output from output units of the node;
    wherein each of the plurality of dimensions include a confidence value denoting a probability of observation of an observation signal, the confidence value provided to both the input-weight-coefficient adjusting means and output-weight-coefficient adjusting means.

2. The information processing apparatus according to claim 1, further comprising:
    obtaining means for obtaining the input-weight coefficients and the output-weight coefficients from outside,
    wherein the input-weight-coefficient adjusting means adjusts the input-weight coefficients on the dimension-by-dimension basis according to the input-weight coefficients obtained by the obtaining means, and
    wherein the output-weight-coefficient adjusting means adjusts the output-weight coefficients on the dimension-by-dimension basis according to the output-weight coefficients obtained by the obtaining means.

3. The information processing apparatus according to claim 1, further comprising:
    input means for inputting the input data to the input units, the input data being obtained by adding together output data output from the output units in an immediately preceding iteration and newly observed time-series data on the dimension-by-dimension basis by ratios corresponding to the input-weight coefficients.

4. The information processing apparatus according to claim 1, further comprising:
    internal-state updating means for updating initial values of internal-state quantities of the node according to an output error, the output error being obtained by adding together errors for the individual dimensions between the input data and output data output from the output units in an immediately preceding iteration by ratios corresponding to the output-weight coefficients.

5. The information processing apparatus according to claim 4, further comprising:
    weight updating means for updating weights assigned to connections of the node, according to the output error.

6. The information processing apparatus according to claim 1, further comprising:
    base-weight calculating means for calculating base weights for the individual dimensions according to the confidences for the individual dimensions, the base weights serving as bases of input-weight coefficients and output-weight coefficients used to generate time-series data.

7. The information processing apparatus according to claim 1, further comprising:
    generating means for generating time-series data having a plurality of dimensions while updating internal-state quantities of the node by inputting the input data to the input units of the node.

8. The information processing apparatus according to claim 7,
    wherein the input-weight-coefficient adjusting means adjusts the input-weight coefficients on the dimension-by-dimension basis according to errors for the individual dimensions between the input data and output data output from the output units in an immediately preceding iteration, and
    wherein the output-weight-coefficient adjusting means adjusts the output-weight coefficients on the dimension-by-dimension basis according to the errors for the individual dimensions.

9. The information processing apparatus according to claim 7, further comprising:
    obtaining means for obtaining base-weight coefficients calculated for the individual dimensions when dynamics are learned on the basis of time-series data, the base-weight coefficients serving as bases of the input-weight coefficients and the output-weight coefficients,
    wherein the input-weight-coefficient adjusting means adjusts the input-weight coefficients on the dimension-by-dimension basis according to the base-weight coefficients, and
    wherein the output-weight-coefficient adjusting means adjusts the output-weight coefficients on the dimension-by-dimension basis according to the base weights.

10. The information processing apparatus according to claim 7, wherein the generating means generates the time-series data for the individual dimensions by ratios corresponding to the output-weight coefficients.

11. An information processing method comprising the steps of:

adjusting input-weight coefficients on a dimension-by-dimension basis, the input-weight coefficients being weight coefficients for individual dimensions of input data input to input units of a node holding dynamics, the input data being observed time-series data having a plurality of dimensions; and adjusting output-weight coefficients on a dimension-by-dimension basis, the output-weight coefficients being weight coefficients for individual dimensions of output data having a plurality of dimensions and output from output units of the node;

wherein each of the plurality of dimensions include a confidence value denoting a probability of observation of an observation signal, the confidence value provided to both the input-weight-coefficient adjusting means and output-weight-coefficient adjusting means.

12. A non-transitory computer-readable recording medium for storing a computer program for providing information processing, wherein the program comprises the steps of:

adjusting input-weight coefficients on a dimension-by-dimension basis, the input-weight coefficients being weight coefficients for individual dimensions of input data input to input units of a node holding dynamics, the input data being observed time-series data having a plurality of dimensions; and adjusting output-weight coefficients on a dimension-by-dimension basis, the output-weight coefficients being weight coefficients for individual dimensions of output data having a plurality of dimensions and output from output units of the node;

wherein each of the plurality of dimensions include a confidence value denoting a probability of observation of an observation signal, the confidence value provided to both the input-weight-coefficient adjusting means and output-weight-coefficient adjusting means.

13. An information processing apparatus comprising:

a storage unit configured to store a node holding dynamics;

an input-weight-coefficient adjuster configured to adjust input-weight coefficients on a dimension-by-dimension basis, the input-weight coefficients being weight coefficients for individual dimensions of input data input to input units of the node, the input data being observed time-series data having a plurality of dimensions; and an output-weight-coefficient adjuster configured to adjust output-weight coefficients on a dimension-by-dimension basis, the output-weight coefficients being weight coefficients for individual dimensions of output data having a plurality of dimensions and output from output units of the node wherein each of the plurality of dimensions include a confidence value denoting a probability of observation of an observation signal, the confidence value provided to both the input-weight-coefficient adjusting means and output-weight-coefficient adjusting means.

* * * * *